(12) United States Patent
O'Connell et al.

(10) Patent No.: US 10,644,485 B2
(45) Date of Patent: May 5, 2020

(54) LIVE CONDUCTOR STRINGING, MAINTENANCE AND REPAIR METHOD

(71) Applicant: Quanta Associates, L.P., Houston, TX (US)

(72) Inventors: Daniel Neil O'Connell, Oliver (CA); David Karl Wabnegger, Langley (CA); Phillip Howard Quaedvlieg, Langley (CA); Robert Wayne Palmer, Houston, TX (US)

(73) Assignee: Quanta Associates, L.P., Houston, TX (US)

( * ) Notice: Subject to any disclaimer, the term of this patent is extended or adjusted under 35 U.S.C. 154(b) by 195 days.

(21) Appl. No.: 15/236,002

(22) Filed: Aug. 12, 2016

(65) Prior Publication Data
US 2017/0047716 A1    Feb. 16, 2017

Related U.S. Application Data

(60) Provisional application No. 62/204,037, filed on Aug. 12, 2015.

(51) Int. Cl.
*H02G 1/04*    (2006.01)
(52) U.S. Cl.
CPC .................................... *H02G 1/04* (2013.01)
(58) Field of Classification Search
CPC ......... H02G 1/04; H01F 17/062; H01F 21/12; H04M 1/74; Y10T 29/4973
See application file for complete search history.

(56) References Cited

U.S. PATENT DOCUMENTS

| | | | |
|---|---|---|---|
| 6,060,972 A * | 5/2000 | Van Den Brink | .... H01F 17/062 324/127 |
| 6,191,354 B1 | 2/2001 | Castano et al. | |
| 7,535,132 B2 | 5/2009 | Devine et al. | |
| 7,977,571 B2 | 7/2011 | Devine et al. | |
| 8,505,878 B2 | 8/2013 | Barthold | |
| 8,573,562 B2 | 11/2013 | Devine et al. | |
| 9,478,952 B2 | 10/2016 | Wabnegger et al. | |
| 10,367,337 B2 * | 7/2019 | Wabnegger | ............... H02G 1/04 |
| 2009/0195083 A1 | 8/2009 | Devine et al. | |
| 2009/0295235 A1 | 12/2009 | Barthold | |
| 2015/0249325 A1 | 9/2015 | O'Connell et al. | |
| 2017/0047716 A1 * | 2/2017 | O'Connell | ............... H02G 1/04 |

OTHER PUBLICATIONS

Lee W. Young, PCT International Search Report, dated Oct. 28, 2016, 3 pages, ISA/US, Alexandria, Virginia, United States.
Lee W. Young, PCT Written Opinion of the International Searching Authority, dated Oct. 28, 2016, 6 pages, ISA/US, Alexandria, Virginia, United States.

* cited by examiner

*Primary Examiner* — Minh N Trinh
(74) *Attorney, Agent, or Firm* — Oathout Law Firm; Mark A. Oathout; Anthony C. Edwards

(57) ABSTRACT

The present invention relates to replacing conductors in a high-voltage power transfer system. The method provides, for example, a method for maintaining sections of electrically conductive phases in a three-phase power conductor line, wherein the three phases are parallel and spaced apart in an ordered sequence. The phases are strung between support structures and supported above the ground. Maintenance work, which include replacement or repair, is performed on sections of the three phases without interrupting a power load in any one of the three phases and without transposing the relative positions of the phases out of their ordered sequence.

7 Claims, 55 Drawing Sheets

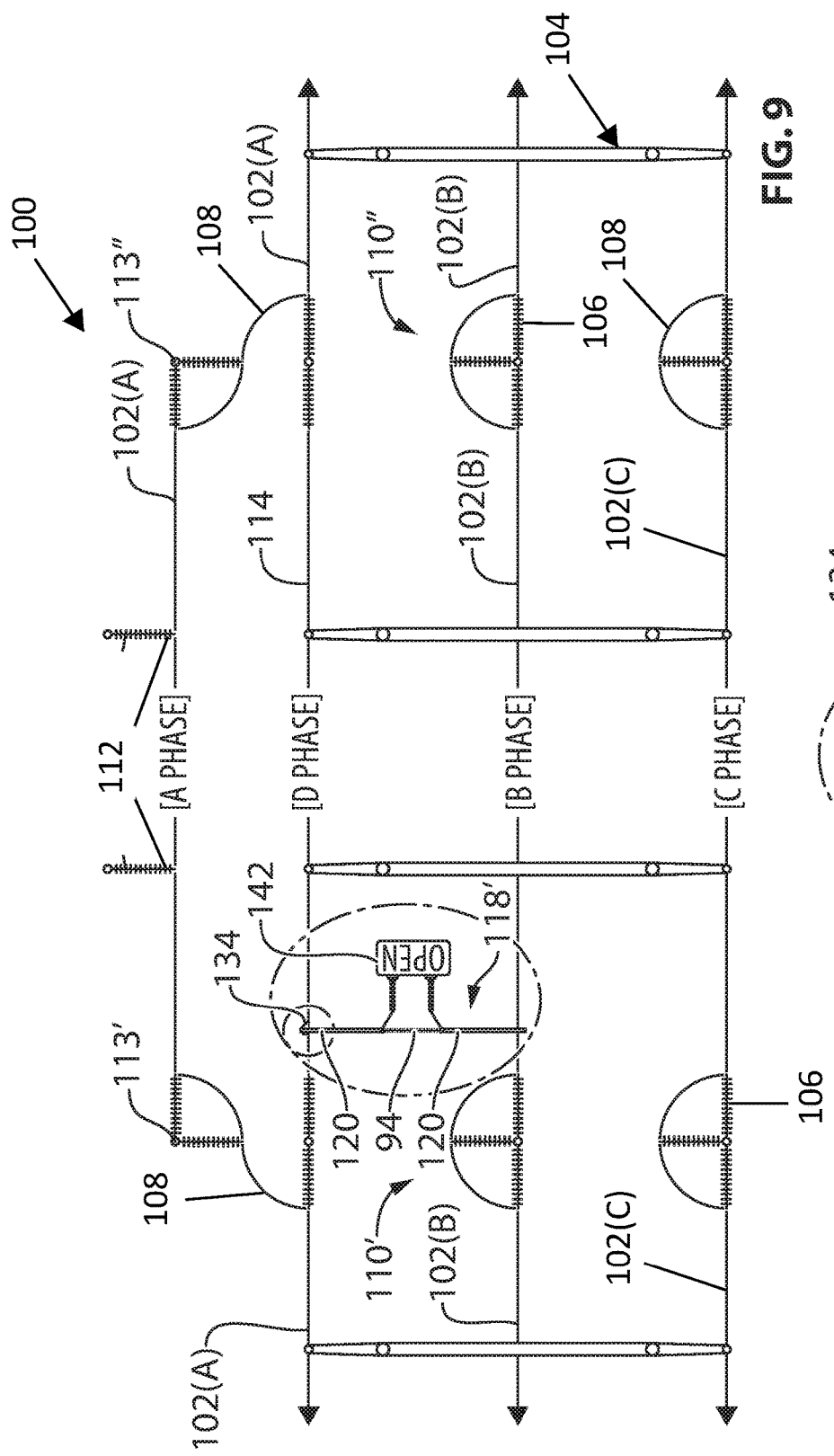
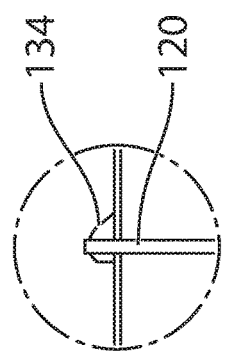
FIG. 9
FIG. 9A

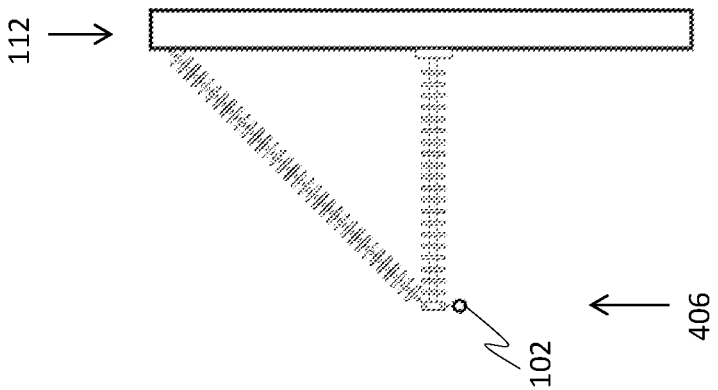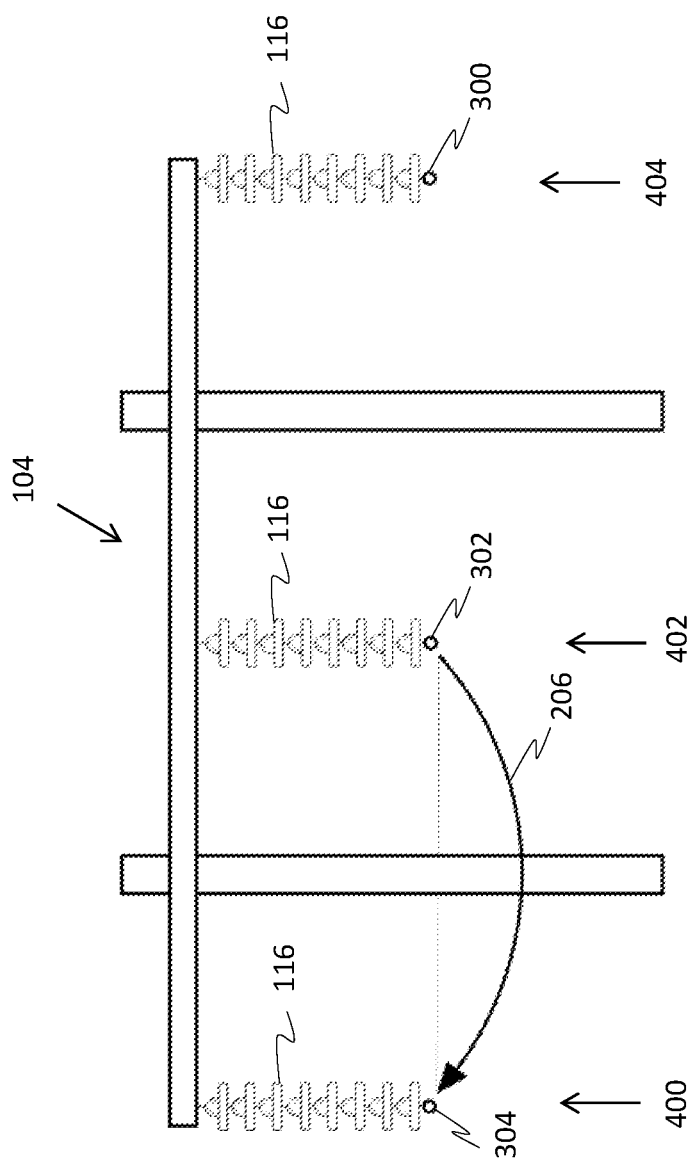
FIG. 53

LIVE CONDUCTOR STRINGING, MAINTENANCE AND REPAIR METHOD

FIELD OF THE INVENTION

The present invention relates generally to high voltage power transfer systems. In particular, the present invention relates to replacing conductors in a high voltage power transfer system.

BACKGROUND OF THE INVENTION

Users of large amounts of electrical power such as cities, manufacturing facilities, and other high-power users are often located quite a distance away from sources of electrical power such as hydroelectric dams and power plants. In order to deliver large amounts of power from the source of generation to the power consumers, large, high-capacity, high-voltage power lines are used.

Typically, alternating current ("AC") is generated in a three-phase configuration. For the purposes of this document, the three phases will be referred to as A, B and C phase. A phase, B phase and C phase are all transported over separate conductors. In some instances direct current (DC power) is used in which case two conductors are used and are referred to as A and C phase. Typically, the conductors are comprised of long wires supported on large support structures such as towers or power poles. The separate A, B and C phase conductors are typically attached to the same support structures on insulators.

From time to time, the power lines transporting the power may require maintenance. For example, a section of the conductor may need to be replaced, an insulator insulating the power line from the support structure may need to be replaced, or, the support structure itself may need repair or replacement. In some cases, conductors may be functioning properly, but need to be replaced by higher-capacity conductors in order to transport more power.

Typical maintenance on power lines requires that the power be shut off before the line can be worked on. High induction currents may be induced into a conductor located in the proximity of other high voltage conductors, thus creating a hazard in order to work on a particular conductor.

Shutting off the power creates a disruption of power delivery to customers. A power user may be forced to do without power during the time the power line is maintained, which is undesirable for a variety of reasons. To provide consumers power while a particular line is being worked on, the load may be shifted to other power lines to deliver the power to the end user. Unfortunately, shifting power to other transmission lines is not always possible because redundant systems may not exist, or transmission lines may already be operating at or near capacity level and not able to deliver the required power.

Previously, the applicant developed methods for conducting maintenance work on energized high voltage conductors in electrical transmission systems, such as the methods described in the U.S. Pat. No. 7,535,132 issued on May 19, 2009 to Quanta Associates, L.P. One of the methods taught in U.S. Pat. No. 7,535,132 involves moving each of the conductors needing replacement to a temporary position, stringing new conductors in or near the originating positions of the old conductors, transferring the power load from each of the old conductors to each of the new conductors using transfer buses, and removing the old conductors.

However, one problem that often occurs during the execution of the methods described in U.S. Pat. No. 7,535,132 is that the movement of each of the old conductors requiring replacement to temporary positions at the same time will often result in the transposition of the conductors carrying phases A, B and C, whereby, for example, if the phases were originally arranged in the relative horizontal positions of A-B-C prior to moving the phases to their temporary positions, the relative horizontal positions may often end up in the positions B-A-C after the movement has occurred. Furthermore, in order to achieve moving all three phases to temporary positions at the same time using the methods described in U.S. Pat. No. 7,535,132, it is often necessary to utilize long jumper cables to connect the temporarily relocated section of conductor to the remaining sections, which jumper cables for one phase must necessarily cross over the conductors of another phase while carrying a power load, as illustrated in FIG. 35 of U.S. Pat. No. 7,535,132. These are examples of what the Applicant refers to as illegal transpositions of the phase conductors. The disclosure of U.S. Pat. No. 7,535,132 is incorporated herein in its entirety, and is hereinafter referred to as the '132 patent.

Both scenarios described above results in the transposition of the phase conductors, leading to an imbalance in the impedances of the phase conductors and therefore, fluctuations in the voltage and current carried on the phase conductors. Such fluctuations, if large enough, will cause the protective relays to trip the breakers, causing a disruption in the delivery of power on the transmission lines being worked upon. To avoid this result, the owner of the power transmission line may choose to disable the safety relays while a live reconductoring project is underway. However, disabling the safety relays results in a risk that a sudden fluctuation in the voltage and current during the live reconductoring project may damage the transmission network.

Accordingly, it is desirable to provide an improved method to allow high voltage power transmission lines to be worked on, replaced or maintained without requiring power to stop being delivered or diverted over to other remote transmission lines, and without resulting in the illegal transposition of the phase conductors that could lead to faults in the transmission line.

SUMMARY

One example embodiment of the present invention provides a method for maintaining a section of an electrified, three-phase power conductor line, wherein the three phases are in a common plane, in an ordered sequence and strung between a set of support structures, wherein at least two equal potential zones are employed in communication with at least one of said three phases, the method comprising steps of:

a) positioning at least one auxiliary support substantially adjacent the set of support structures so as to support an electrified section of a first phase-needing-maintenance, b) moving said section of said first phase-needing-maintenance so as to be strung upon said at least one auxiliary support and said at least two auxiliary dead end supports, wherein said first and second dead end junctures are supported by said at least two auxiliary dead end supports, c) stringing a first new phase conductor between the set of support structures where the section was moved from, d) electrically connecting a first transfer bus and a second transfer bus to said first new phase conductor, e) electrically connecting said second conductor of said first transfer bus and said second conductor of said second transfer bus to a second phase section of a second phase-needing-maintenance that is proximate to said first phaseneeding-maintenance, wherein said second phase section comprises a third dead end juncture and a fourth dead end juncture, f) electrically connecting said first transfer bus so as to bring said first new phase conductor to an electrical potential that is equal to said second phase-needing maintenance, g) completing a first electrically parallel connection between said first new phase conductor and said second phase-needing-maintenance, h) electrically connecting said new phase conductor to a first segment of said second phase-needing-maintenance on opposite sides of said third dead end juncture, and electrically connecting said first new phase conductor to a second segment of said second phase-needing-maintenance on opposite sides of said fourth dead end juncture, so as to complete a second electrically parallel connection between said first new phase conductor and said second phase-needing-maintenance, i) electrically disconnecting said section of said second phase-needing-maintenance so as to isolate said second phase section of said second phase-needing-maintenance from said first and second segments of said second phase-needing-maintenance and said first new phase conductor, and j) maintaining said second phase section of said second phase-needing-maintenance.

Another example embodiment of the present invention provides a method for maintaining sections of electrically conductive phases in a three phase power conductor line, the three phases denoted as the A, B and C phases, wherein the three phases are parallel and spaced apart in an ordered sequence wherein the A phase is proximate to the B phase and the B phase is proximate to the C phase, but the A phase is not proximate to the C phase, and wherein the A, B and C phases are strung between support structures supporting the three phases suspended above a ground, and wherein maintenance work is performed on sections of the three phases without interruption of a power load in any one of the three phases and without transposing the relative positions of the A, B and C phases out of their ordered sequence, wherein at least two equal potential zones are employed in communication with at least one of said A, B and C phases.

Another example embodiment of the present invention provides a method of maintaining sections of electrically energized phases in a three phase power conductor line, the three phases being an A phase, a B phase and a C phase, the method comprising:

a) providing, between two support structures above a ground surface, the A phase is proximate to the B phase, the B phase is proximate to the C phase and the B phase is located between the A phase and the C phase with the phases all in a common plane;

b) without interrupting an alternating current power of the A phase, the B phase and the C phase, performing maintenance work on sections of the A phase, the B phase and the C phase;

c) without interrupting an alternating current power of the A phase, the B phase and the C phase, non-transposing the relative positions of the A phase, the B phase and the C phase; and, d) employing at least two equal potential zones in conjunction with at least one of said A phase, B phase and C phase.

As described in the '132 patent entitled Live Conductor Stringing and Splicing Method and Apparatus, the disclosure of which is incorporated herein by reference in its entirety, a person ordinarily skilled in the art will readily understand how to employ the aforementioned stringing method described above, including the construction of equal potential zones, the use of hot line tools and live line work methods that are described in the '132 patent specification. In particular, see FIGS. 57 through 98 and column 22, line 48 through column 33, line 60 of patent '132.

BRIEF DESCRIPTION OF THE DRAWINGS

FIG. 9 is a schematic diagram illustrating the power transfer system of FIG. 8 showing a first temporary transfer bus partially installed.

FIG. 9A is a detail view of a portion of the schematic diagram illustrating the power transfer system of FIG. 9 showing the electrical connection between a first temporary transfer bus and a phase conductor.

FIG. 50 depicts the addition of a temporary support structure, a transfer of the C phase conductor to the temporary support structure and the stringing of a first replacement conductor where the C phase was moved from.

FIG. 53 depicts the transfer of the electrical load from the second replacement conductor to the third replacement conductor.

DETAILED DESCRIPTION OF EMBODIMENTS OF THE INVENTION

Figure 1:
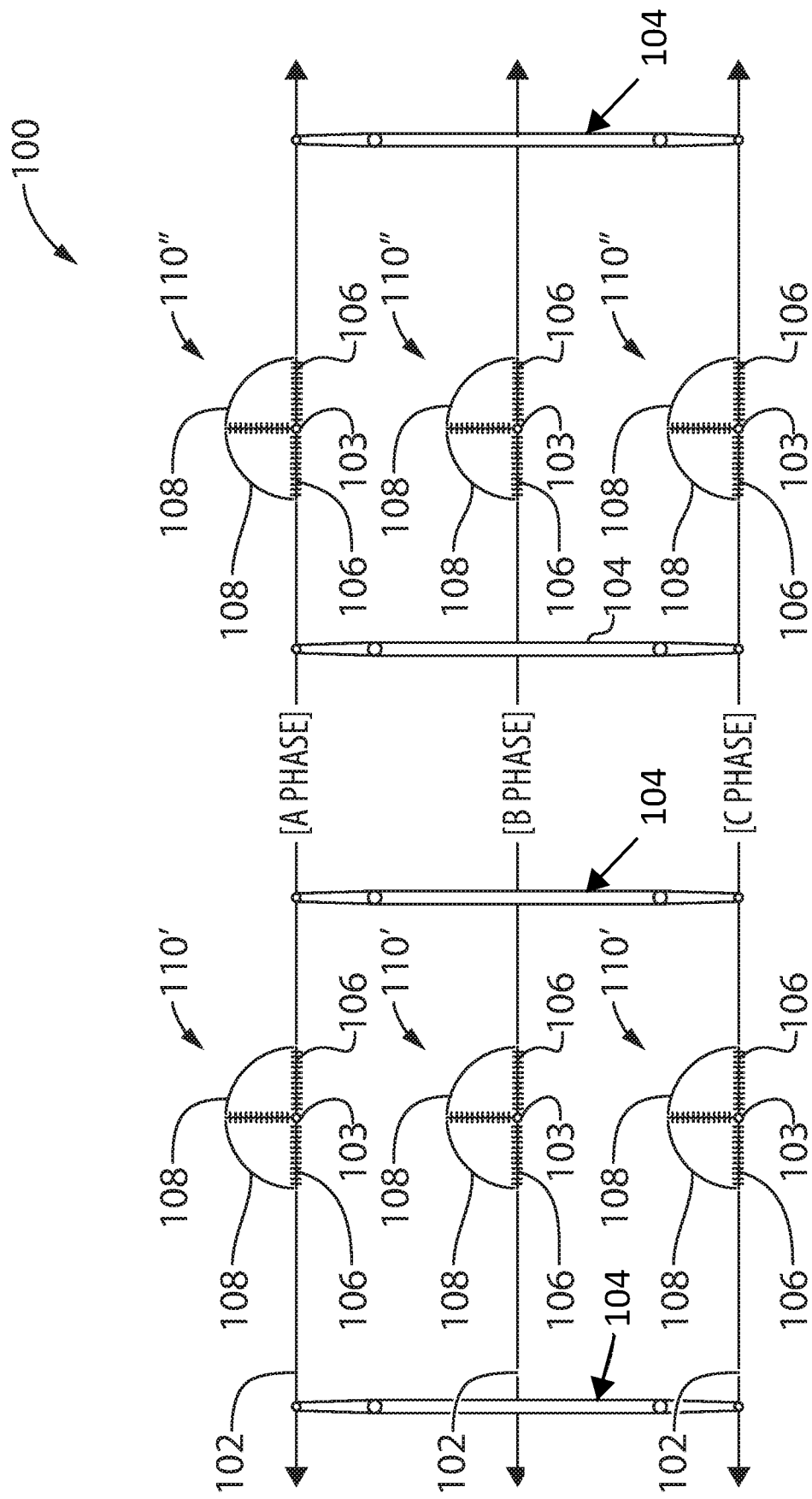
FIG. 1 is a schematic diagram illustrating a power transfer system for transferring power in three electrical phases, one electrical phase being transferred per conductor.

The invention will now be described with reference to the Figures, in which like reference numerals refer to like parts throughout. An embodiment in accordance with one aspect of the present invention provides an improved method for replacing high-voltage power transmission conductors without affecting power users or power suppliers. The method avoids a requirement of having the power transmitted by the conductors shut off or diverted to other remote power transmissions systems. The method also avoids an illegal transposition of the phase conductors when transferring the power loads from a phase conductor to a proximate phase conductor during the maintenance or repair work, which illegal transposition may otherwise lead to faults in the transmission line.

As stated above, power delivery systems such as high voltage power lines often transport Alternating Current ("AC") power in a three phase configuration. Direct Current ("DC") power systems transfer power over two phases. Each phase is transferred over a separate conductor. For the purposes of this specification, each of the letters A, B, and C will represent one of three phases of a three-phase AC system. The methods and apparatus described herein can be adapted for use in a DC system by applying the methods and apparatus described herein for the A and B phases for the two phases of a DC system and where reference is made, for example in the claims, to the A, B and C phases, such references are intended to include merely the A and B phases for a DC implementation. Systems carrying voltages of 44 kV or higher are contemplated in the embodiments of the present invention.

In addition, throughout this specification there is often reference to a fourth phase conductor, referred to as the "D phase" conductor. The D phase conductor, as that term is used in this specification, denotes a section of a phase conductor that is not electrically connected to any of the phase conductors that are carrying the A, B or C phases. In other words, the D phase is not carrying the current of any of the A, B, or C phases. Throughout the Figures illustrating examples of embodiments of the present invention, a phase conductor labelled as the "D phase" conductor in one figure may be labelled as an A, B or C phase conductor in the next Figure, where the "D phase" conductor becomes electrically connected to another phase conductor carrying the A, B or C phase current. For example, see FIGS. 12 and 13, wherein the "D phase" conductor 114 in FIG. 12 becomes a "B phase" conductor 114 in FIG. 13, upon establishing an electrical connection between the conductor 114 and the original B phase conductor 102 (B) when the breaker 142 connected to the second transfer bus 118″ is closed. In each Figure of this specification, a phase conductor is either labelled "D phase", when it is electrically isolated from any other phase conductors in the power transfer system 100, or it is labelled "A phase", "B phase" or "C phase" when the phase conductor is carrying the A, B or C phase current, or is otherwise electrically connected to a phase conductor that carries either the A, B or C phase current.

In an embodiment of the invention, a section of a first conductor located between two dead end junctures is moved to a temporary position on temporary support structures. The dead end junctures of the section of the first conductor are also transferred to the temporary positions on the temporary support structures. A new conductor is then strung in or near the old conductor's originating position, and the power load from a first proximate phase-needing-maintenance is transferred to the new conductor. Once the power load from the first proximate phase-needing-maintenance is transferred to the new conductor, a section of the old conductor of the first proximate phase-needing-maintenance is removed and replaced with a second new conductor. Once the second new conductor is in place, the power load of a second proximate phase-needing-maintenance is transferred to the second new conductor, enabling work to be conducted on a section of the second proximate phase-needing-maintenance conductor. This procedure is repeated until all of the proximate phase conductors requiring maintenance work have had their power loads transferred to other phase conductors. Once all of the maintenance work is complete, the power loads of each phase are consecutively transferred to the phase conductors strung into the positions where each phase was originally carried. This procedure provides for maintenance work to be conducted on high voltage transmission lines, without having to interrupt the supply of power to users and avoiding the illegal transposition of the respective phase conductors during the transfer of the power load from one phase conductor to an adjacent phase conductor.

FIGS. 1 through 43 generally show, in schematic diagrams, a power transfer system 100 undergoing consecutive stages of a method in accordance with an embodiment of the invention, so that a section of a phase conductor to be worked on may be electrically isolated from the system power. As used herein, the term "maintenance work" includes the replacement of the phase conductor, and may also include maintenance of the conductor, replacement of insulators, resagging of the conductor, all without disrupting the transmission of power to downstream power customers.

In many instances there may be miles between dead end junctures. If the distance between the dead end junctures for a particular section of phase conductor to be worked upon is too great for pulling new conductors through the system 100, then new or temporary dead end junctures may be constructed as described later herein.

The temporary relocation of a phase conductor, the stringing of new phase conductor in a position at or near the originating position of the phase conductor, and the process of successively transferring the power load from an adjacent phase to the new conductor such that the next phase may be isolated and worked upon, will now be described with reference to FIGS. 1-43.

Figure 2:
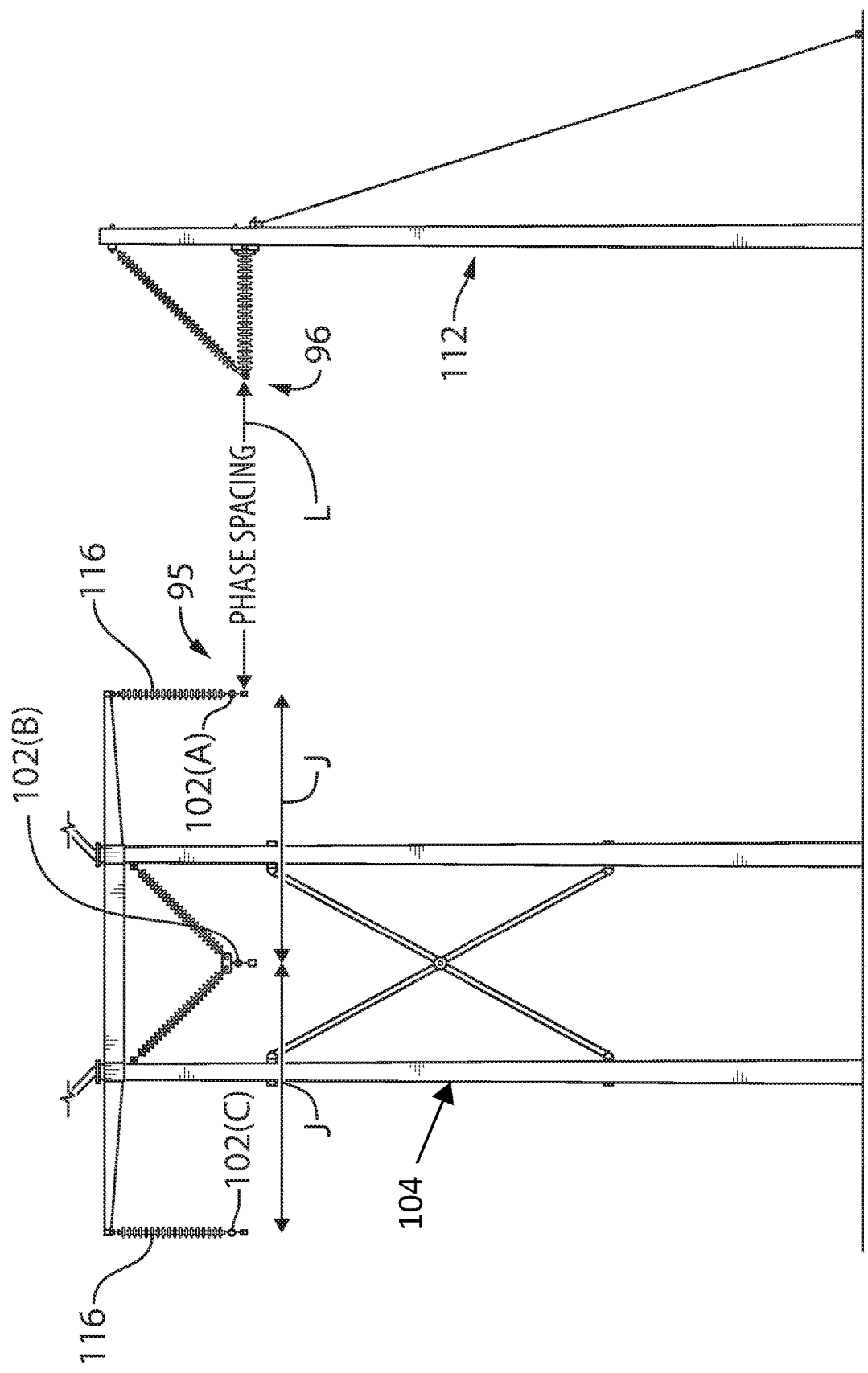
FIG. 2 is a side view of a support structure for a power transfer system showing a temporary support structure located proximate to a permanent support structure configured for the temporary relocation of a phase conductor at a distance substantially equal to the phase spacing between the other phase conductors.
Figure 55:
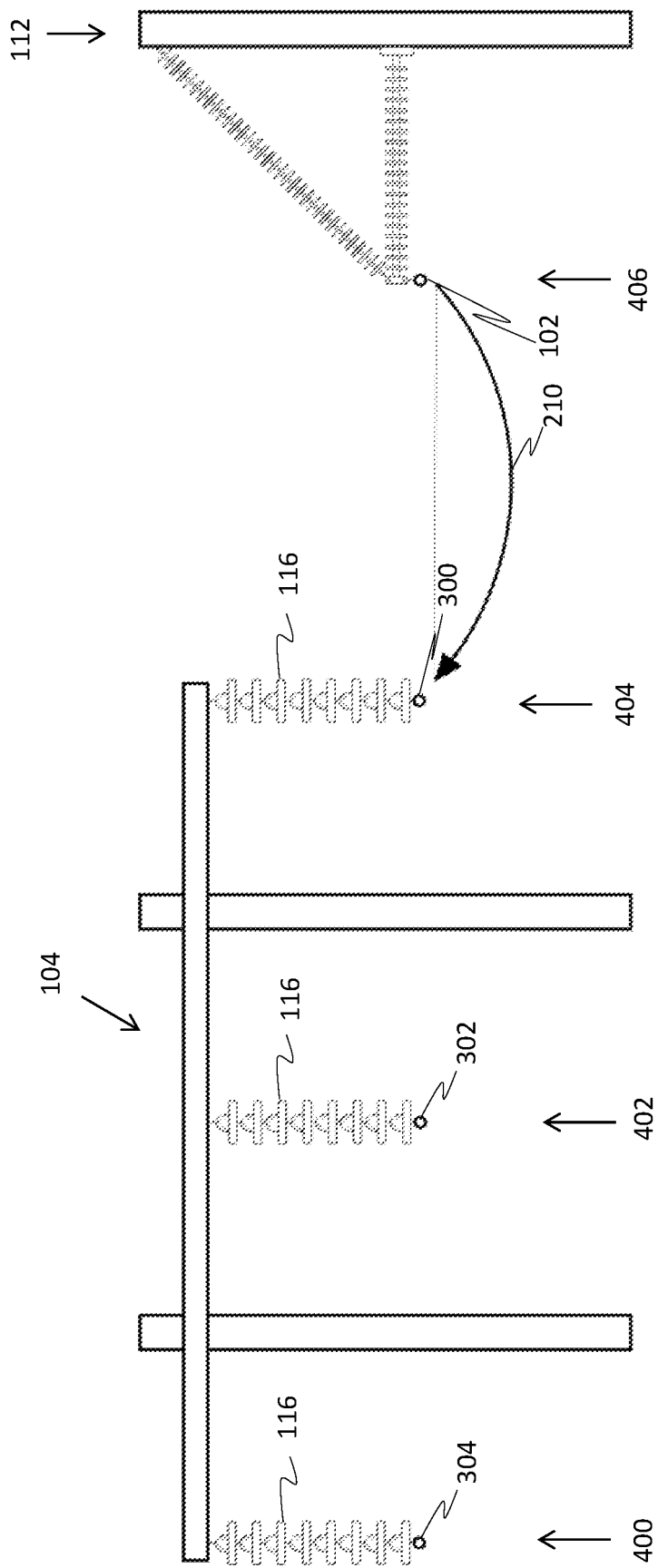
FIG. 55 depicts the transfer of the electrical load from the C phase conductor to the first replacement conductor.
Figure 56:
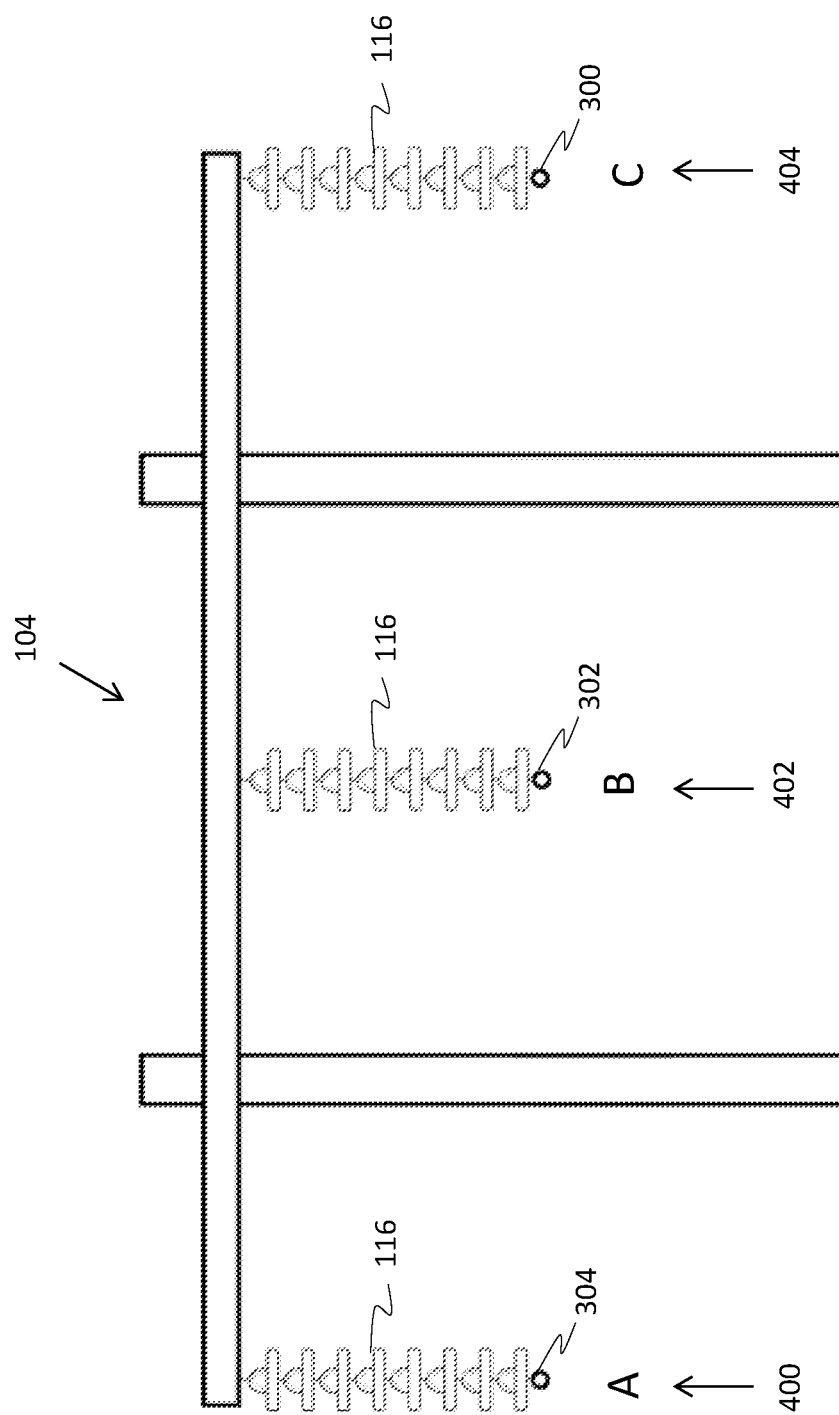
FIG. 56 depicts the three replacement conductors each carrying the three phases A, B and C in the ordered sequence of FIG. 49, the temporary support structure and the original C phase having been removed.

FIG. 1 is a schematic diagram for power transfer system 100. The power transfer system 100 includes three conductors 102, labeled A phase, B phase and C phase, indicating that each of the conductors 102 carries one of the A, B, or C phase load. The system 100 transfers power in the form of AC, although this is not intended to be limiting as the method described herein may be used for DC power systems. The conductors 102 are supported by support structures 104. Each support structure 104 may include or be in the form of a power pole or a tower. One example of a support structure 104, not intended to be limiting, is seen in FIG. 2. Other support structures are seen in FIGS. 53, 55 and 56 of the '132 patent. A conductor 102 is attached to dead end support structures 103 via insulators in tension 106 (hereinafter insulators 106). As seen in FIG. 1, dead end junctures 110', 110" are formed by a pair of insulators 106 when in-line with conductors 102 and under tension with conductors 102. Jumper cables 108, as shown in FIG. 1, electrically connect conductors 102 around insulators 106 and dead end support structures 103 to an oppositely disposed section of conductors 102.

Another way conductor 102 may be supported by support structure 104 is shown for example in FIG. 2. The conductor 102 hangs from tangent insulator 116. Tangent insulator 116 is supporting both the conductor tension and the weight of conductor 102. When the weight of conductor 102 is being supported by tangent insulator 116, jumper cables 108 are not required.

Figure 3:
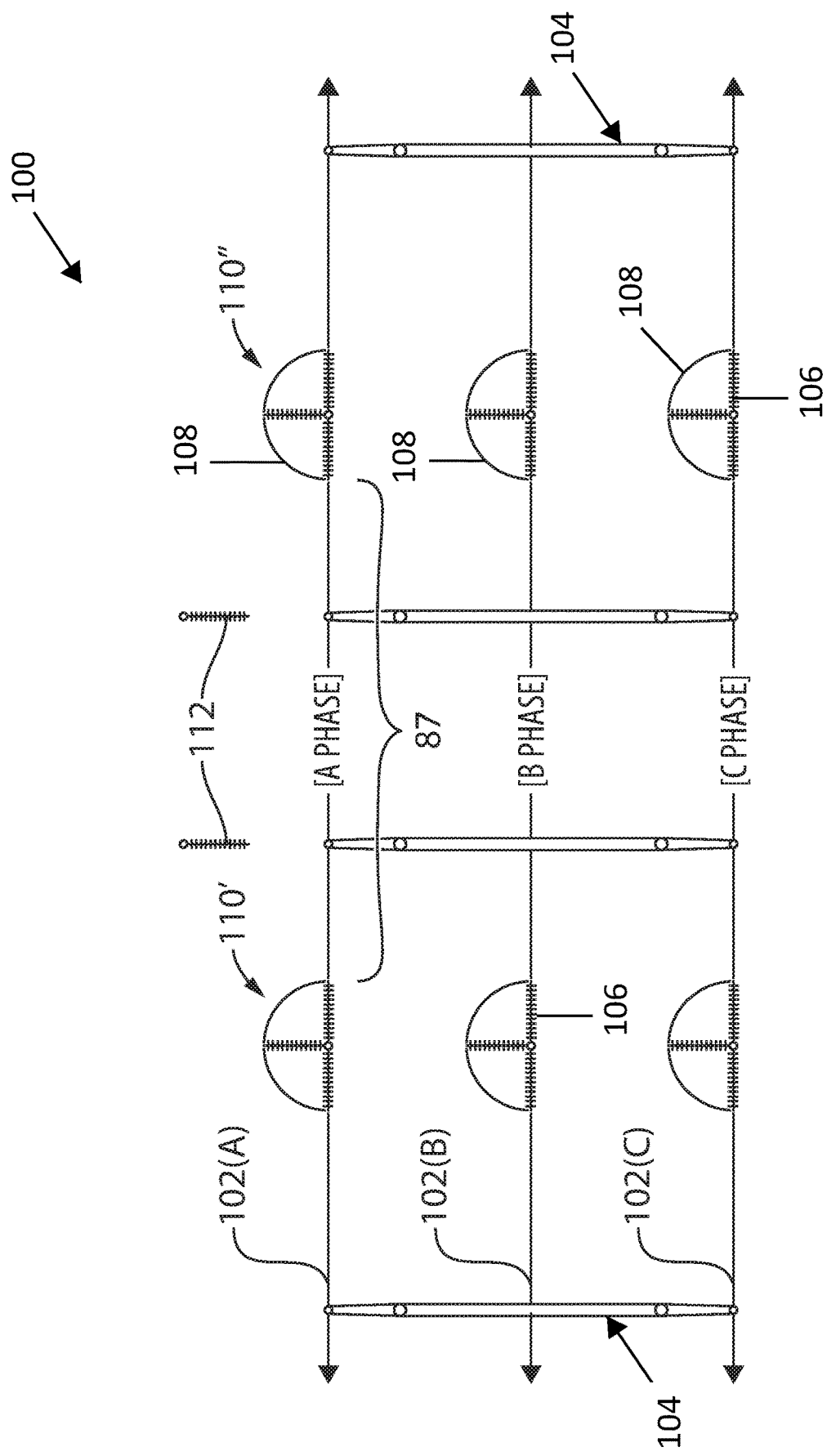
FIG. 3 is a schematic diagram illustrating the power transfer system of FIG. 1 showing temporary support structures added in accordance with the invention.
Figure 54:
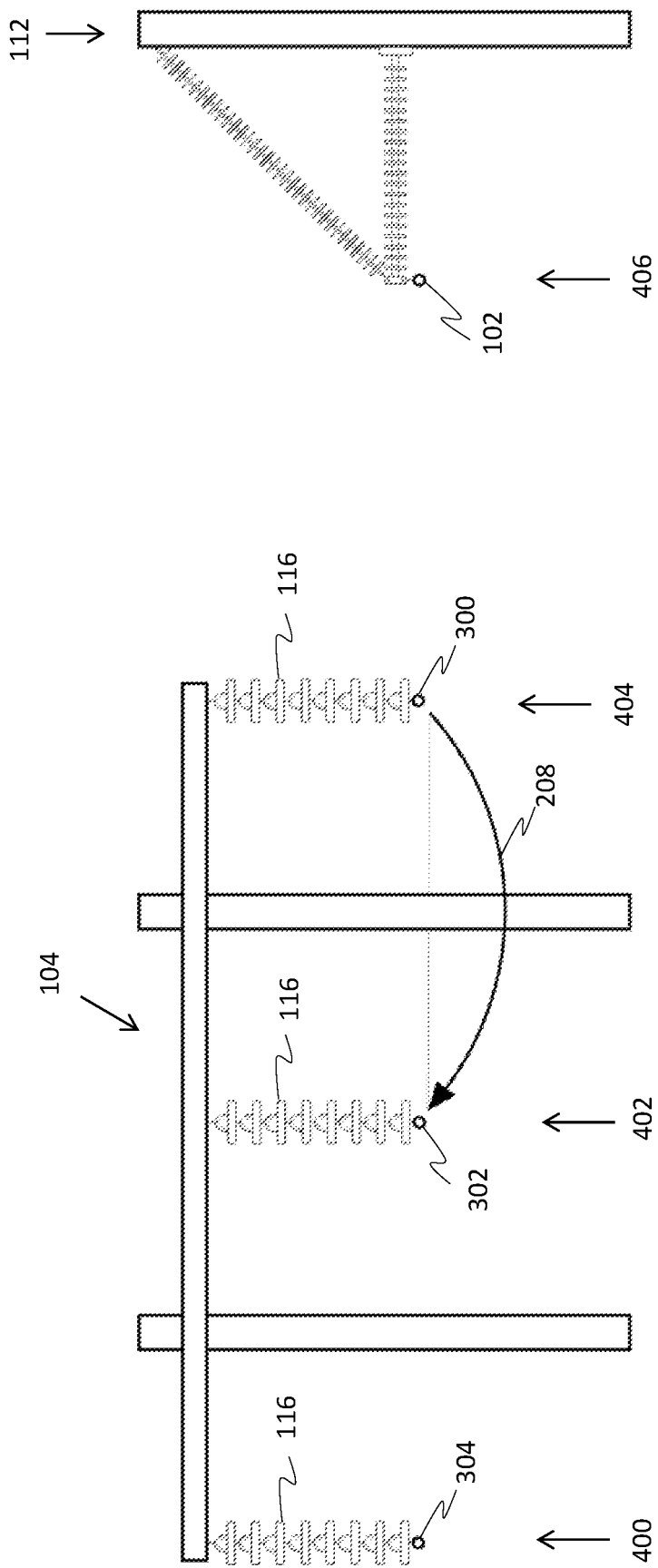
FIG. 54 depicts the transfer of the electrical load from the first replacement conductor to the second replacement conductor.

In some embodiments of the present invention, a temporary support structure (otherwise referred to as an auxiliary support) 112 is constructed near the location of an existing support structure 104, as shown in FIGS. 2 and 3. The temporary support structure 112 is preferably located near or adjacent the location of an existing support structure 104, whereby the distance L between the original location 95 and the temporary location 96 of the A phase conductor 102 is substantially equivalent to the phase spacing J between phases A and B and between phases B and C, when those phase conductors, 102 (A), 102 (B) and 102 (C) respectively, are suspended on the existing support structure 104. The temporary support structure 112 may be located adjacent the existing support structure 104, or in the alternative the temporary support structure 112 may be connected to the support structure 104 as shown in FIG. 54 in the '132 patent, for example.

Figure 4:
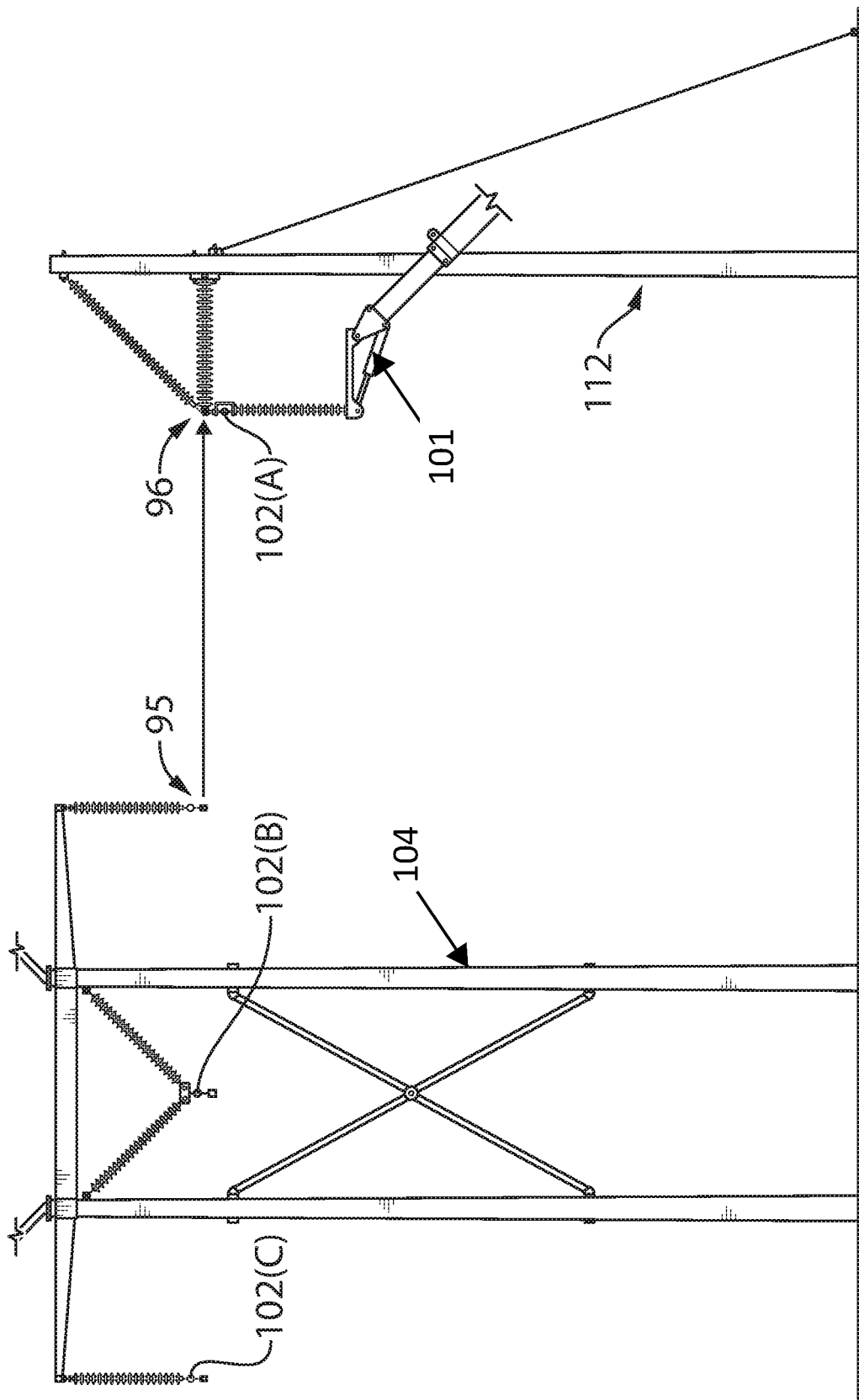
FIG. 4 is a side view of the support structure of FIG. 2, illustrating the relocation of a phase conductor from its permanent support structure to a temporary location on a temporary support structure.

Once the temporary support structures 112 are in place, a section 87 of the A phase conductor 102 (A) located between dead end junctures 110' and 110" is removed from the original location 95 on the existing support structures 104 and transferred to the temporary position 96 on the temporary support structure 112. FIG. 4 shows the transfer of the A phase conductor 102 (A) from its original location 95 on support structure 104 to the temporary location 96 on temporary support structure 112, using a robotic mechanical arm device 101, such as the Remote Manipulator for Manipulating Multiple Sub-conductors in a Single Phase Bundle described in the Applicant's U.S. Pat. No. 8,573,562, or similar robotic mechanical arm device adapted to manipulate heavy energized conductors such as the A phase conductor 102 (A).

Figure 5:
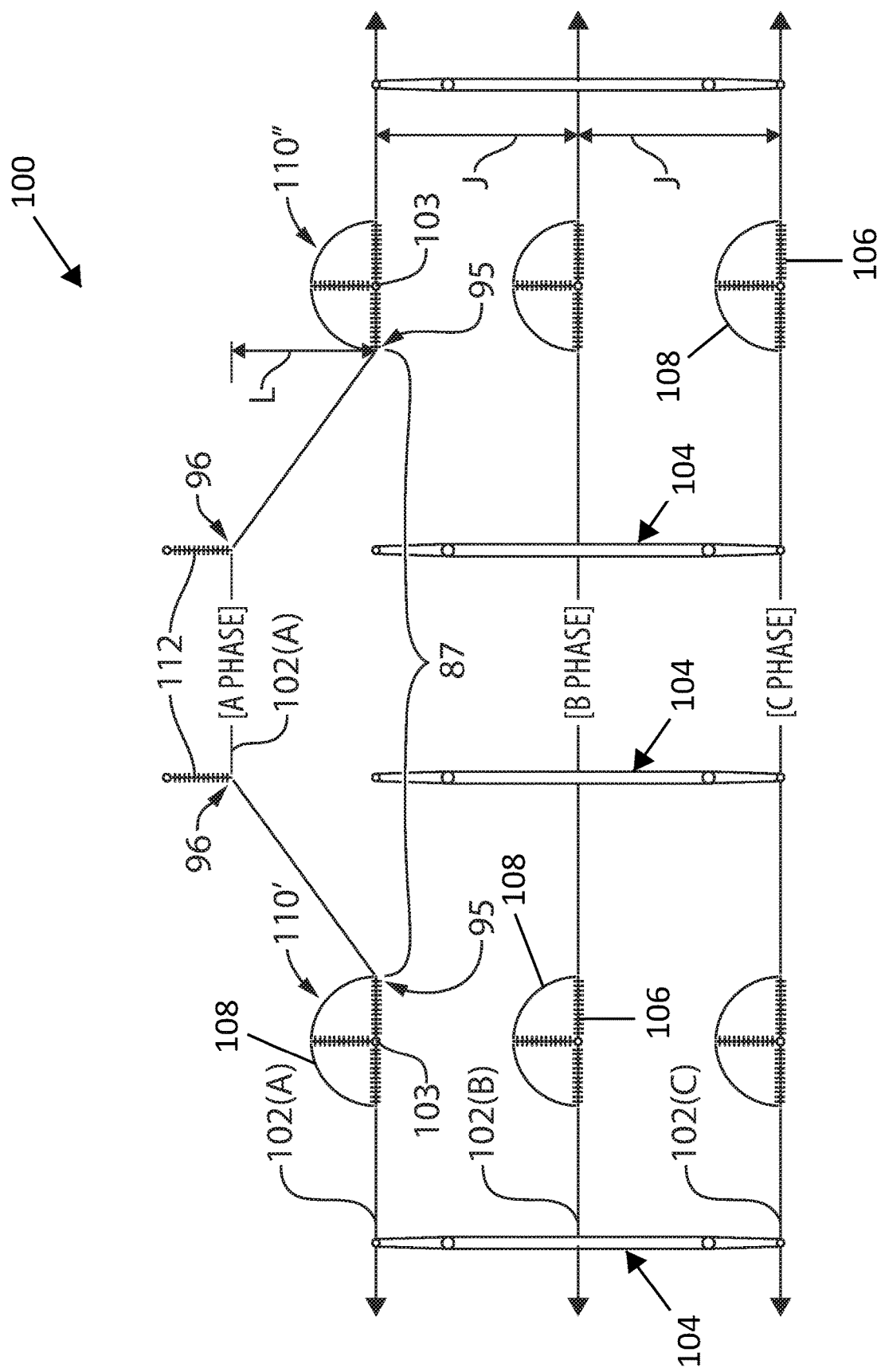
FIG. 5 is a schematic diagram illustrating the power transfer system of FIG. 3 showing the relocation of a phase conductor to a temporary location on temporary support structures.

As seen in FIG. 5, although there are only two temporary support structures 112, it will be appreciated by a person ordinarily skilled in the art that a section of phase conductor 102 to be replaced may be supported by numerous support structures 104 and that more than two temporary support structures 112 may be required to support the section of the phase conductor 102 that needs to be transferred to a temporary location 96. Furthermore, it will be appreciated by a person skilled in the art that a section of a different phase conductor, such as a section of the C phase conductor 102 (C) illustrated in FIG. 3, may alternatively be moved to a temporary position 96 adjacent the originating position 95 of conductor 102 (C) in accordance with the procedure described above with respect to conductor 102 (A) and that such procedure would be within the scope of the present invention described herein.

Figure 6:
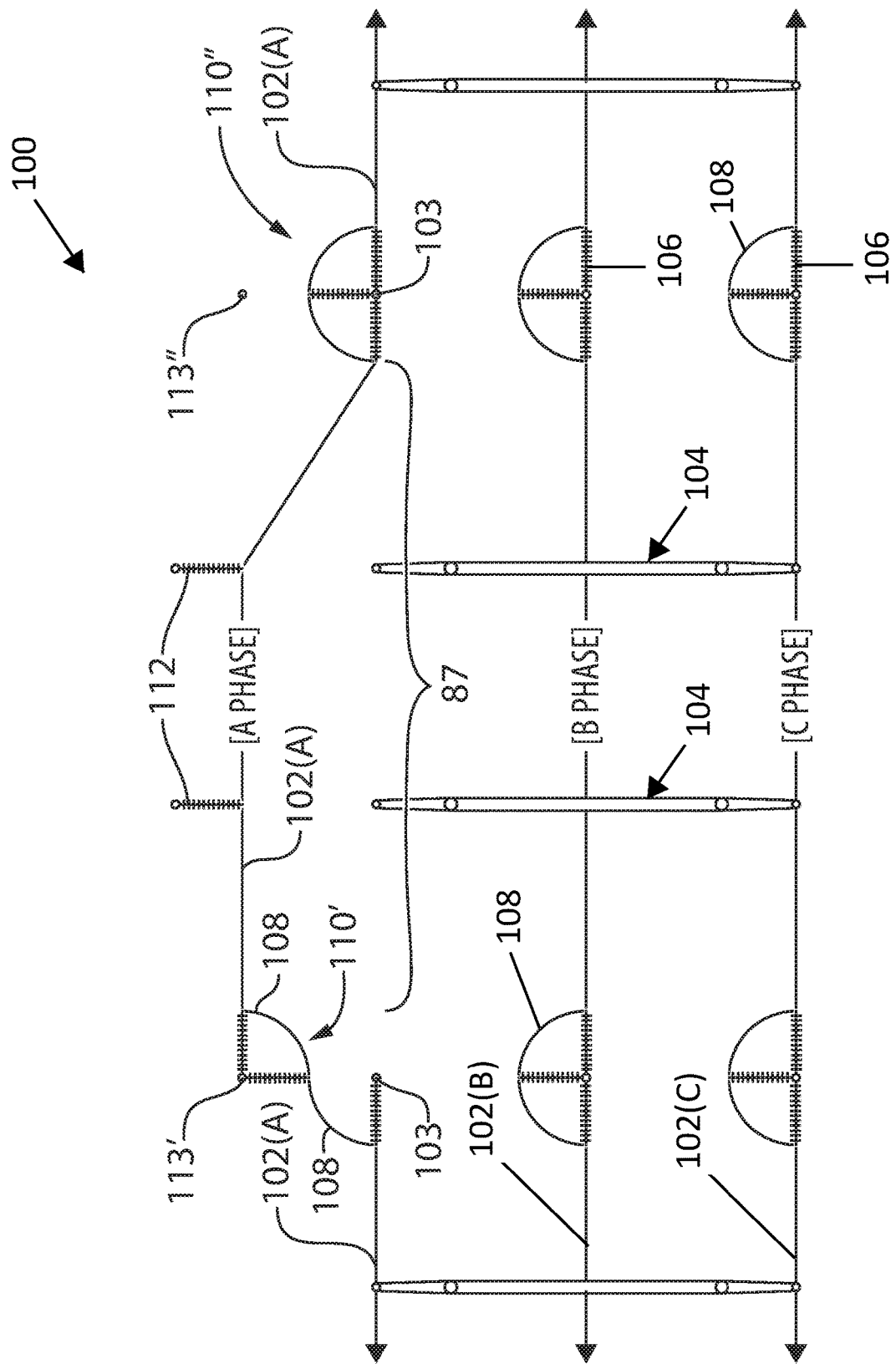
FIG. 6 is a schematic diagram illustrating the power transfer system of FIG. 5 showing the relocation of a first dead end to a temporary location.
Figure 7:
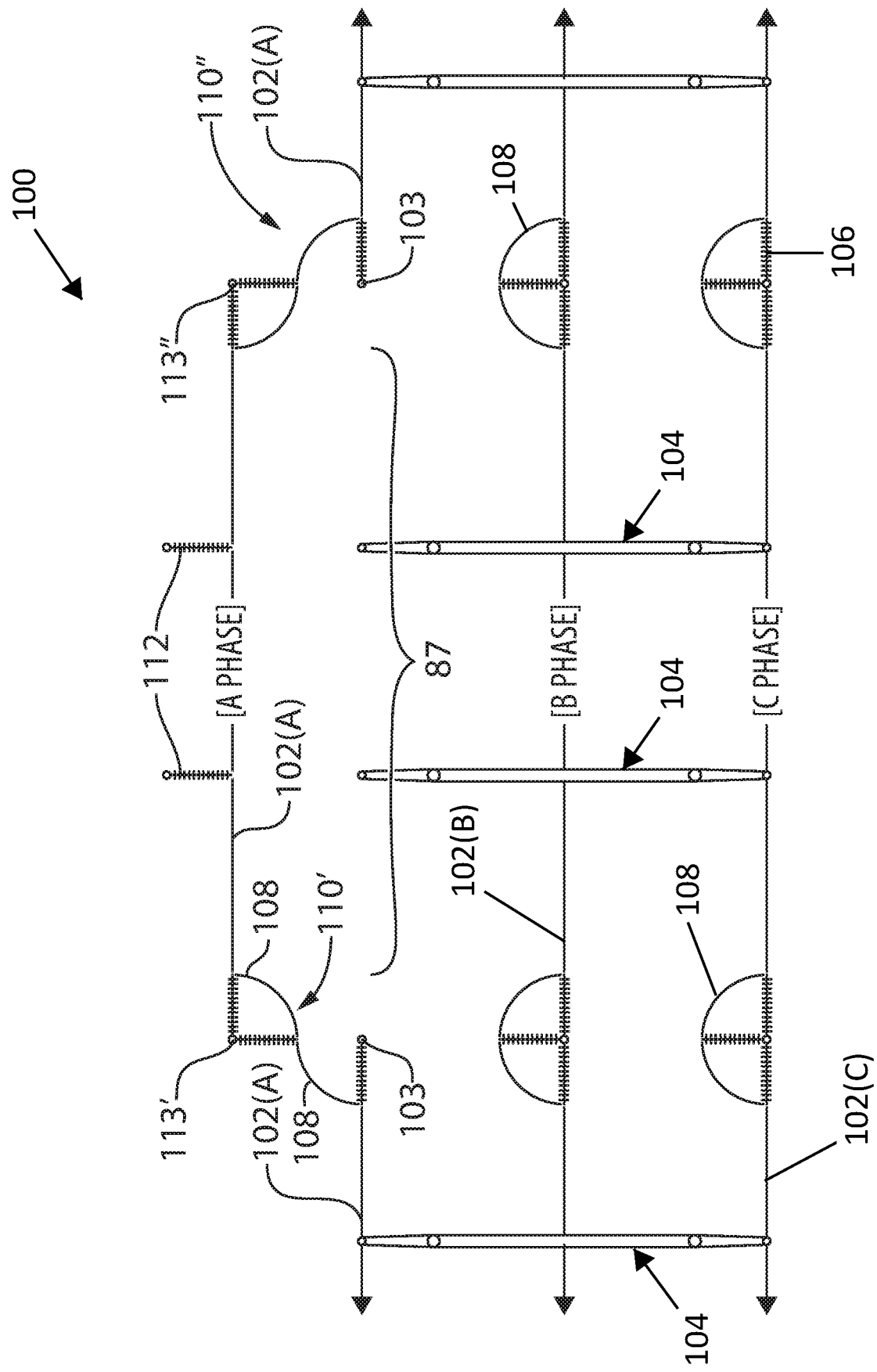
FIG. 7 is a schematic diagram illustrating the power transfer system of FIG. 6 showing the relocation of a second dead end to a temporary location.

As illustrated in FIGS. 6 and 7, once the section 87 of phase conductor 102 (A) that is the subject of maintenance work has been moved to temporary support structures 112, each of the dead end junctures 110', 110" at either end of the section 87 of phase conductor 102 (A) are transferred to temporary dead end poles (otherwise referred to as auxiliary dead end supports) 113', 113". It will be readily understood by a person ordinarily skilled in the art, having read this specification, that although two temporary support structures 112, 112 are illustrated in FIG. 7, that it is possible to carry out the procedure described herein utilizing a single temporary support structure 112, or otherwise to utilize more than two temporary support structures 112, to support a section 87 of phase conductor 102 (A).

Figure 8:
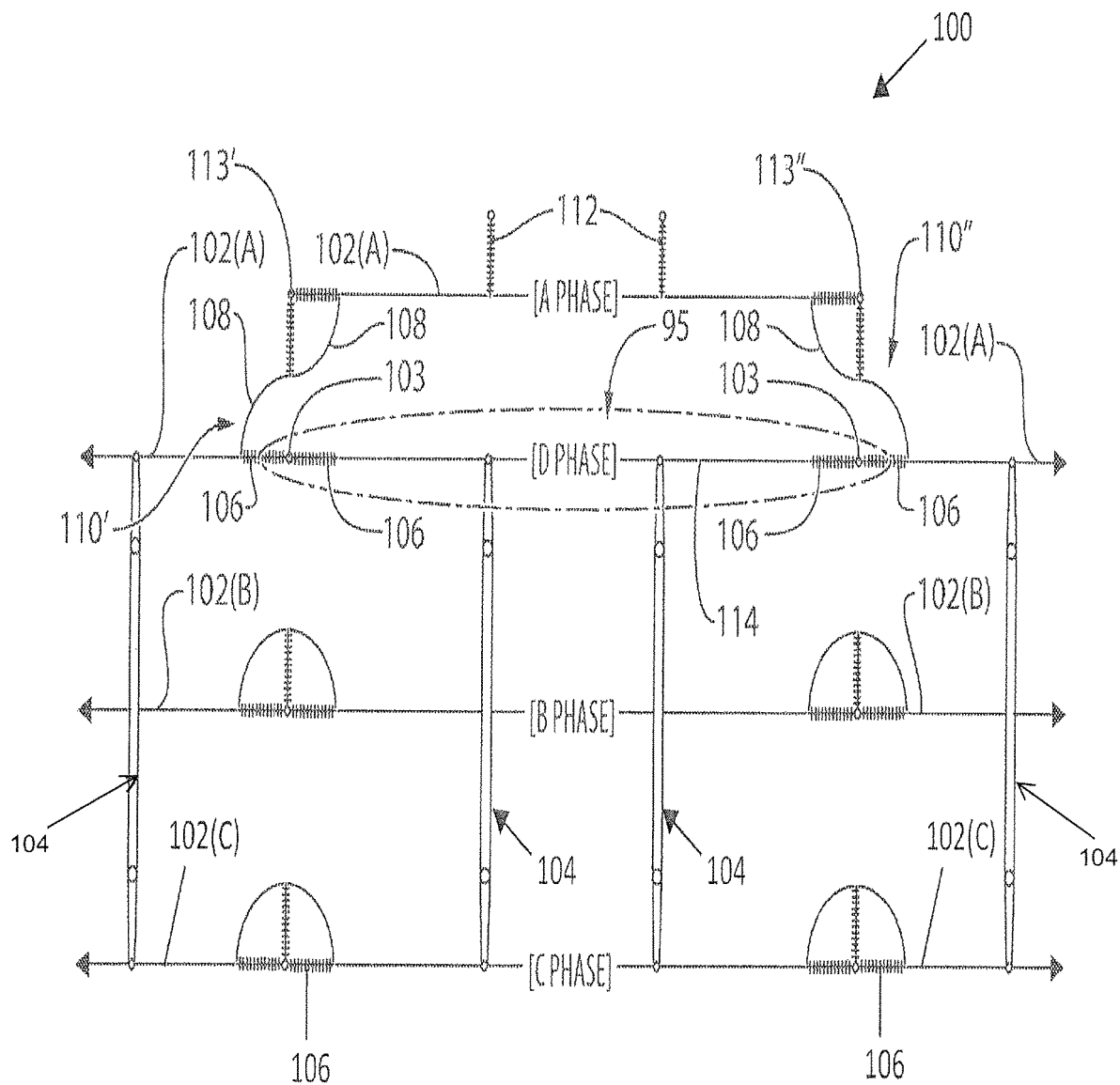
FIG. 8 is a schematic diagram illustrating the power transfer system of FIG. 7 showing new conductor installed between new dead end structures.

The section 87 of conductor 102 (A) is mounted to the temporary dead end pole 113', 113" while the jumper cable 108 remains attached to the phase conductor 102 (A), such that the power load on the phase conductor 102 (A) continues to be transferred around the dead end juncture 110', 110" by the jumper cables 108 while the section 87 of phase conductor 102 (A) is being relocated. FIG. 8 shows a first new phase conductor 114 (also referred to as the D phase) strung into the original location 95 of the A phase conductor 102 (A). The first new phase conductor 114 becomes the D phase conductor, as the new phase conductor 114, with the exception of any induced current caused by the surrounding current-carrying phases, initially does not carry any power load after being strung into place.

In many of the schematic diagrams of this patent specification, beginning with FIG. 8, an ellipses or a circle is sometimes used to highlight a feature illustrated in the schematic diagram that has been added or which has changed from the immediately preceding Figure. For example, FIG. 8 shows an ellipses around the new phase conductor 114 strung into the original location 95 of the A phase conductor 102 (A), which is a new feature not illustrated in the immediately preceding FIG. 7. It is understood that such ellipses and circles are merely included to clearly illustrate the changes that occur in the sequential steps of a preferred embodiment of the present method invention described herein, and are not themselves representing features of the power transfer system 100.

Once the new phase conductor 114 is in place, the power load is transferred from an adjacent phase conductor 102 to the new D phase conductor 114. In the example illustrated in FIGS. 9-20, the B phase load in conductor 102 (B) will be transferred to the D phase conductor 114. One way to accomplish the power transfer is with a temporary transfer bus 118', 118".

Figure 43:
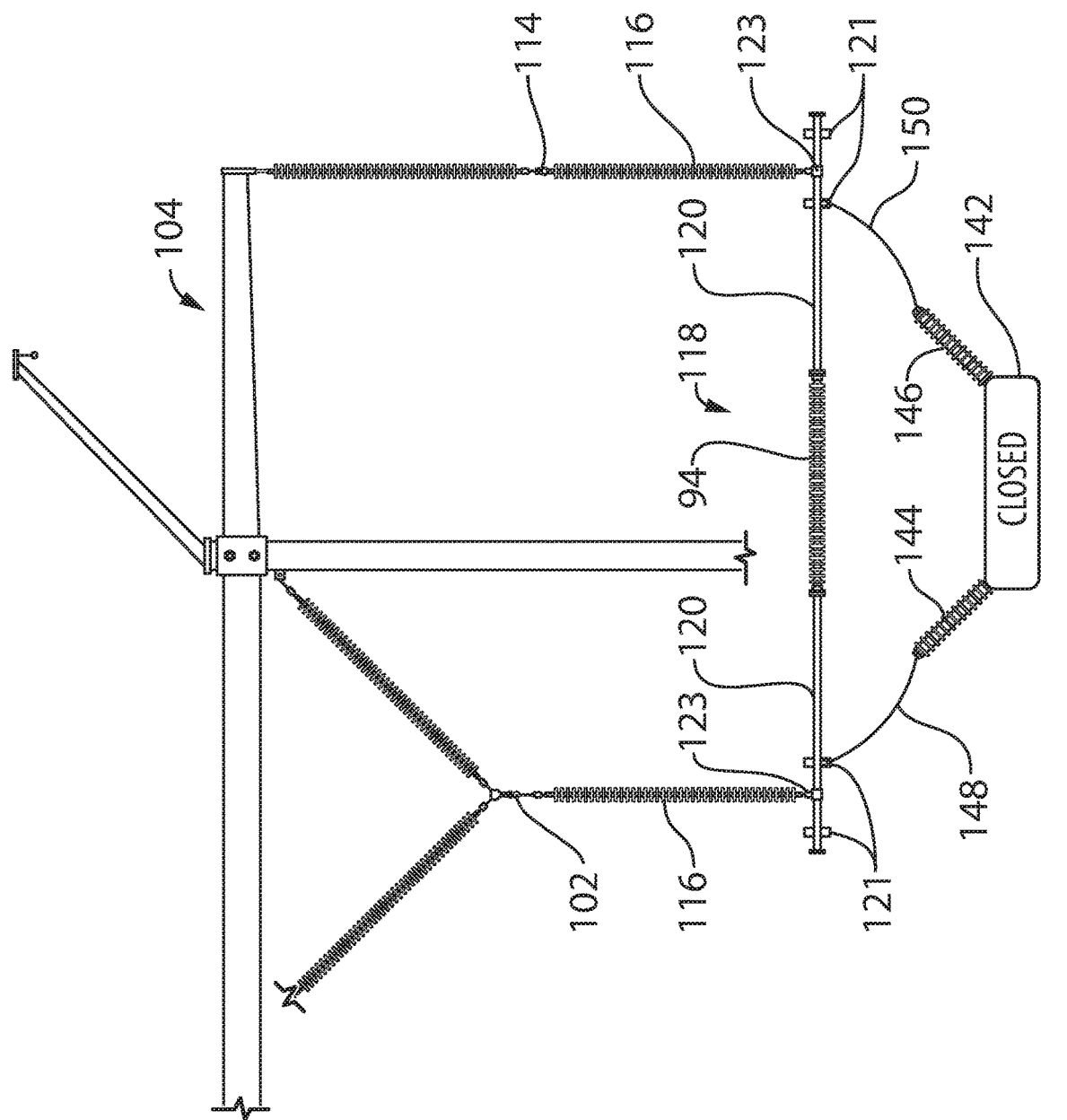
FIG. 43 is a side view of a temporary transfer bus suspended from two tangent insulators each supported on a phase conductor and connected to a closed breaker with jumper cables.
Figure 45:
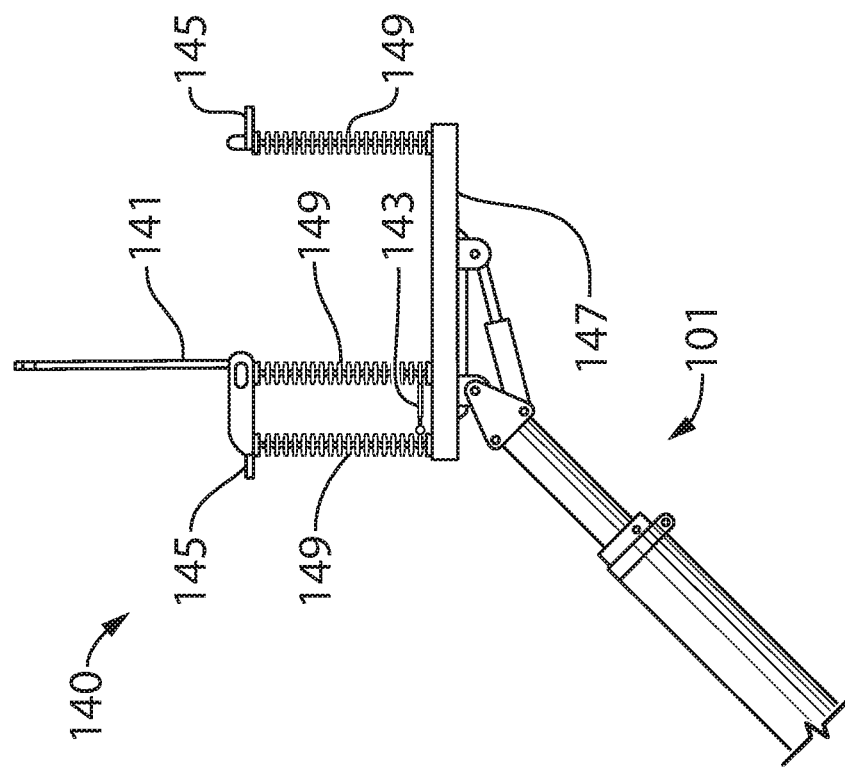
FIG. 45 is a top view of an air break switch in an opened position.
Figure 44:
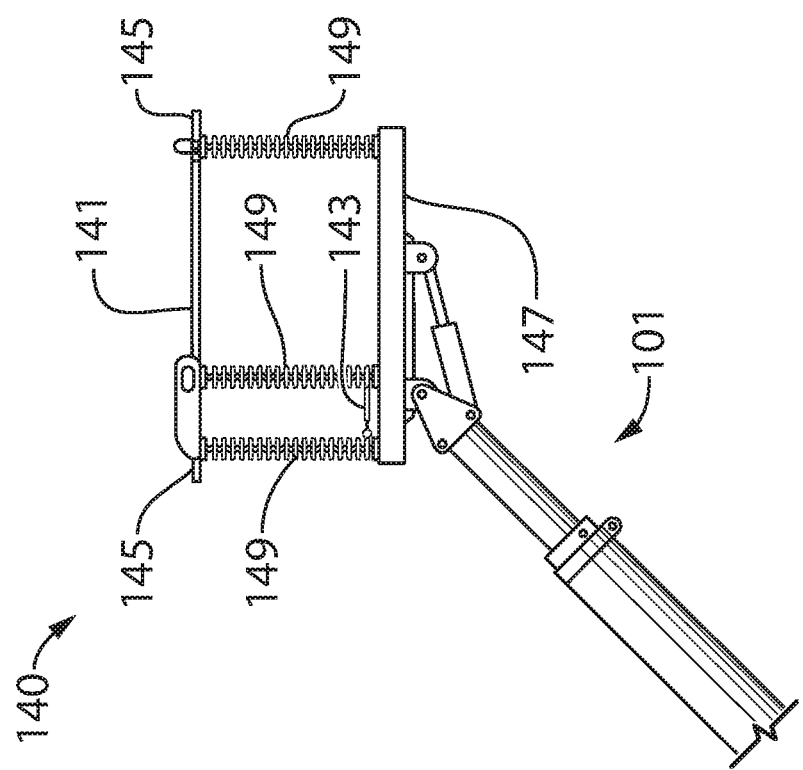
FIG. 44 is a top view of an air break switch in a closed position.

FIG. 43 shows a preferred embodiment of a temporary transfer bus 118 constructed of substantially rigid conductors 120, 120, an insulator 94 located between the two conductors 120, 120, arranged in a substantially co-linear relationship with respect to the conductors 120, 120, bus clamps 123, 123 and a plurality of connectors 121 for temporarily attaching a jumper cable 108 or other conductor to one of the conductors 120 of the transfer bus 118. Each of the conductors 120 of the transfer bus 118 are attached to a tangent insulator 116 by means of a bus clamp 123. Each tangent insulator 116 is suspended from either an existing phase conductor 102 or a new phase conductor 114. Once the temporary transfer bus 118 is in place, there is no electrical connection between the rigid conductors 120 of the transfer bus 118 due to the intervening transfer bus insulator 94. An electrical connection may be established across the insulator 94 of the transfer bus 118 by means of a jumper cable 108 attached to one or more of a plurality of connectors 121 located on each of the rigid conductors 120. Optionally, and as further discussed below and illustrated in FIG. 43, the electrical connection across the insulator 94 of the transfer bus 118 may also be established by means of a switch 140 (illustrated in FIGS. 44 and 45) or preferably, a breaker 142, whereby jumper cables 148, 150 are used to connect each of the first and second bushings, 144, 146 of the breaker 142 to the first and second rigid conductors 120, 120 respectively of the transfer bus 118.

As mentioned above, care must be taken when connecting or disconnecting an energized conductor from another conductor in high voltage applications such as the voltages associated with high voltage power lines, because when the conductors are near each other, either before connection or after the disconnection, a large potential will exist between the energized conductor and the non-energized conductor. Due to the large electrical potential between the conductors, large arcs can form between the conductors if the difference in potential is high enough.

Figure 48:
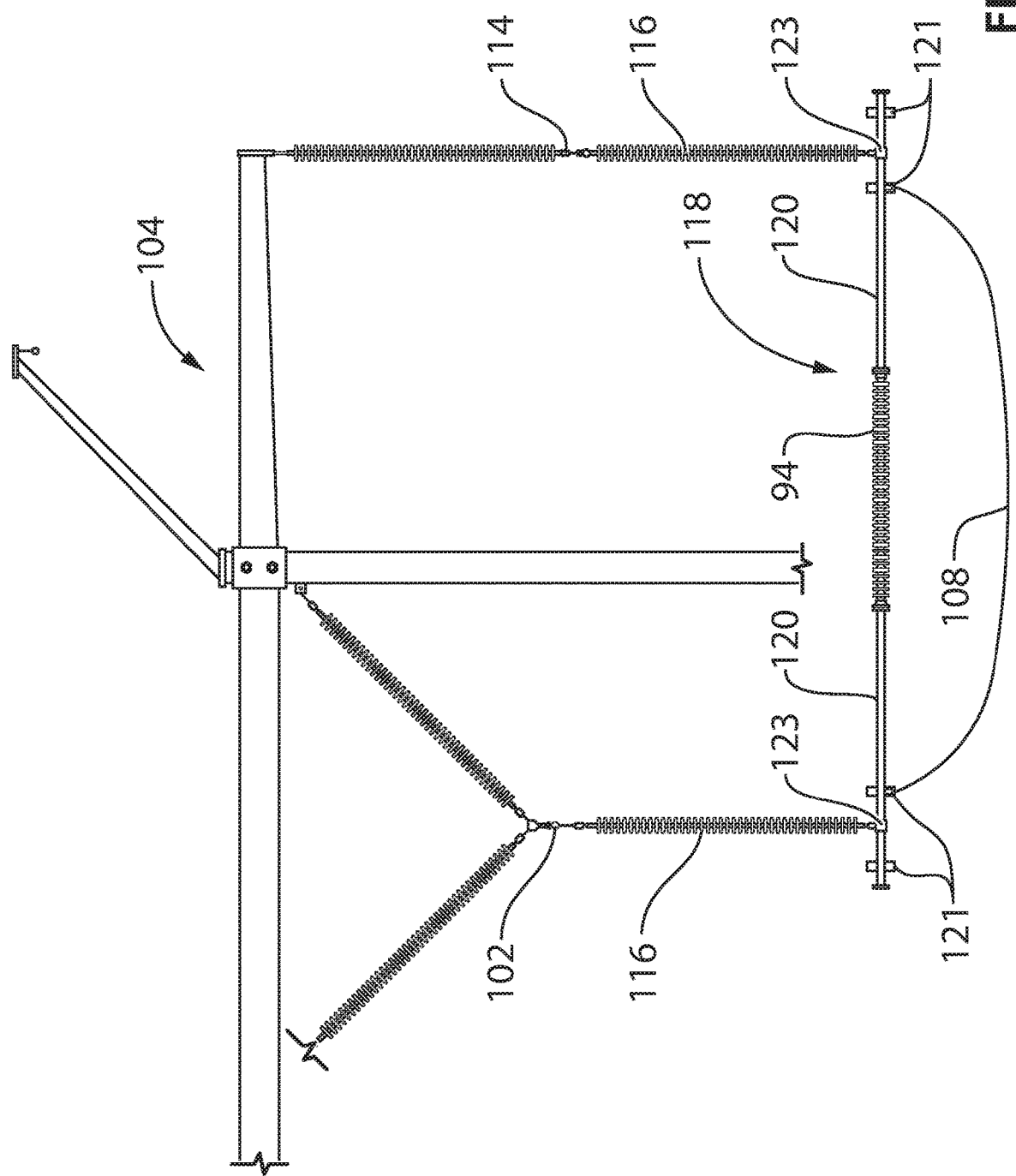
FIG. 48 is a side view of a temporary transfer bus suspended from two tangent insulators each supported on a phase conductor and the two rigid conductors of the transfer bus electrically connected to each other by a jumper cable.

Thus, there are three options for establishing and breaking an electrical connection between the rigid conductors 120 of the transfer bus 118 across the insulator 94. First, live line equipment such as hot sticks may be used to physically connect each end of a jumper cable 108 to a conductor 120 of the transfer bus 118, as illustrated in FIG. 48. Second, a conductor including a switch 140 may be connected to each conductor 120 of the transfer bus 118. The switch 140 will initially be set in the open position before the connection of the switch to each conductor 120 of the transfer bus 118 is made, and each conductor 120 of the transfer bus 118 may then be connected to a phase conductor 102 or new phase conductor 114 using jumper cables 134 (see FIGS. 9 and 9a) and hot sticks. Once each of the two conductors 120, 120 of the transfer bus 118 are electrically connected to either the phase conductor 102 or phase conductor 114, the switch 140 may be closed to establish the electrical connection between the two conductors 102, 114. Similarly, the third option of establishing an electrical connection between two conductors 120, 120 across the insulator 94 of a transfer bus 118 is similar to the second option described above, except that a breaker 142 is used in place of the switch, as shown in FIG. 43, and will not be repeated here.

Which method to use, the hot sticks and jumper cable, the switch or the breaker depends on several factors. Two factors to consider are the electrical potential between the conductors to be connected and the mass of the non-energized conductor that is to be connected to the energized conductor across the transfer bus 118. If the mass of the conductor to be connected and/or the voltage potential is relatively minor, the two conductors may be connected across the transfer bus by a jumper cable 108 using hot sticks. As the mass of the conductor to be connected to the energized conductor increases and/or the voltage difference between the two conductors increases, a switch may be used to establish the electrical connection across the insulator 94 of the transfer bus 118; finally, with conductors having a large mass and/or a large voltage potential between the conductors, a breaker 142 is used to establish the connection across the insulator 94 of the transfer bus 118. In the preferred embodiment of the method described below, which is not intended to be limiting in any way, the electrical connection is established across the insulator 106 of the transfer bus 118 by means of a breaker 142; however, it will be well understood by a person ordinarily skilled in the art that the electrical connection may also be established across the insulator 94 of the transfer bus 118 by means of a switch 140 or by means of a length of a conductor, such as for example a jumper cable 108, depending on factors which include the electrical potential and the mass of the non-energized conductor that is to be connected to an energized conductor, as described above.

Figure 10:
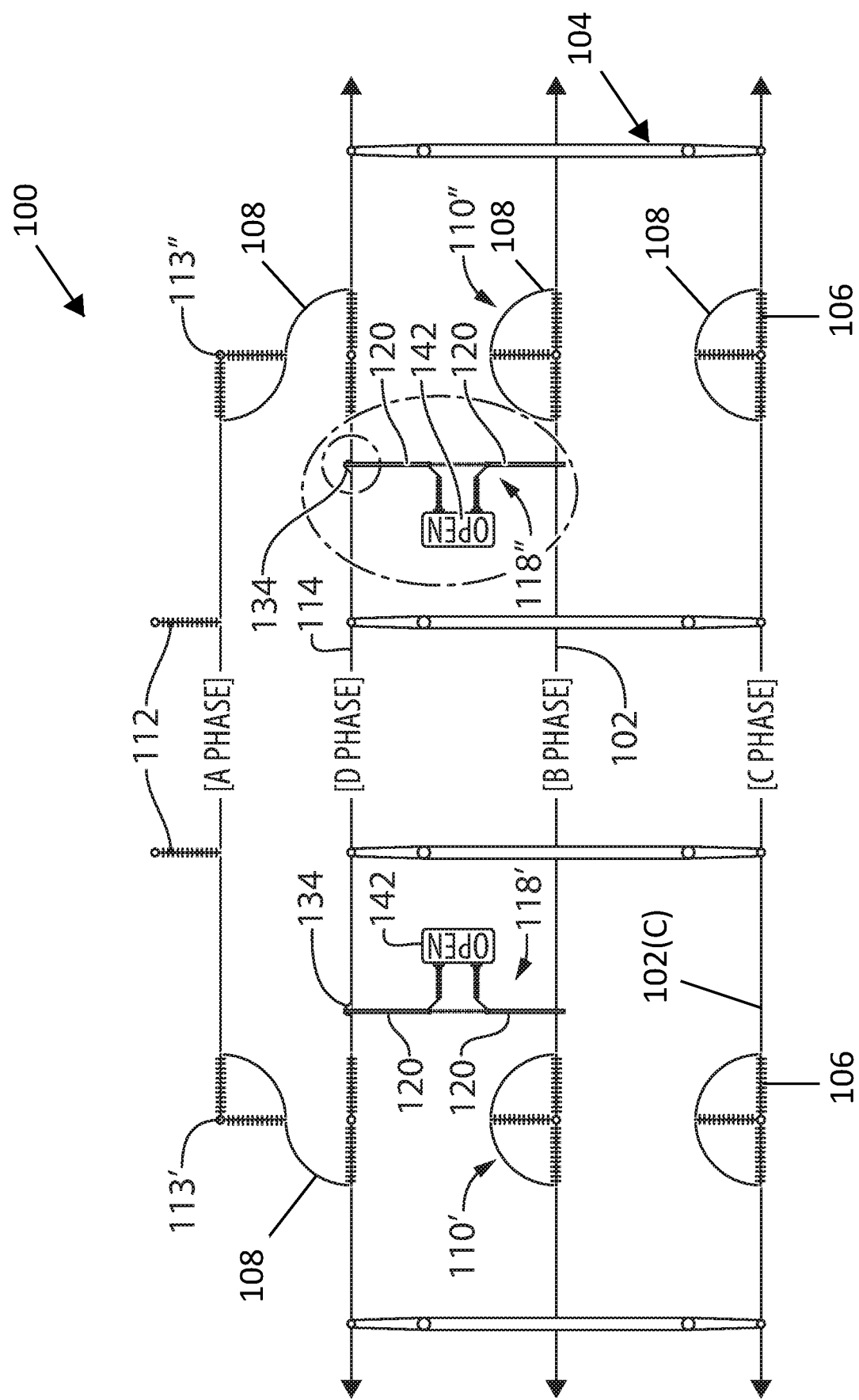
FIG. 10 is a schematic diagram illustrating the power transfer system of FIG. 9 showing a second temporary transfer bus partially installed.

Once the D phase conductor 114 is in place, the power load is transferred from the conductor 102 (B) of the B phase line onto the D phase conductor 114 over the course of several steps. FIG. 9 shows that one rigid conductor 120 of a first transfer bus 118' is electrically connected to the D phase conductor 114 by means of a jumper cable 134. FIG. 10 shows one rigid conductor 120 of a second transfer bus 118" is electrically connected to the D phase conductor 114 by means of a second jumper cable 134. In FIGS. 9 and 10, although it appears that the rigid conductors 120 of each of the transfer buses 118', 118" that are opposite of the rigid conductors 120 connected to the D phase conductor 114 by means of the jumper cables 134, 134 are in close proximity to the B phase conductor 102 (B), there is no physical or electrical connection between those rigid conductors 120 of the transfer buses 118', 118" and the B phase conductor 102 (B), as the transfer buses 118, 118 are positioned either above, or preferably, below the B phase conductor 102 (B).

Figure 11:
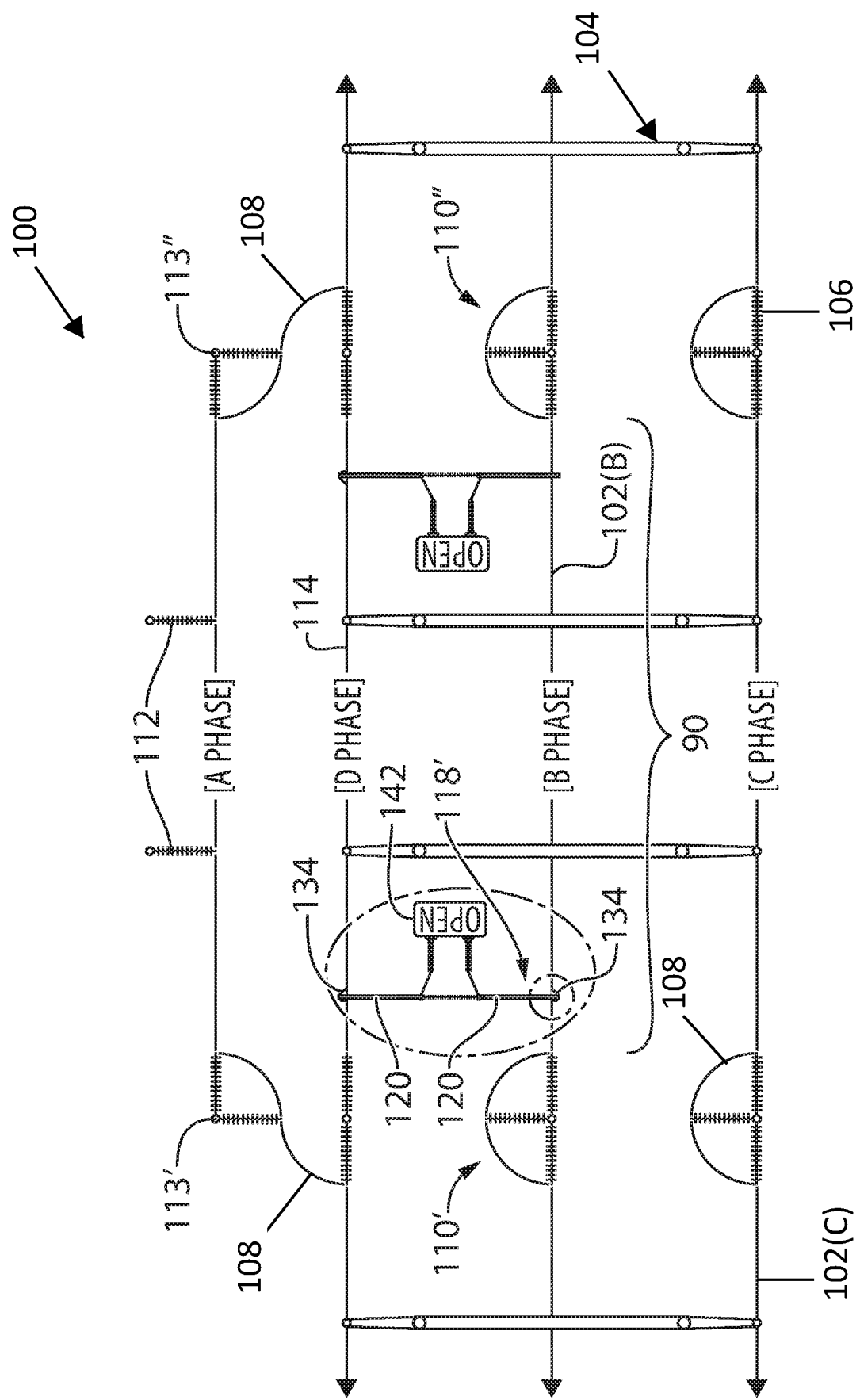
FIG. 11 is a schematic diagram illustrating the power transfer system of FIG. 10 showing the first temporary transfer bus fully installed.
Figure 12:
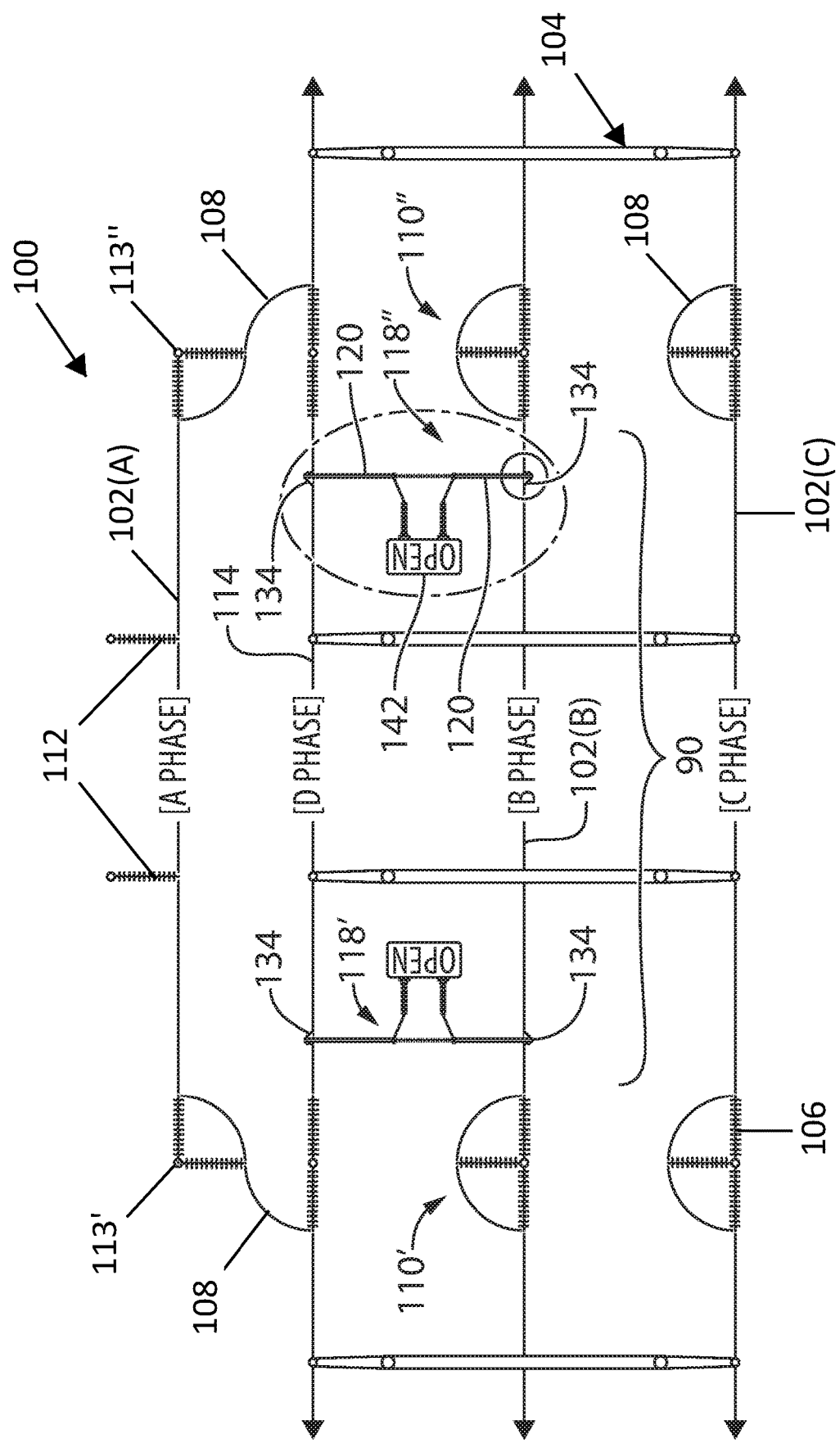
FIG. 12 is a schematic diagram illustrating the power transfer system of FIG. 11 showing the second temporary transfer bus fully installed.

As illustrated in FIGS. 11 and 12, once the breaker 142 of each transfer bus 118', 118" is confirmed to be set in the open position, a jumper cable 134 is used to electrically connect a rigid conductor 120 of each transfer bus 118', 118" to a section 90 of the B phase conductor 102 (B) located between two dead end junctures 110', 110". As illustrated in FIG. 12, once the first rigid conductors 120 of each transfer bus 118', 118" are each connected to the D phase conductor 114 and the second rigid conductors 120 of each transfer bus 118', 118" are connected to the B phase conductor 102 (B), the breaker 142 on each transfer bus 118', 118" remains in the open position and therefore the D phase conductor 114 remains de-energized.

Figure 13:
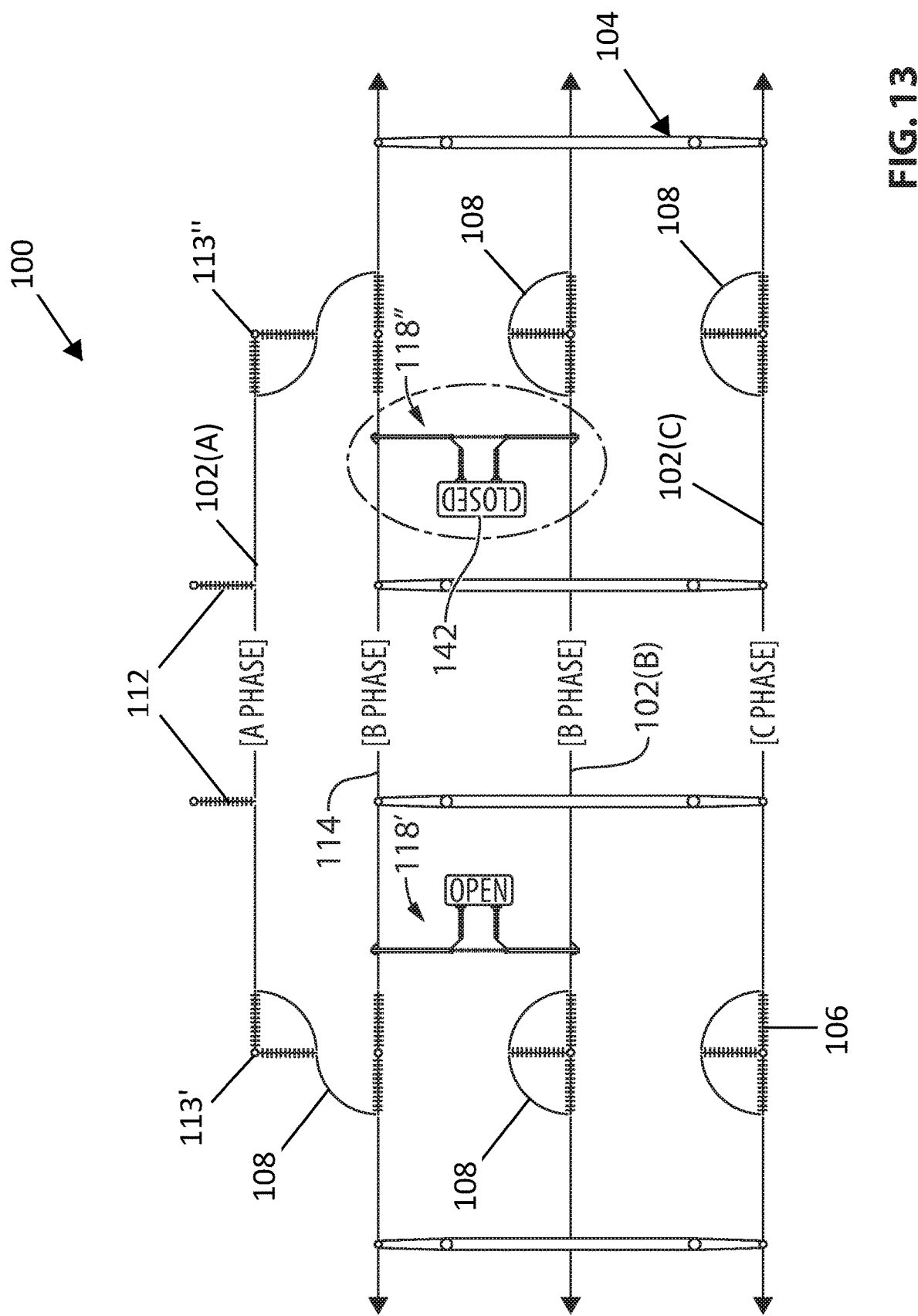
FIG. 13 is a schematic diagram illustrating the power transfer system of FIG. 12 showing a new conductor electrically connected to the B phase conductor across the second transfer bus that is connected to a closed breaker.

In FIG. 13, the breaker 142 of transfer bus 118" is closed, thereby establishing an electrical connection between the energized B phase conductor 102 (B) and the new phase conductor 114, whereby the new phase conductor 114 is brought to the same voltage potential difference as the B phase conductor 102 (B). Because the new phase conductor 114 shown in FIG. 13 is connected to the B phase conductor 102 (B) at only one location, current is flowing only over the B phase conductor 102 (B) and not over the new phase conductor 114. The new phase conductor 114 has the same electrical potential as the B phase conductor 102 (B), but the new phase conductor 114 does not yet transport a power load.

Figure 14:
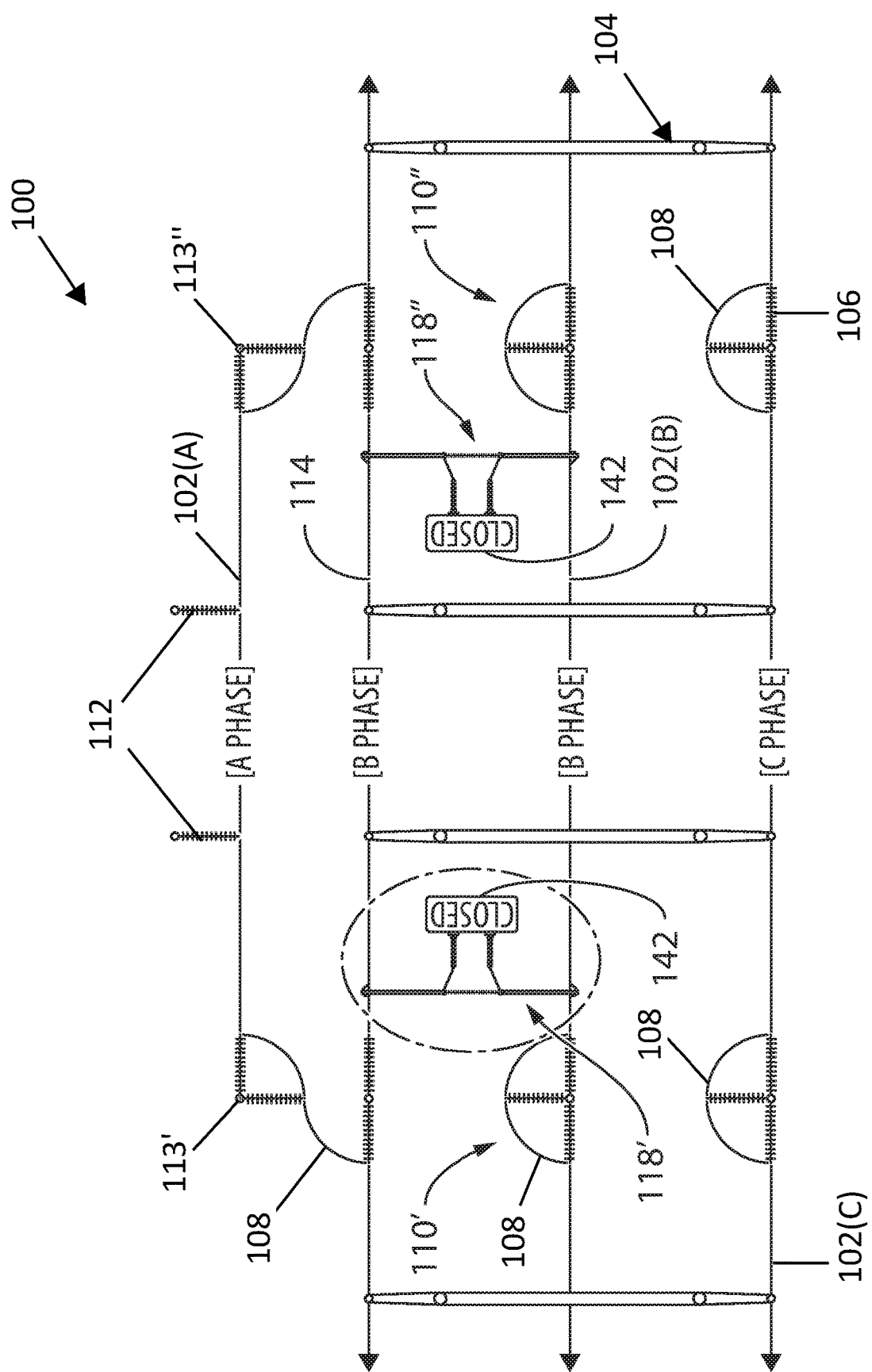
FIG. 14 is a schematic diagram illustrating the power transfer system of FIG. 13 showing a new conductor connected in parallel to the B phase conductor across two transfer buses that are each connected to a closed breaker.

In order for current to flow through the new phase conductor 114, the breaker 142 of the transfer bus 118' must be closed, as shown in FIG. 14. Once the breakers 142, 142 on each of the transfer buses 118', 118" are closed, a parallel path is created for the B phase current to run through both the new phase conductor 114 and the original B phase conductor 102 (B).

Figure 15:
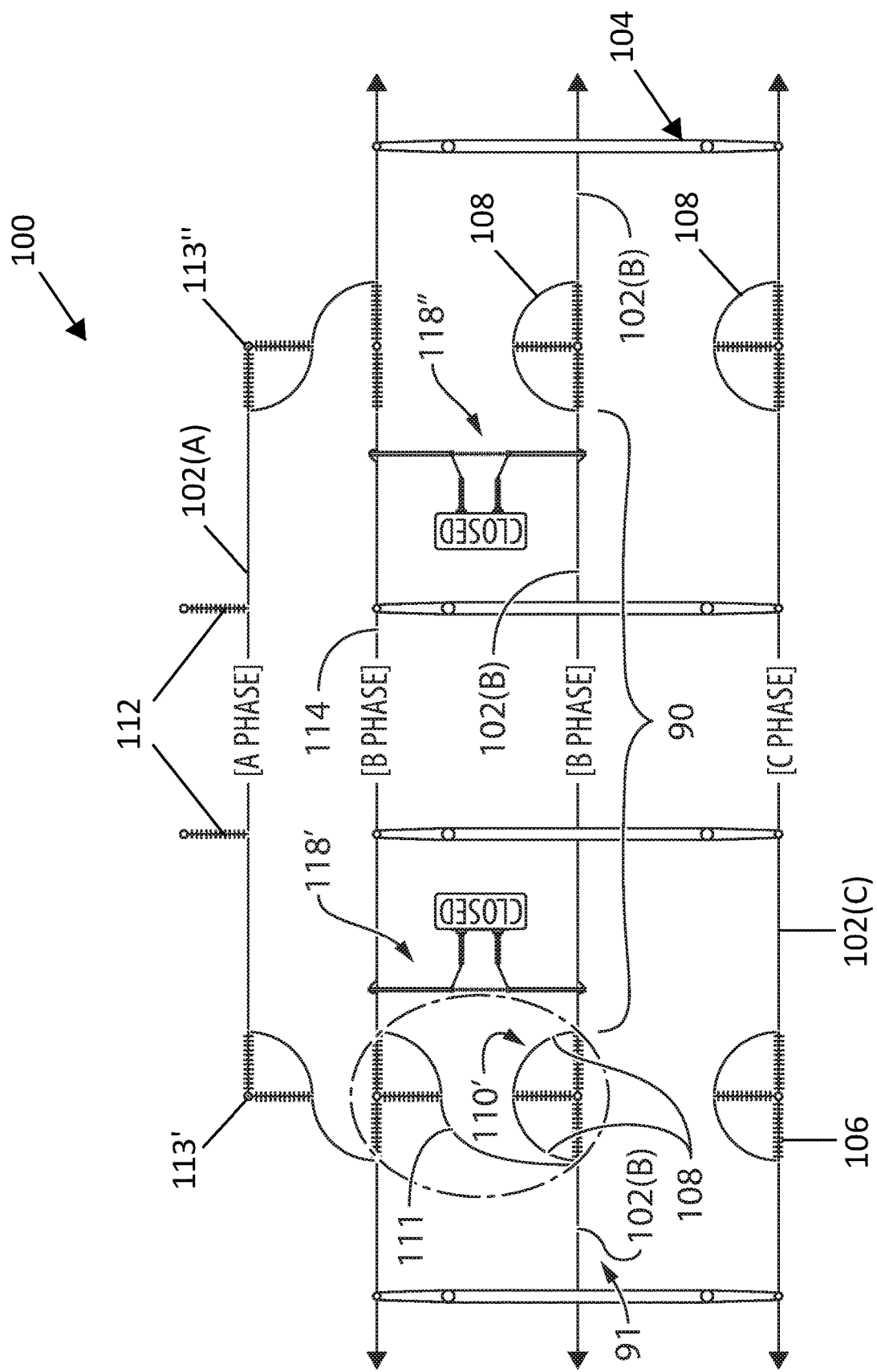
FIG. 15 is a schematic diagram illustrating the power transfer system of FIG. 14 showing a jumper cable connecting the original B phase conductor to the new phase conductor across a dead end on the B phase conductor and a dead end located between the original A phase conductor and the new conductor.
Figure 16:
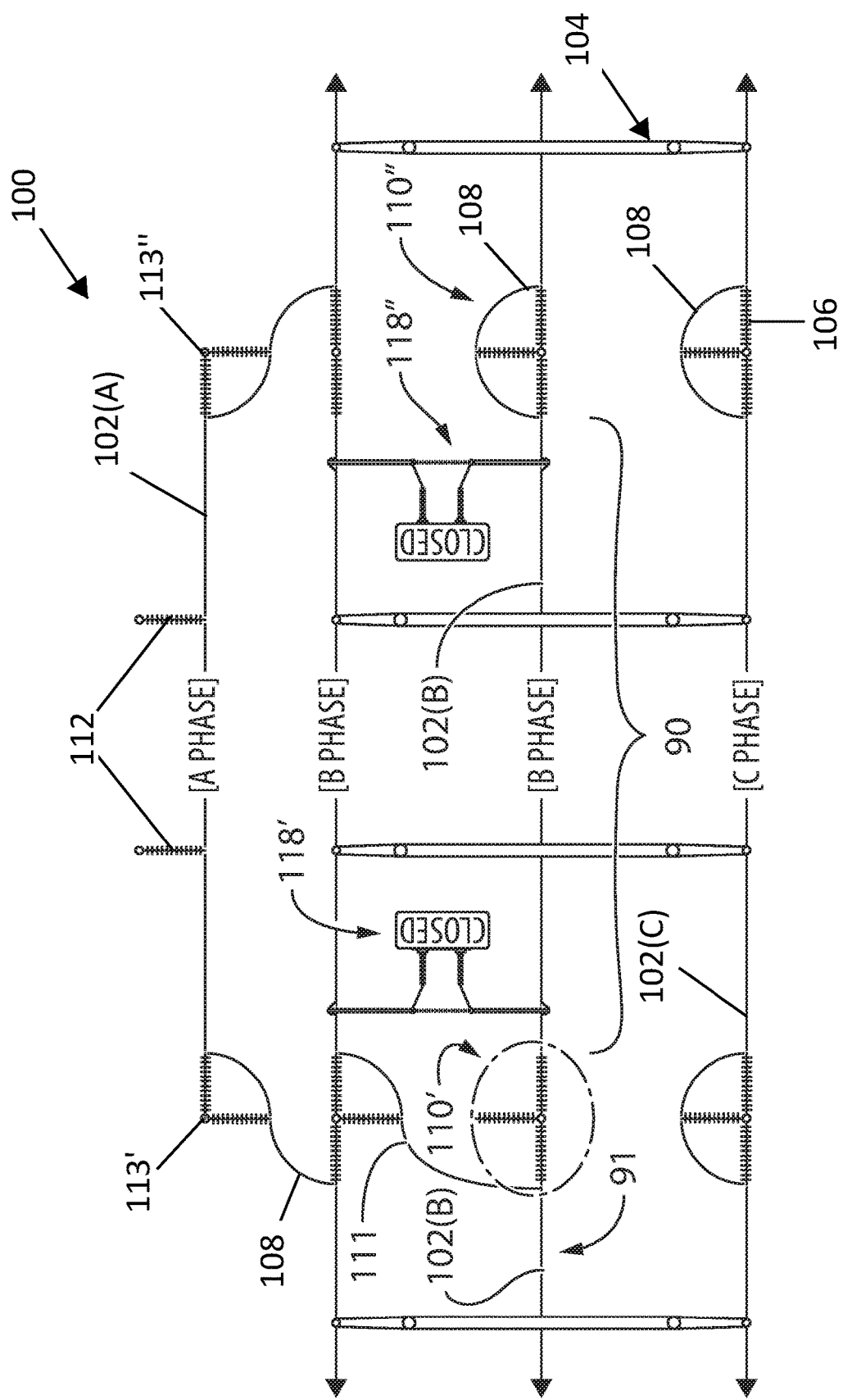
FIG. 16 is a schematic diagram illustrating the power transfer system of FIG. 15 showing two jumper cables removed from around a dead end on the B phase conductor.

As illustrated in FIG. 15, at one of the dead end juncture 110' on opposite ends of section 90 of the original B phase conductor 102 (B), one end of a long jumper cable 111 is connected to a section 91 of the original B phase conductor 102 (B) that is oppositely disposed on dead end juncture 110', and the other end of the long jumper cable 111 is connected to the new phase conductor 114, creating a parallel connection for the B phase current to flow around the dead end juncture 110'. As shown in FIG. 16, jumper cables 108, 108 are removed from around one dead end juncture 110' on the B phase conductor 102 (B). The removal of the jumper cables 108, 108 can, if the voltage and/or the mass of the conductor 102 (B) is low enough, be removed by using hot sticks. If the voltage and/or mass of the conductor 102 (B) are too high, other means of breaking the connection around the dead end juncture 110' may be used which may include a switch or breaker described in greater detail above.

Figure 17:
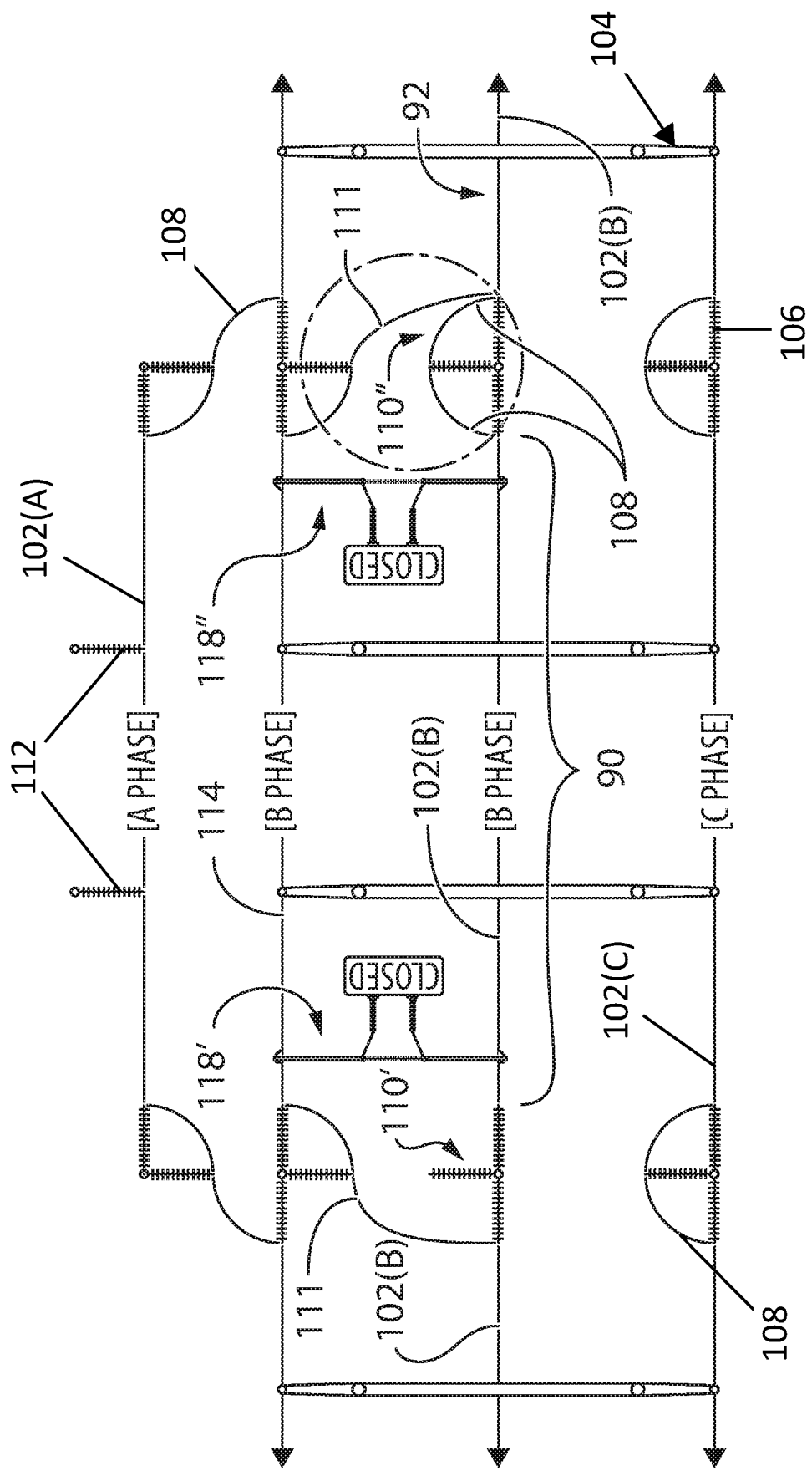
FIG. 17 is a schematic diagram illustrating the power transfer system of FIG. 16 showing a jumper cable connecting the original B phase conductor to the new phase conductor across a dead end on the B phase conductor and a dead end located between the original A phase conductor and the new conductor.
Figure 18:
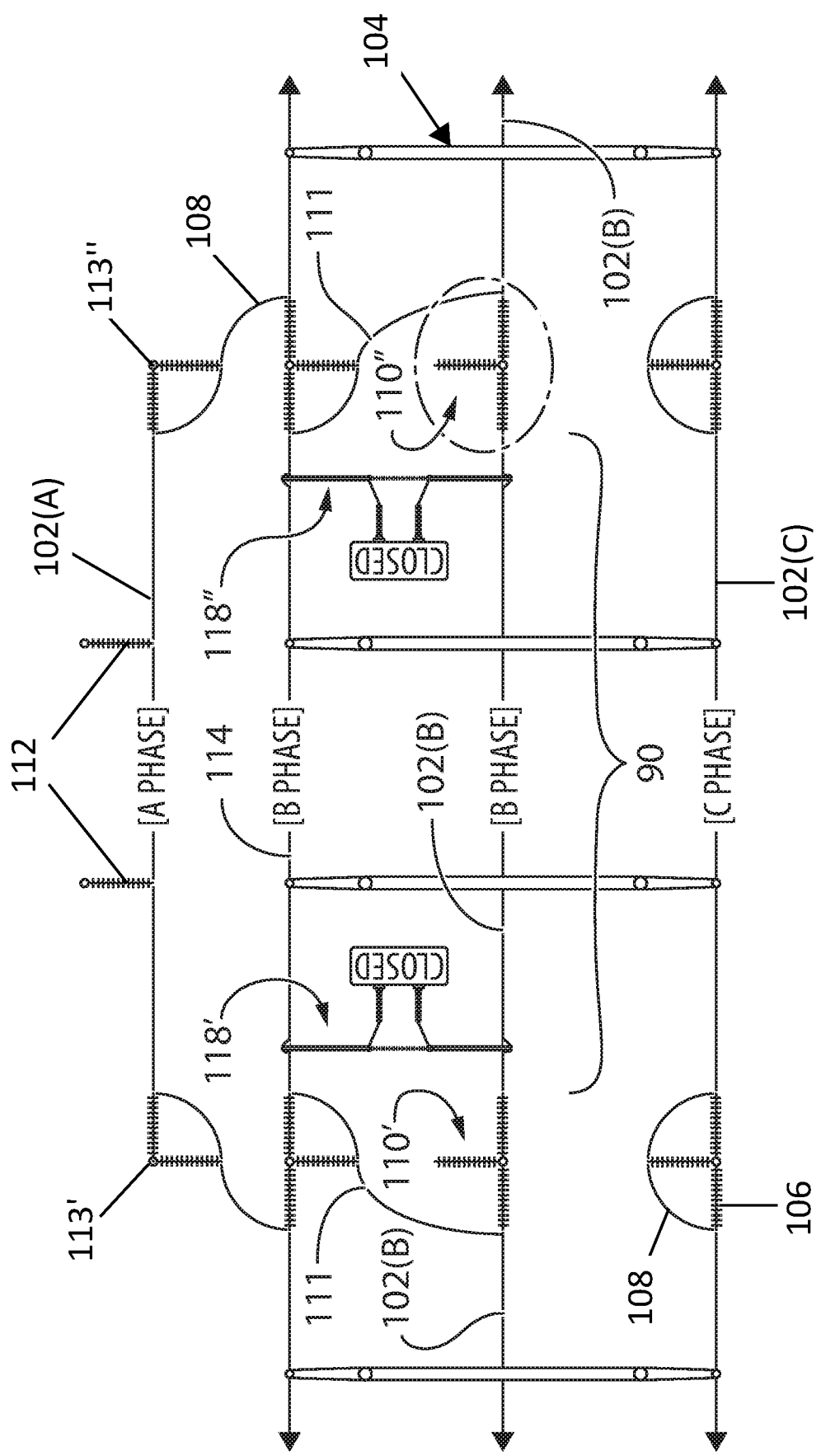
FIG. 18 is a schematic diagram illustrating the power transfer system of FIG. 17 showing two jumper cables removed from around a dead end on the B phase conductor.

As shown in FIG. 17, at the second dead end juncture 110" on the opposite end of the section 90 of the original B phase conductor 102 (B), one end of a long jumper cable 111 is connected to a section (or otherwise referred to as a "segment") 92 of the B phase conductor 102 (B) that is oppositely disposed of dead end juncture 110", and the other end of the long jumper cable 111 is connected to the new phase conductor 114, creating a parallel connection for the B phase current to flow around the second dead end juncture 110". As shown in FIG. 18, jumper cables 108, 108 are removed from around the second dead end juncture 110" of the original B phase conductor 102 (B).

Figure 19:
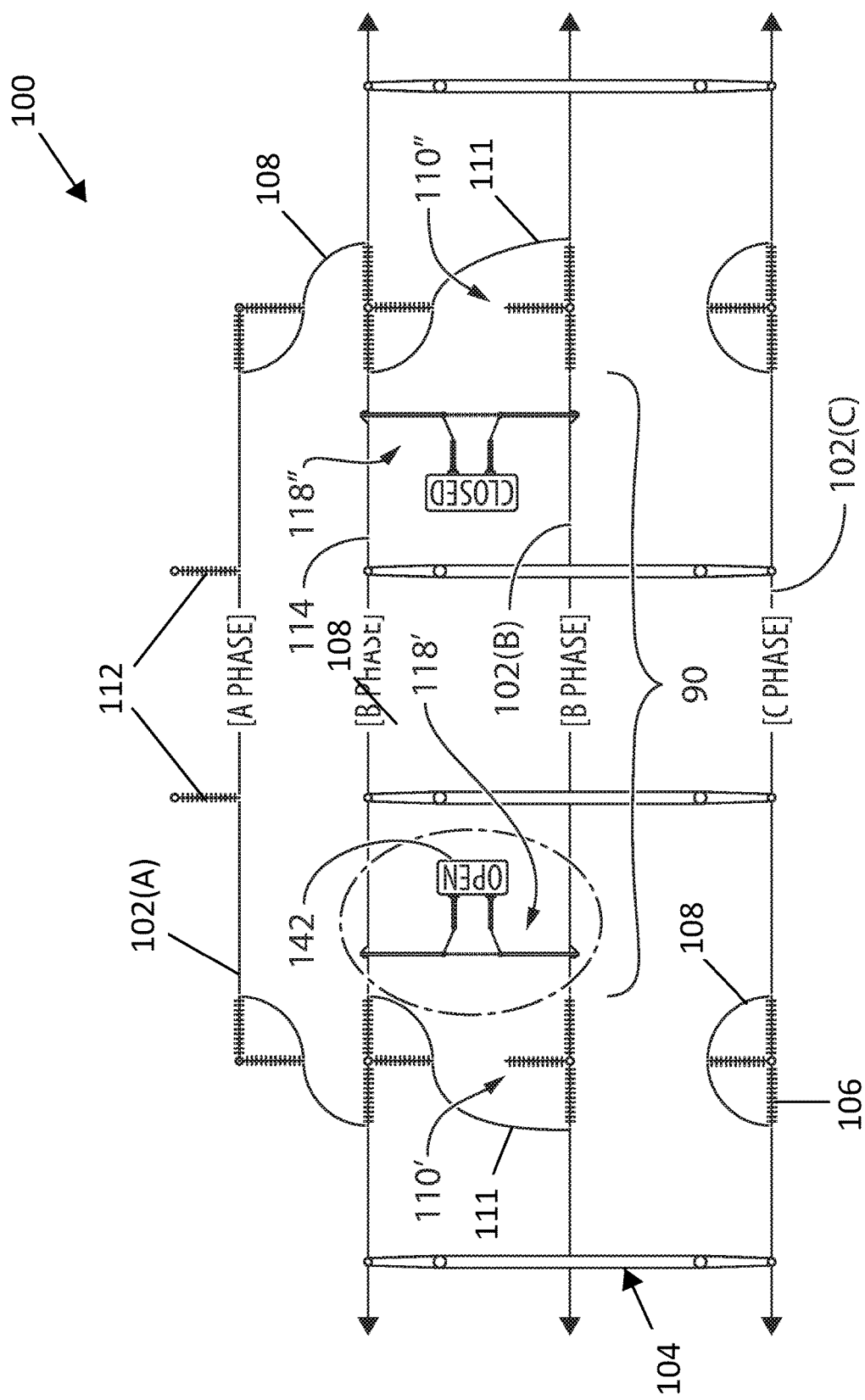
FIG. 19 is a schematic diagram illustrating the power transfer system of FIG. 18 showing the breaker connected to the first temporary transfer bus set to the open position and breaking parallel between the new conductor and the original B phase conductor.

In FIG. 19, the breaker 142 of one transfer bus 118' is opened. The effect of opening one breaker 142 is that the current no longer flows through the section 90 of the original B phase conductor located between the dead end junctures 110', 110". All of the B phase current now flows through the new conductor 114 rather than the original B phase conductor 102 (B). However, because the breaker 142 of the other transfer bus 118" remains closed, an electrical connection still exists between the original B phase conductor 102 (B) and the new conductor 114 at one point; therefore, the electrical potential between the original B phase conductor 102 (B) and the new phase conductor 114 remains the same.

Figure 20:
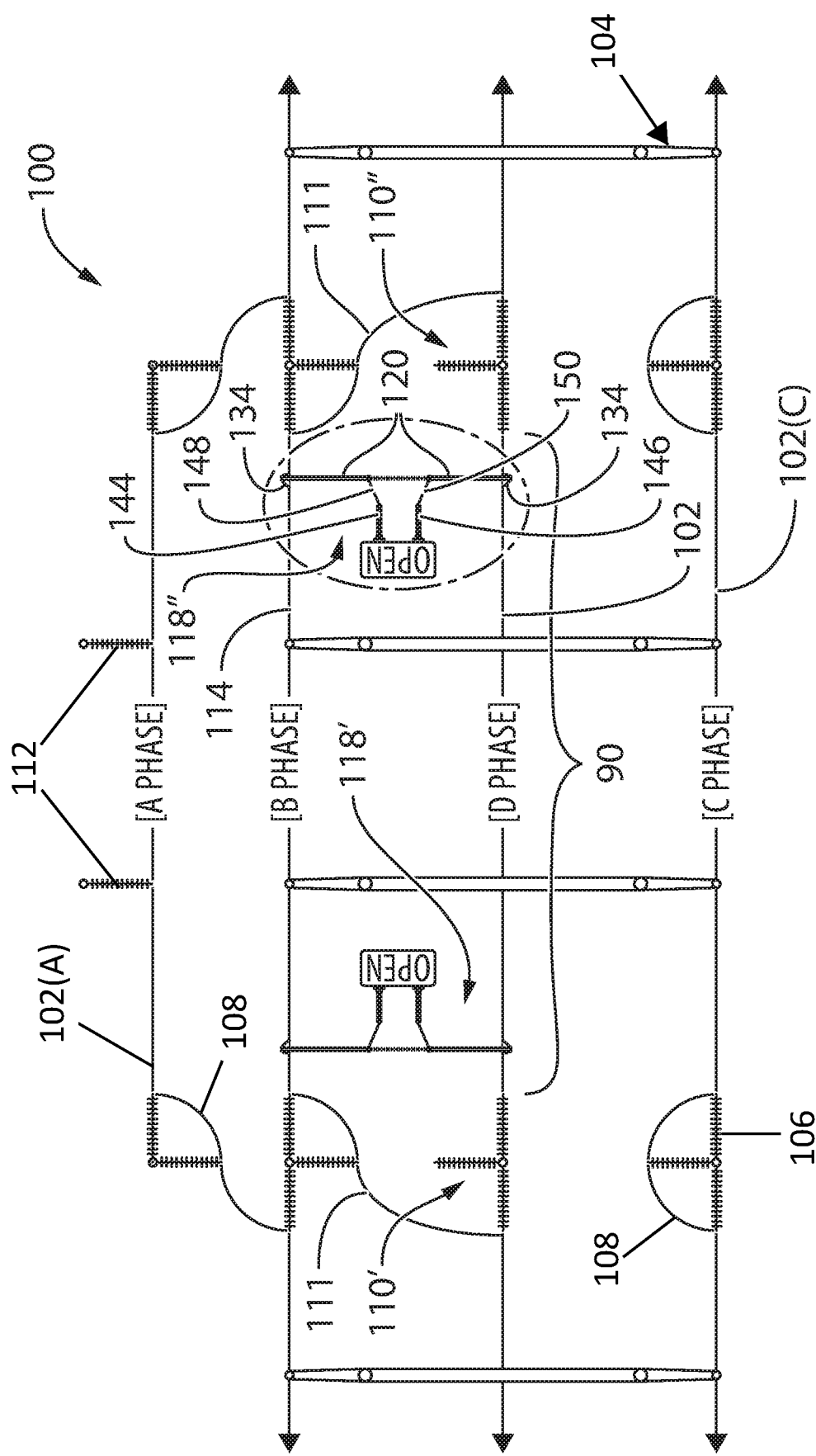
FIG. 20 is a schematic diagram illustrating the power transfer system of FIG. 19 showing the breaker connected to the second temporary transfer bus set to the open position and breaking the electrical connection between the new conductor and the original B phase conductor.

To electrically isolate the section 90 of the original B phase conductor 102, the breaker 142 of the second transfer bus 118" is opened, as shown in FIG. 20. In other embodiments of the present invention, if the voltage and/or the mass of the original B phase conductor 102 is low enough, either a switch or a jumper cable may be substituted for the breaker 142 to establish and break the electrical connection between the rigid conductors 120, 120 of the transfer bus 118". Upon opening the second transfer bus 118", section 90 of the original B phase conductor becomes electrically isolated from the system (except for currents which may be induced in section 90 of phase conductor 102 due to the electromagnetic effects of the surrounding current-carrying phase conductors), and the original B phase conductor therefore becomes the D phase conductor, as it no longer carries the B phase current or any phase current of the power transfer system 100.

Figure 21:
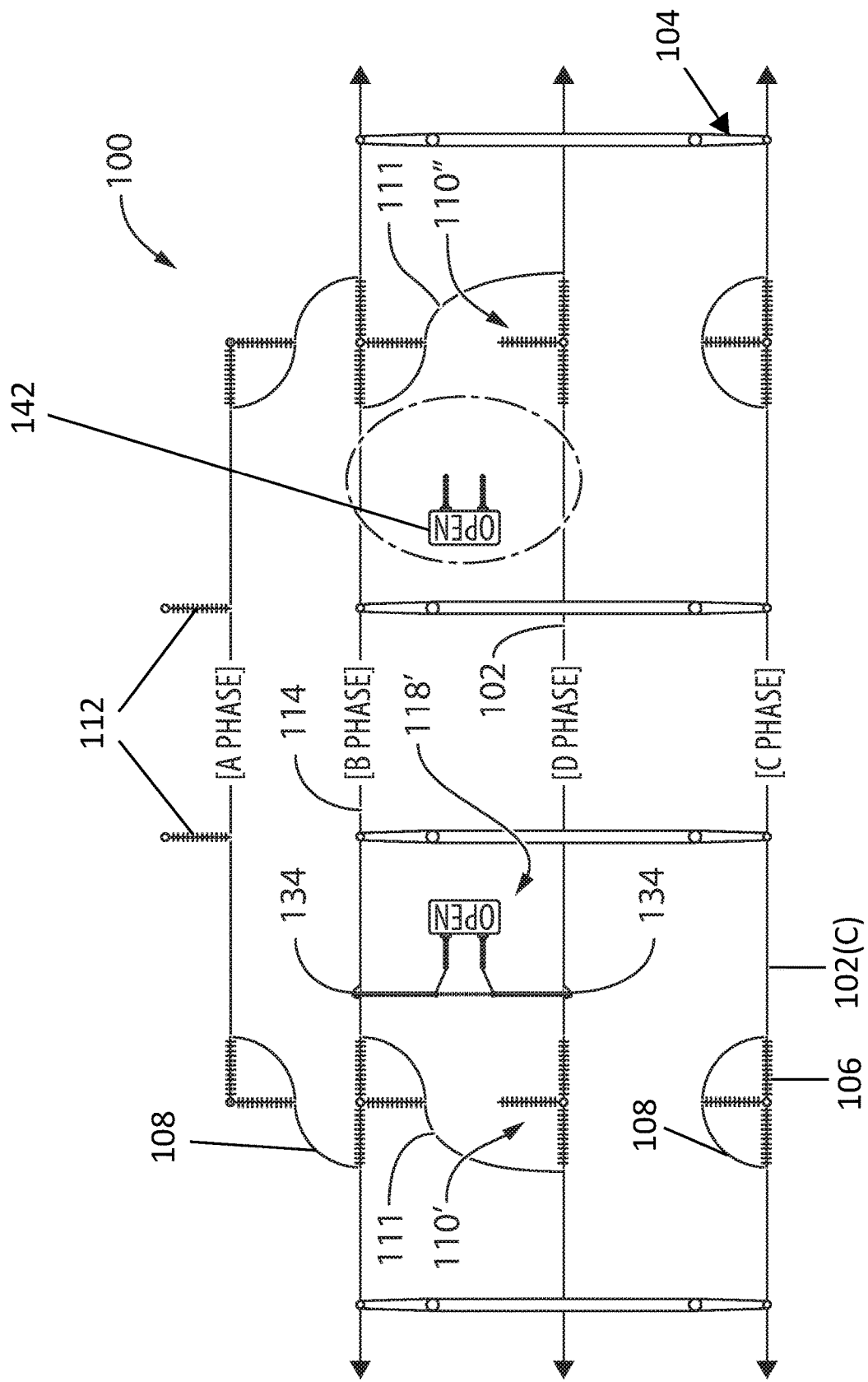
FIG. 21 is a schematic diagram illustrating the power transfer system of FIG. 20 showing the second transfer bus disconnected from the breaker and removed from the power transfer system.
Figure 22:
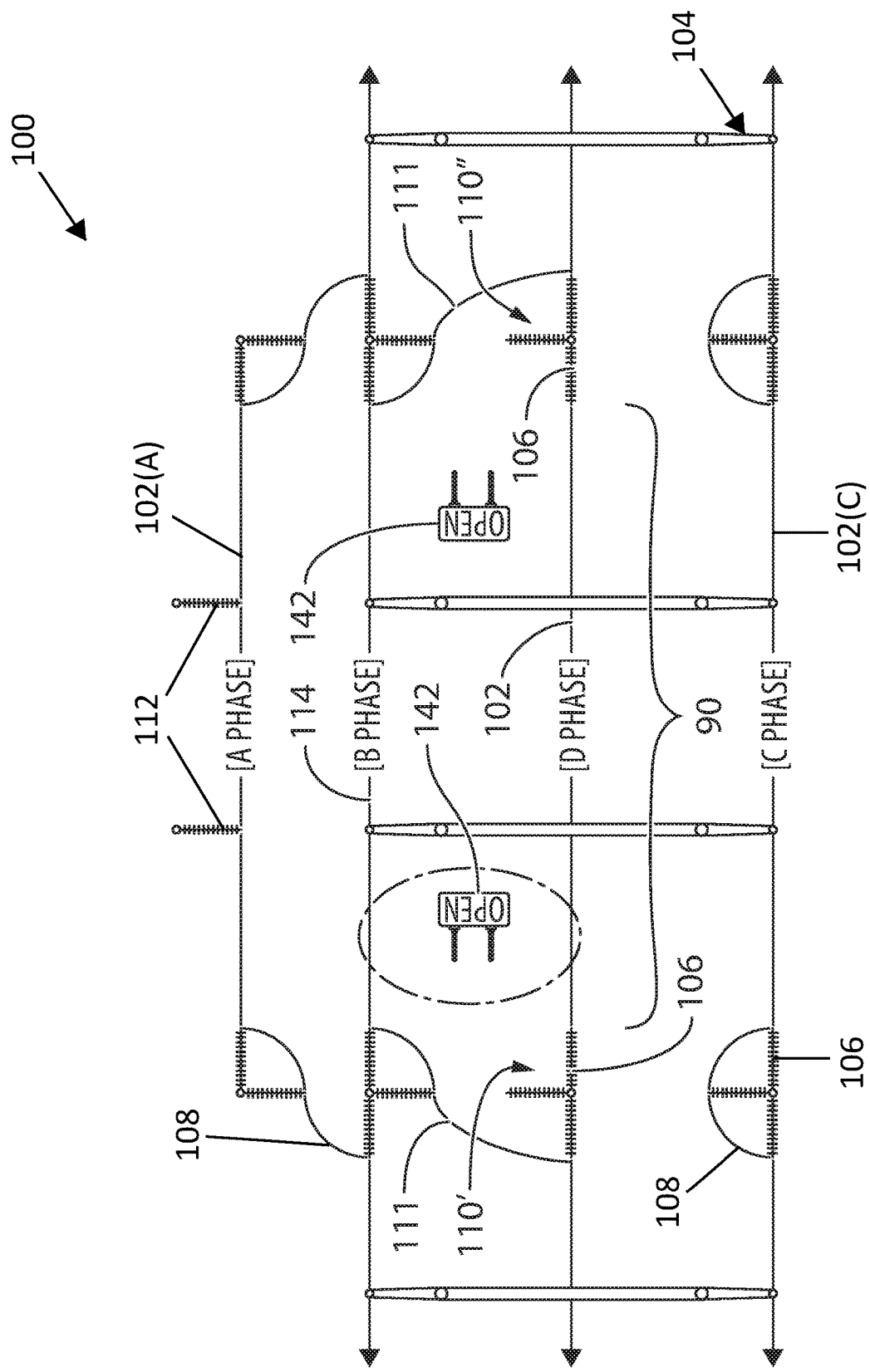
FIG. 22 is a schematic diagram illustrating the power transfer system of FIG. 21 showing the first transfer bus disconnected from the breaker and removed from the power transfer system.

One of the jumper cables 134 connecting a first end of the transfer bus 118" to the new B phase conductor 114 is removed, de-energizing the open breaker 142. The second jumper cable 134 connecting a second end of the transfer bus 118" to the original B phase conductor 102 (which is now de-energized and therefore has become the D phase conductor 102) is also removed, and the temporary transfer bus 118" is then removed from the power transfer system 100, as illustrated in FIG. 21. Similarly, the two jumper cables 134, 134 connecting the transfer bus 118' at the first end to the new B phase conductor 114 and at the second end to the D phase conductor 102 are removed, and then the transfer bus 118' is removed from the power transfer system 100, as shown in FIG. 22.

The section 90 of the D phase conductor 102 between the dead end junctures 110', 110" is now isolated from all B phase potential by both dead end junctures 110', 110". All current formerly carried by the D phase conductor 102 now travels through the new B phase conductor 114. It is important to note that section 90 of the D phase conductor 102, now isolated from the system 100 power load, is not void of potential. The isolated section 90 of the D phase conductor 102 is, and should be treated as, a live conductor, because the isolated section 90 of the D phase conductor 102 is subject to induced currents caused by the surrounding current-carrying phase conductors 102, 114 and may still have a large potential with respect to ground.

Figure 23:
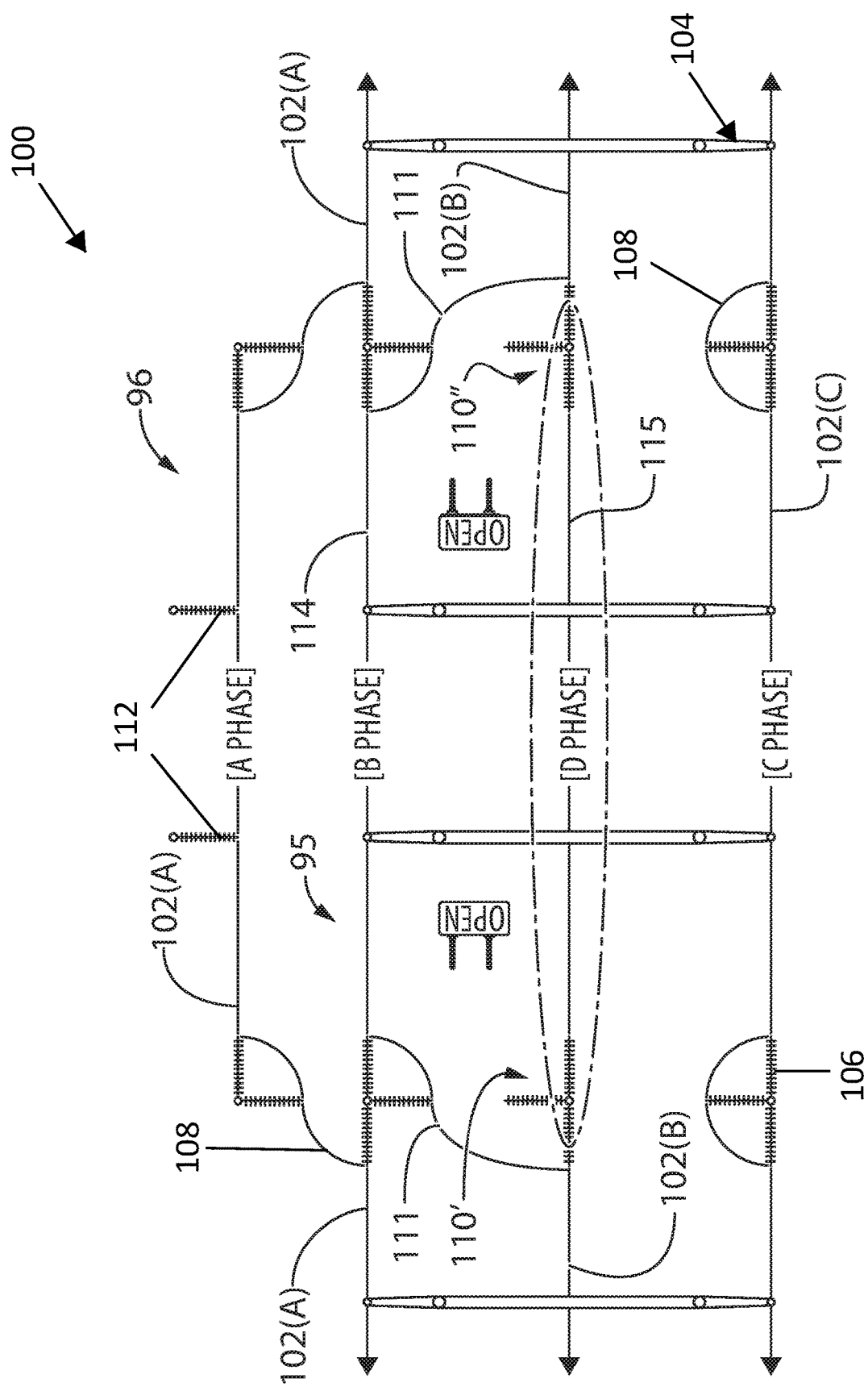
FIG. 23 is a schematic diagram illustrating the power transfer system of FIG. 22 showing new conductor installed between dead end structures on the original B phase conductor line.

At this stage in the procedure, the isolated section 90 of the original B phase conductor may be broken down, worked on, or replaced without disrupting downstream power delivery. For example, as illustrated in FIG. 23, the section 90 of the original B phase conductor 102 is removed and a second new phase conductor 115 is strung, sagged, dead ended and clipped into the position of the original B phase conductor 102. In some embodiments of the invention, the original B phase line 102 is not removed but is rather worked on in other ways, such as replacing an insulator 106. One skilled in the art can appreciate that other types of work may be done on the isolated section 90 of the B phase conductor 102 in accordance with the invention.

The above describes the procedure, illustrated in FIGS. 1-23, for moving the A phase conductor 102 (A) to a temporary location 96, stringing a first new phase conductor 114 in or near the original location 95 of the A phase conductor 102 (A), transferring the power load from the B phase conductor 102 (B) to the D phase conductor 114, electrically isolating the section 90 of the B phase conductor 102 (B) located between two dead end junctures 110', 110" from the power transfer system 100, and replacing the electrically isolated section 90 of the B phase conductor 102 with a second new phase conductor 115. The procedure for transferring the power load from the C phase conductor 102 (C) to the new D phase conductor 115 in accordance with the invention, described below and illustrated in FIGS. 24-28, is similar to the procedure for transferring the power load from the B phase conductor 102 (B) to the new phase conductor 114 described above.

Figure 24:
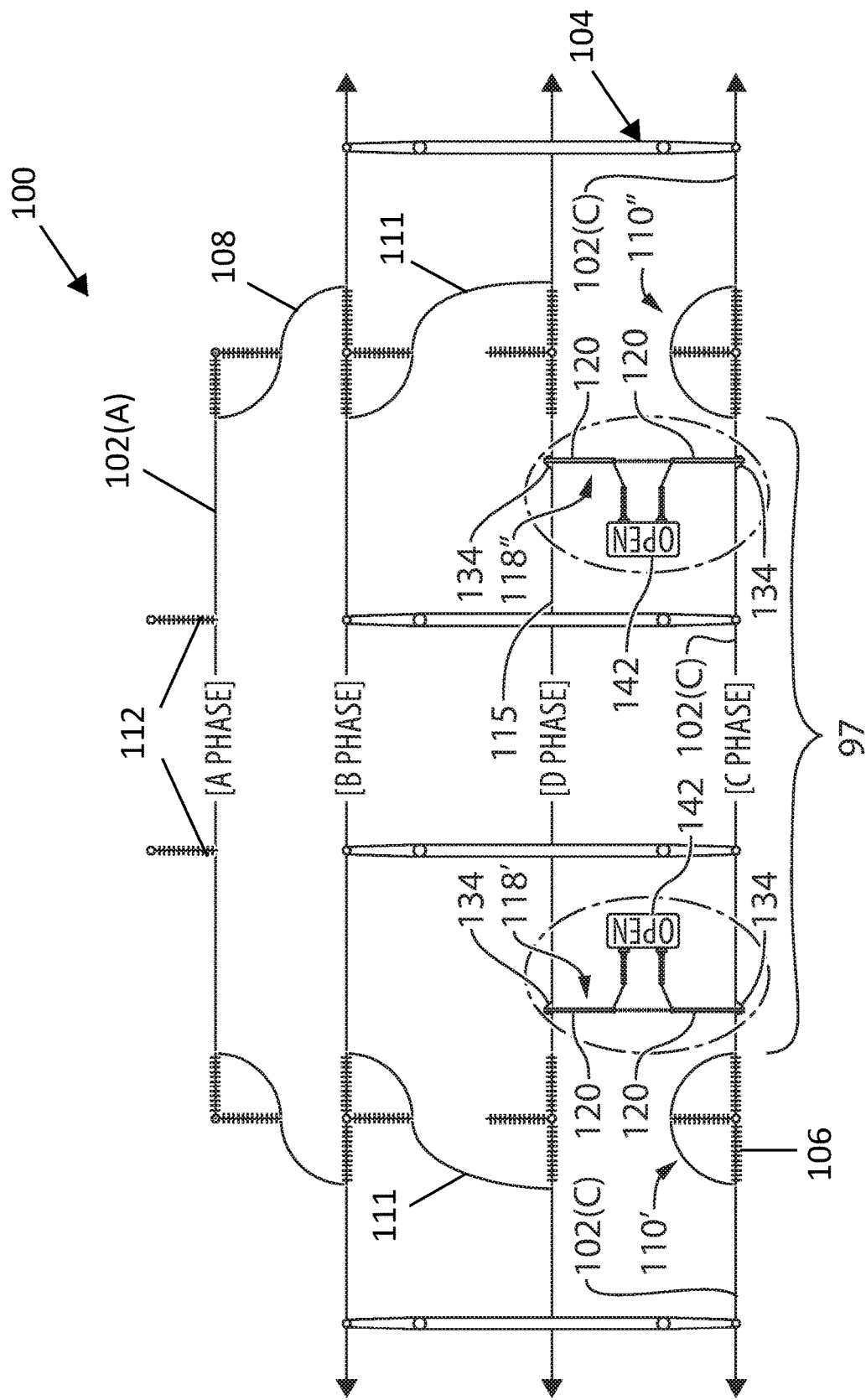
FIG. 24 is a schematic diagram illustrating the power transfer system of FIG. 23 showing a first and second temporary transfer bus installed between the C phase conductor and the new D phase conductor wherein the two temporary transfer buses are each connected to an open breaker.

As shown in FIG. 24, a section 97 of the C phase conductor 102 (C), located between two dead end junctures 110', 110" requires replacement or other maintenance or repair work. A first transfer bus 118', with a breaker 142 connected to each of the two rigid conductors 120 of the transfer bus 118, is connected at one end to the D phase conductor 115 with a jumper cable 134, and the opposite end of the first transfer bus 118' is connected to the section 97 of the C phase conductor 102 (C) with a second jumper cable 134. A second transfer bus 118" with a breaker 142 connected to each of the two rigid conductors 120 of the transfer bus 118", is connected at one end to the D phase conductor 115 with a third jumper cable 134, and the opposite end of the second transfer bus 118" is connected to the section 97 of the C phase conductor 102 (C) with a fourth jumper cable 134. The electrical connections described above between the transfer buses 118', 118" and the phase conductors 115, 102 (C) are established after first checking to confirm that the breaker 142 attached to each transfer bus 118', 118" is open.

Figure 25:
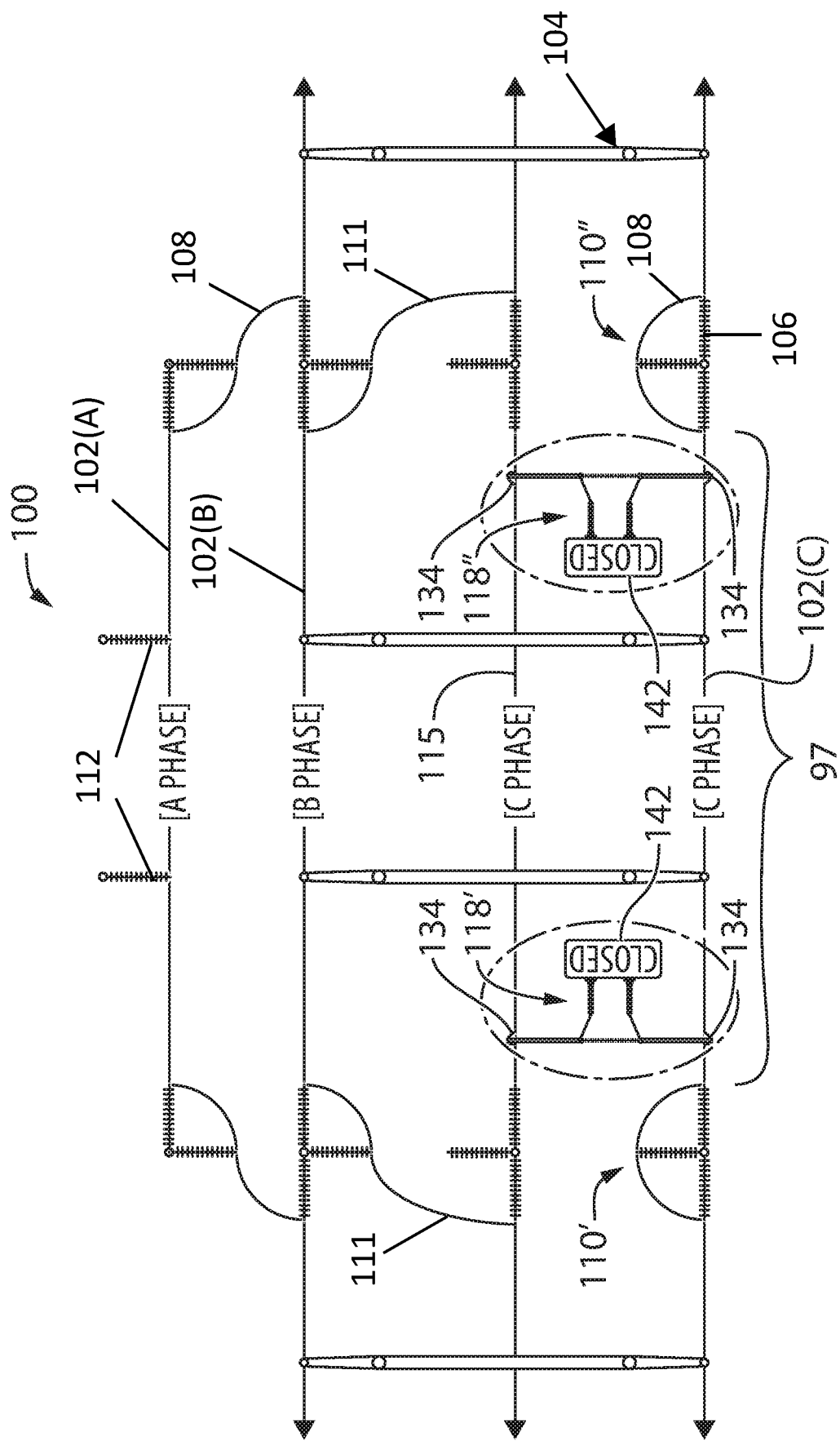
FIG. 25 is a schematic diagram illustrating the power transfer system of FIG. 24 showing the new conductor connected in parallel to the C phase conductor across two transfer buses that are each connected to a closed breaker.

The breaker 142 attached to the first transfer bus 118' is closed, thereby energizing the new phase conductor 115 at the same electrical potential as the C phase conductor 102 (C). However, because an electrical connection between the new D phase conductor 115 and the C phase conductor 102 (C) has only been established through the first transfer bus 118', although the new phase conductor 115 is energized it does not carry any current. The breaker 142 attached to the second transfer bus 118" is then closed, bringing the new phase conductor 115 in parallel with the C phase conductor 102 (C). Upon closing the breakers 142, 142 on each of the transfer buses 118', 118", the C phase current runs in parallel on both the new phase conductor 115 and the C phase conductor 102 (C), as illustrated in FIG. 25.

Figure 26:
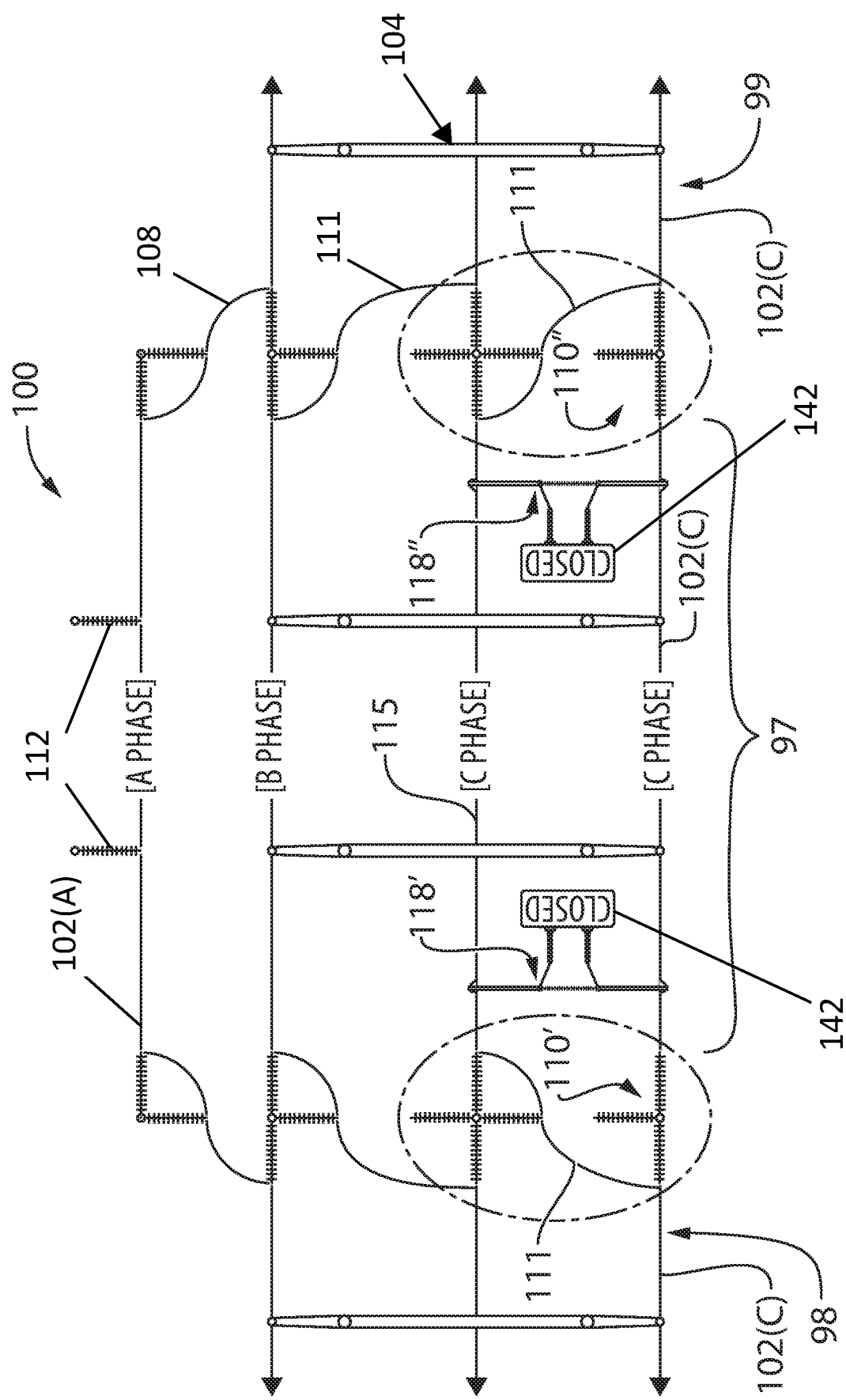
FIG. 26 is a schematic diagram illustrating the power transfer system of FIG. 25 showing two jumper cables each connecting the original C phase conductor to the new phase conductor across dead end junctures on the C phase conductor and dead end junctures located between the original B phase conductor and the new conductor and the jumper cables surrounding the two dead end junctures on the original C phase conductor removed.

Once the C phase current is carried in parallel over the new phase conductor 115 and the original C phase conductor 102 (C), the section 97 of the original C phase conductor 102 (C) located between two dead end junctures 110', 110" is electrically isolated from the power transfer system 100. As shown in FIG. 26, at the first dead end juncture 110' a first long jumper cable 111 is connected at a first end to a first section 98 of the original C phase conductor 102 (C) extending from the first dead end juncture 110' oppositely to section 97, and a second end of the first long jumper cable 111 is connected to the new phase conductor 115, establishing a parallel path around the first dead end juncture 110' for the C phase current to flow. Similarly, at the second dead end juncture 110" a second long jumper cable 111 is connected at a first end to a second section 99 of the original C phase conductor 102 (C) extending from the second dead end juncture 110" oppositely to section 97, and a second end of the second long jumper cable 111 is connected to the new phase conductor 115, establishing a parallel path around the second dead end juncture 110" for the C phase current.

Figure 27:
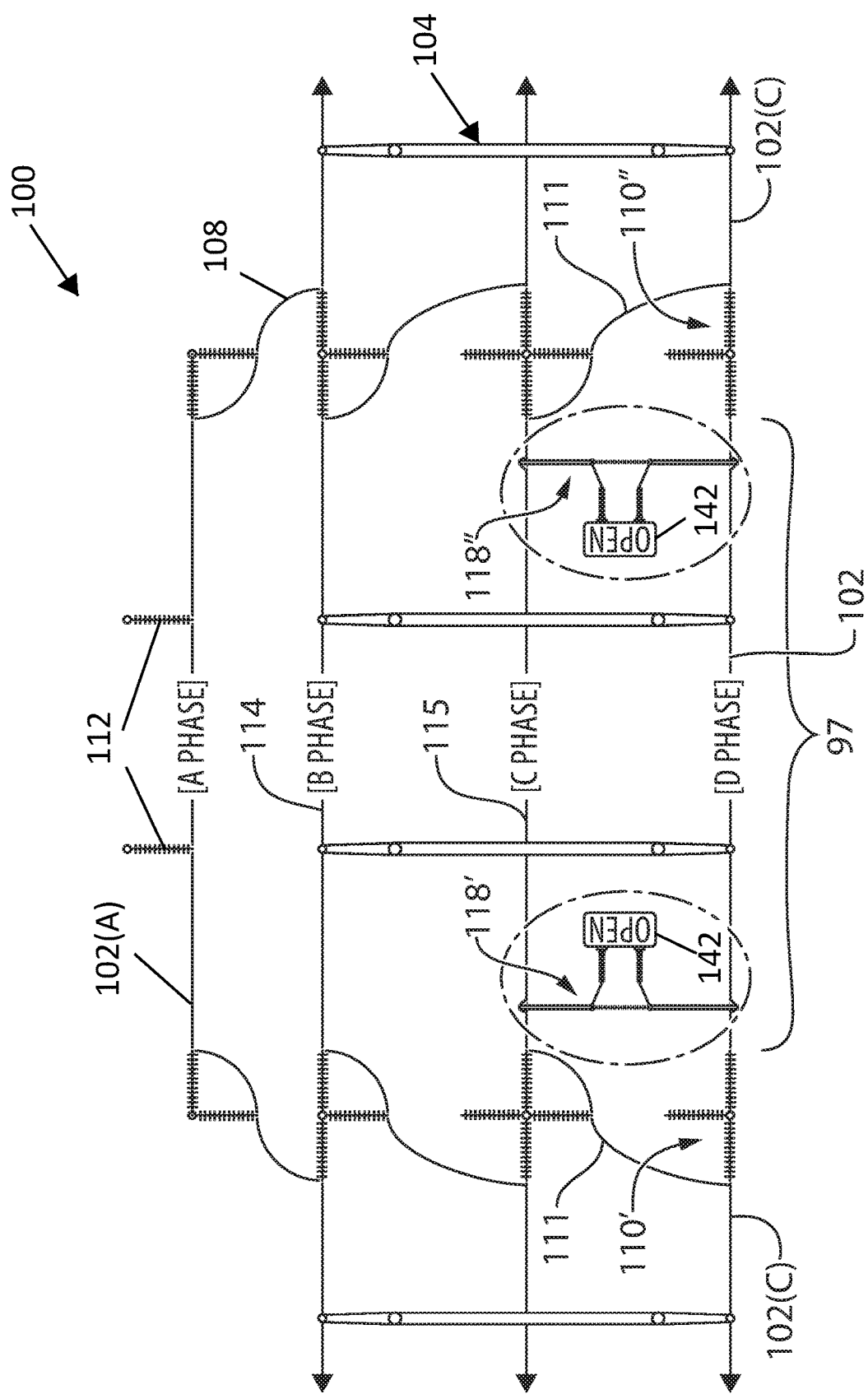
FIG. 27 is a schematic diagram illustrating the power transfer system of FIG. 26 showing the two breakers each connected to a temporary transfer bus set to an open position breaking parallel between the original C phase conductor and the new conductor.

The breaker 142 connected to the first transfer bus 118' is opened, breaking the parallel circuit between the original C phase conductor 102 and the new phase conductor 115. However, the section 97 of the original C phase conductor 102 remains at the same electrical potential as the new phase conductor 115 until the breaker 142 connected to the second transfer bus 118" is opened, as illustrated in FIG. 27. When each of the breakers 142, 142 connected to the transfer buses 118', 118" are open, the section 97 of the original C phase conductor 102 is electrically isolated from the new C phase conductor 115 and becomes the D phase conductor. Although the D phase conductor 102 is de-energized at this stage of the reconductoring or maintenance procedure, it is again important to note that section 97 of the original C phase conductor 102, while isolated from the system 100 power load, is not void of potential. The isolated section 97 of the original C phase conductor 102 is, and should be treated as, a live conductor, because the isolated section 97 of the original C phase conductor 102 is subject to induced currents caused by the surrounding current-carrying phase conductors 102 (C), 115, 114 and may still have a large potential with respect to ground.

Figure 28:
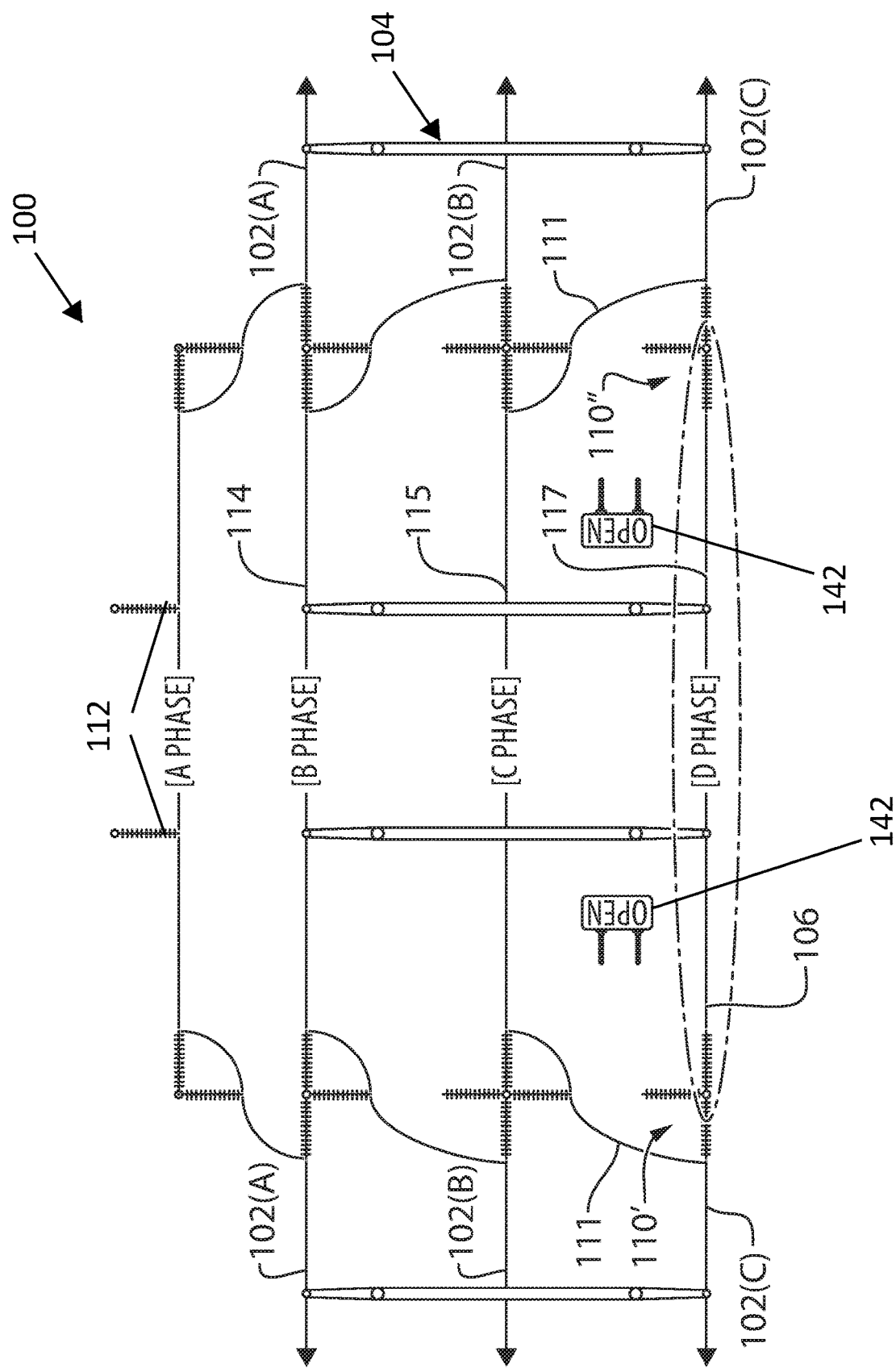
FIG. 28 is a schematic diagram illustrating the power transfer system of FIG. 27 showing new conductor installed between dead end structures on the original C phase line and the two temporary transfer buses removed from the power transfer system.

The isolated section 97 of the original C phase conductor 102 may be broken down, worked on, or replaced without disrupting downstream power delivery. For example, as illustrated in FIG. 28, the two transfer buses 118', 118" are removed, section 97 of the original C phase conductor 102 is removed, and a third new phase conductor 117 is strung, sagged, dead ended and clipped into the position of the original C phase conductor 102. In some embodiments of the invention, the original C phase line 102 is not removed but is rather worked on in other ways, such as replacing an insulator 106. One skilled in the art will appreciate that other types of work may be done on the isolated section 97 of the phase conductor 102 within the scope of the invention.

Once the reconductoring, maintenance and/or repair work is completed on the sections of the A, B and C phase conductors located between the dead end junctures 110', 110", the power load may be transferred to conductors located in the originating positions of the A, B and C phase conductors, as described below and illustrated in FIGS. 29-42.

Figure 29:
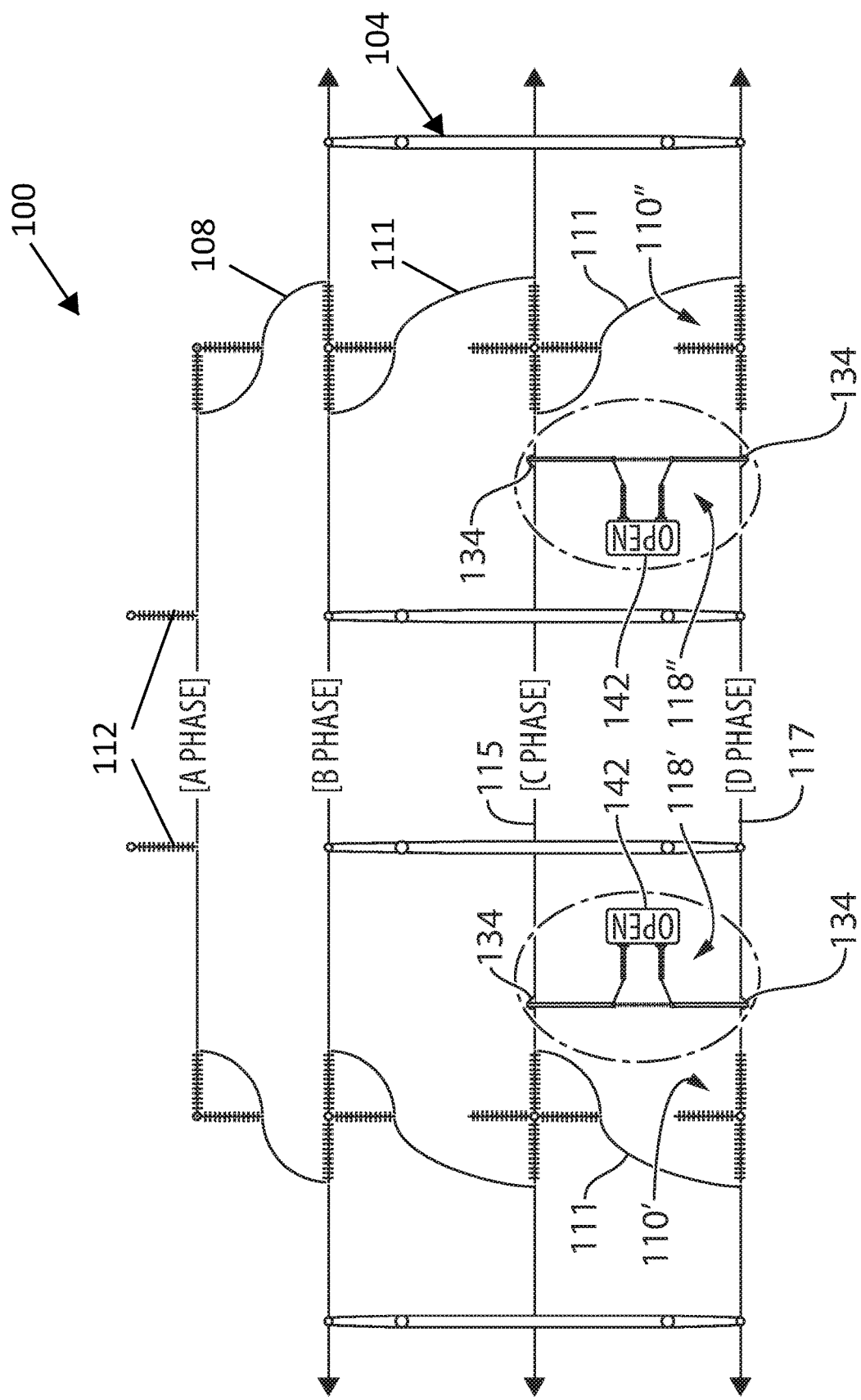
FIG. 29 is a schematic diagram illustrating the power transfer system of FIG. 28 showing two temporary transfer buses each connected to a breaker set in the open position and installed between the new D phase conductor and the new C phase conductor.

As illustrated in FIG. 29, a first transfer bus 118' attached to an open breaker 142 is connected at a first end of the transfer bus 118' to the new D phase conductor 117 using a jumper cable 134, and a second end of the transfer bus 118' is connected to the new phase conductor 115 using a second jumper cable 134. A second transfer bus 118" attached to an open breaker 142 is connected at a first end of the transfer bus 118" to the new D phase conductor 117 using a third jumper cable 134, and a second end of the second transfer bus 118" is connected to the C phase conductor 115 using a fourth jumper cable 134.

Figure 30:
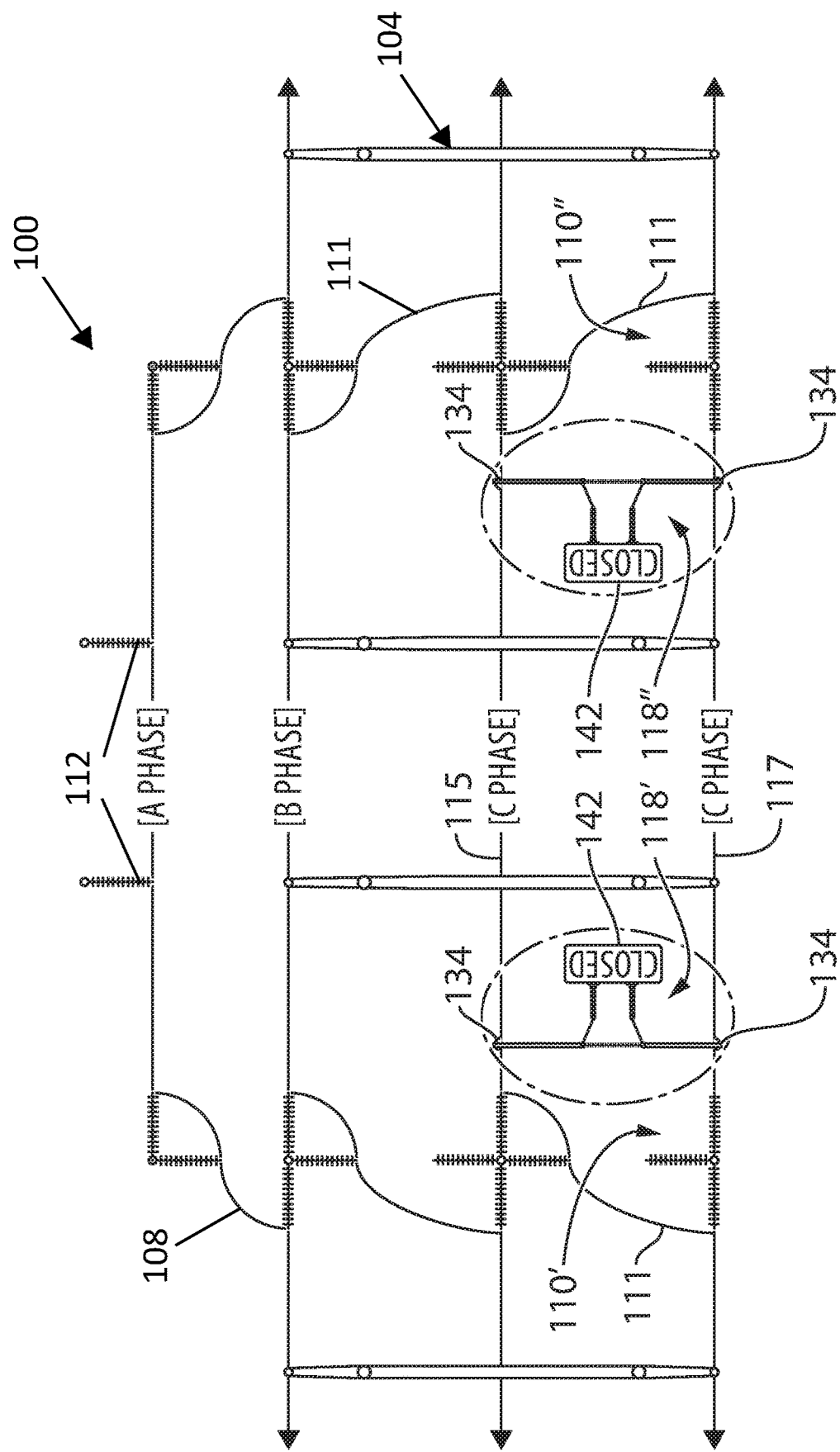
FIG. 30 is a schematic diagram illustrating the power transfer system of FIG. 29 showing the new D phase conductor connected in parallel to the new C phase conductor across two temporary transfer buses that are each connected to a closed breaker.

As illustrated in FIG. 30, the breaker 142 attached to the first transfer bus 118' is then closed, thereby energizing the new D phase conductor 117 and bringing the new D phase conductor 117 to the same electrical potential as the C phase conductor 115. The breaker 142 attached to the second transfer bus 118" is closed, thereby bringing the new D phase conductor 117 into parallel with the C phase conductor 115, whereby the C phase current flows through both the C phase conductor 115 and the D phase conductor 117, as shown in FIG. 30.

Figure 31:
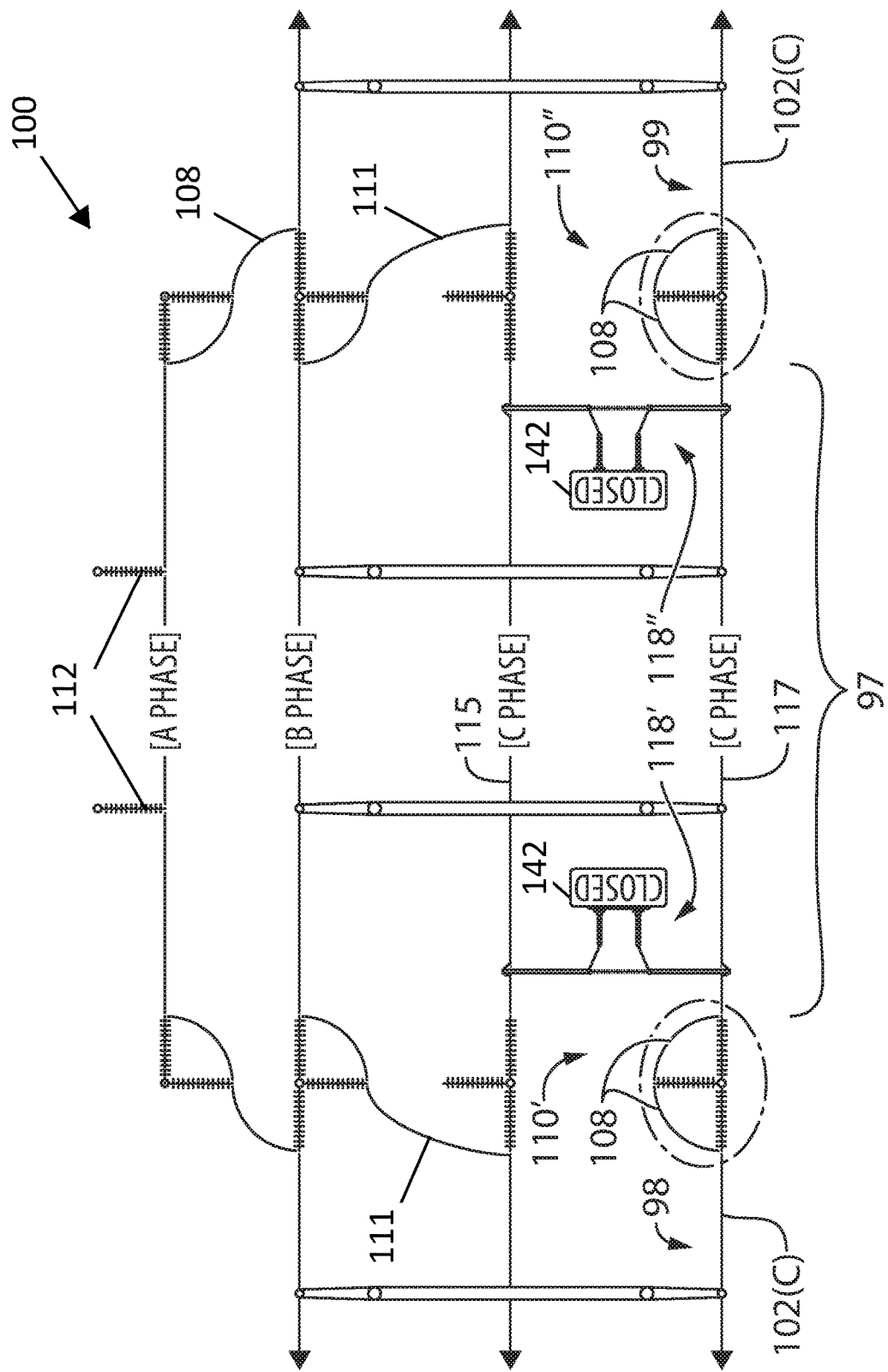
FIG. 31 is a schematic diagram illustrating the power transfer system of FIG. 30 showing the removal of the two jumper cables illustrated in FIG. 30 each connecting the original C phase conductor to the new C phase conductor across dead end junctures and showing the installation of new jumper cables across the two dead end junctures on the new C phase conductor line.

Next, as illustrated in FIG. 31, two jumper cables 108, 108 are used to connect the section 98 of the original C phase conductor 102 (C) opposite the new phase conductor 117 across the first dead end juncture 110' to the new phase conductor 117. Two additional jumper cables 108, 108 are used to connect the section 99 of the original C phase conductor 102 (C) opposite the new phase conductor 117 across the second dead end juncture 110" to the new C phase conductor 117 across the second dead end juncture 110". Once the permanent jumper cables 108 are in place, the temporary long jumper cables 111, 111 connecting each of the sections 98, 99 of the original C phase conductor 102 to the C phase conductor 115 are removed. The connection of the jumper cables 108 and the disconnection of the temporary long jumper cables 111 is accomplished using live line equipment, such as hot sticks. Once this jumpering procedure is complete, whereby the new permanent jumper cables 108 are installed and the temporary long jumper cables 111 are removed, the C phase current continues to flow in parallel through both the new C phase conductor 117 and the phase conductor 115, through the circuit path provided by the closed breakers 142 on the two temporary transfer buses 118', 118" as shown in FIG. 31.

Figure 32:
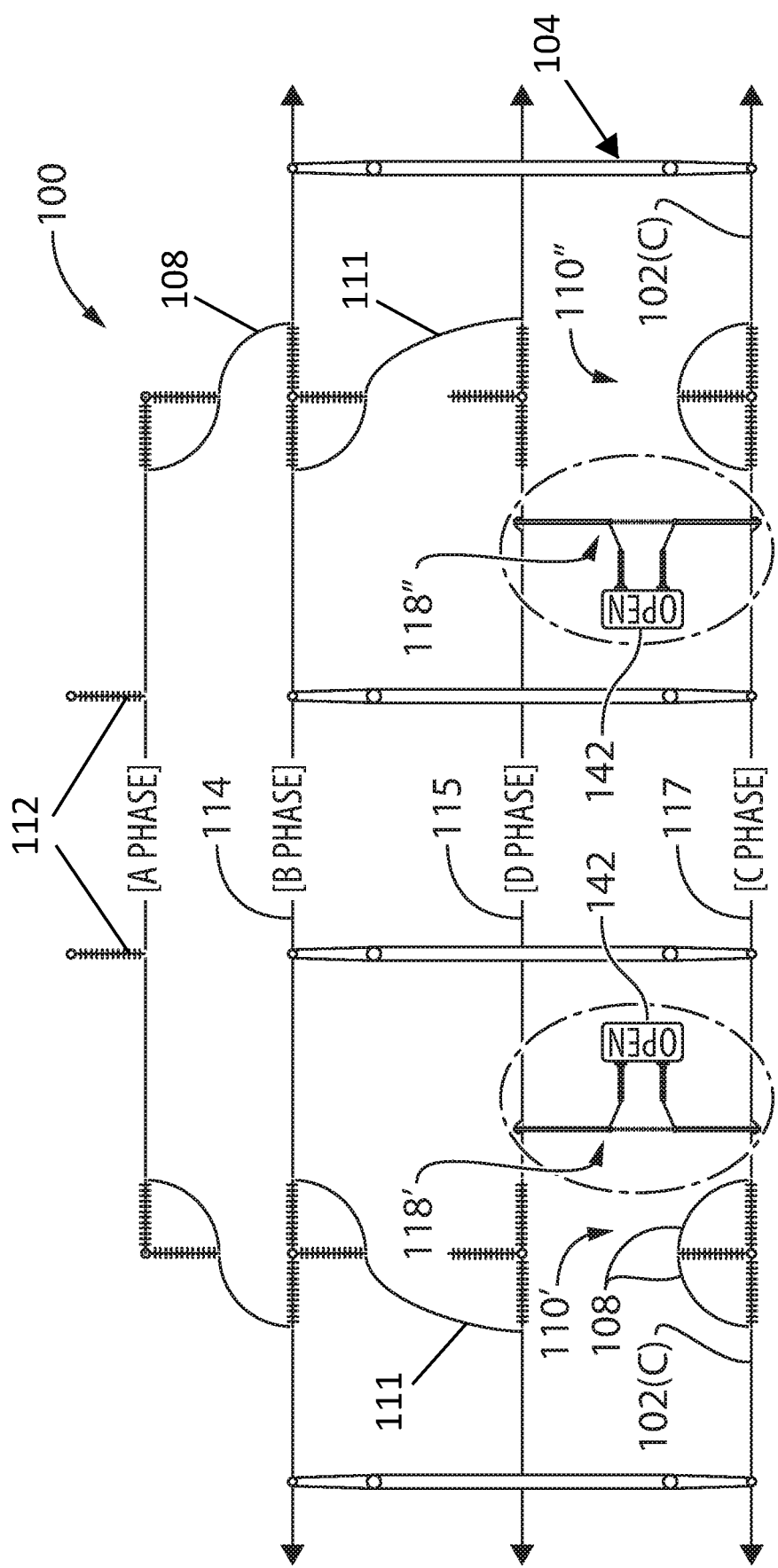
FIG. 32 is a schematic diagram illustrating the power transfer system of FIG. 31 showing each of the two breakers connected to the two temporary transfer buses set to an open position breaking parallel between the new C phase conductor and the D phase conductor.

The breaker 142 connected to the first transfer buses 118' is then opened, thereby breaking the parallel circuit between the new C phase conductor 117 and the phase conductor 115. However, the phase conductor 115 remains energized and at the same electrical potential as the new C phase conductor 117. The breaker 142 connected to the second transfer bus 118" is then opened, thereby de-energizing the phase conductor 115, which becomes the D phase conductor because the phase conductor 115 no longer carries the C phase current, or any phase current, as illustrated in FIG. 32. At this stage, the two temporary transfer buses 118', 118" may be removed from the power transfer system 100. Although the phase conductor 115 is de-energized and is not carrying current at this point in the reconductoring procedure, it must still be treated as a live conductor because the isolated D phase conductor 115 is subject to induced currents caused by the surrounding current-carrying phase conductors 114, 117 and may still have a large potential with respect to ground.

Figure 33:
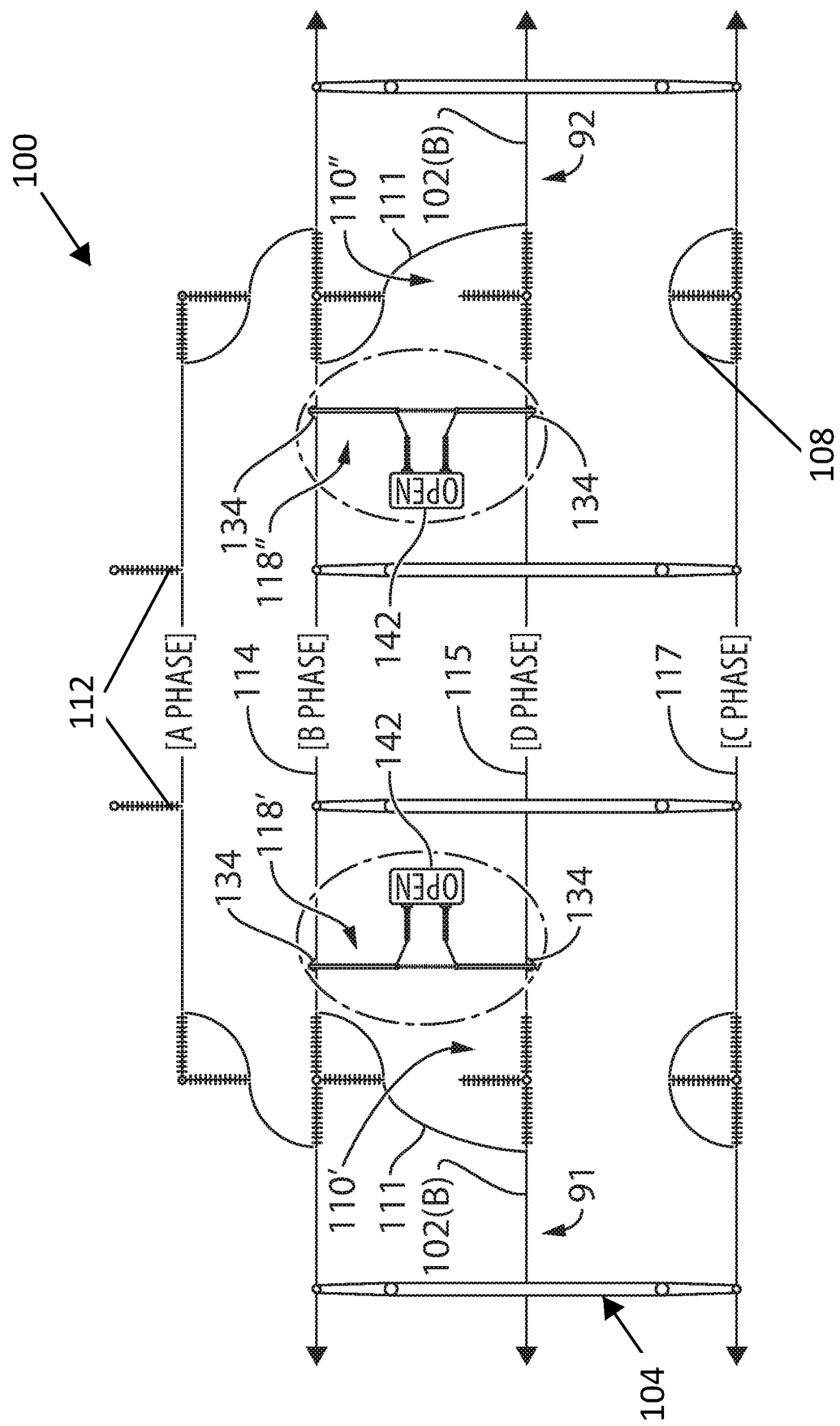
FIG. 33 is a schematic diagram illustrating the power transfer system of FIG. 32 showing two temporary transfer buses each connected to a breaker set in the open position and installed between the D phase conductor and the new B phase conductor.

As illustrated in FIG. 33, two temporary transfer buses 118', 118" connected to breakers 142, 142 set in the open position are temporarily installed between the D phase conductor 115 and the B phase conductor 114, by utilizing jumper cables 134 to firstly connect a first end of each transfer bus 118', 118" to the D phase conductor 115 near each of the dead end junctures 110', 110", and then secondly using jumper cables 134 to connect a second end of each transfer bus 118', 118" to the B phase conductor 114 near each of the dead end junctures 110', 110". Once the temporary transfer buses 118', 118" are installed with the breakers 142, 142 remaining open, the B phase current continues to flow through the sections 91, 92 of the original B phase conductor 102 (B) opposite of the D phase conductor 115 on opposing sides of the dead end junctures 110', 110" and through the B phase conductor 114. As such, the B phase current continues to bypass the D phase conductor 115 while the breakers 142, 142 remain open.

Figure 34:
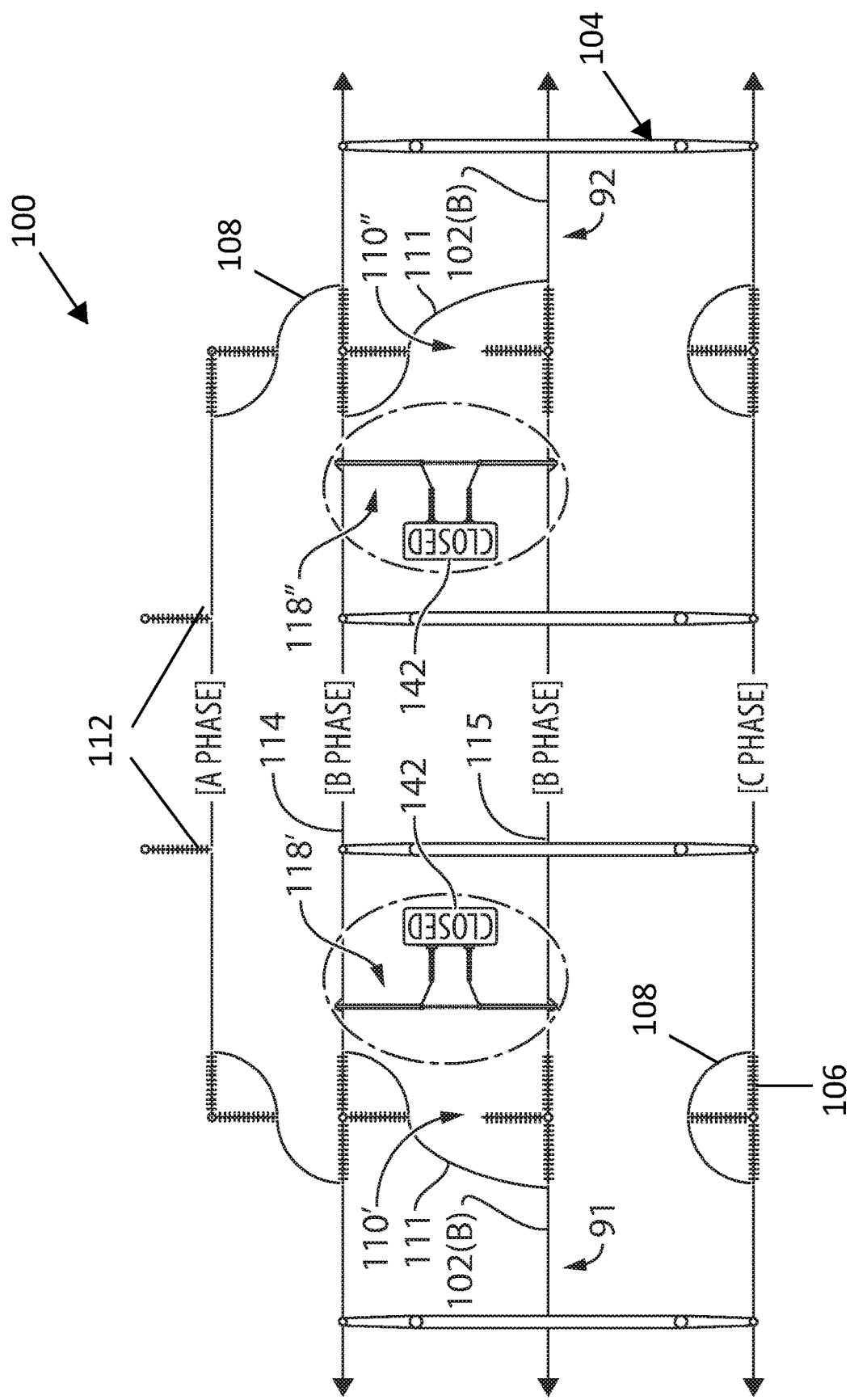
FIG. 34 is a schematic diagram illustrating the power transfer system of FIG. 33 showing the D phase conductor connected in parallel to the new B phase conductor across two temporary transfer buses that are each connected to a closed breaker.

The breaker 142 connected to the first temporary transfer bus 118' is closed, energizing the D phase conductor 115 and bringing the phase conductor 115 to the same electrical potential difference as the B phase conductor 114. The breaker 142 connected to the second temporary transfer bus 118" is closed, thereby providing a parallel path for the B phase current to flow through both the phase conductors 114 and 115, as illustrated in FIG. 34. Once each of the two breakers 142, 142 connected to the two transfer buses 118', 118" are closed, the B phase current flows through the section 91 of the original B phase conductor 102 (B) opposite the new phase conductor 115 across the first dead end juncture 110', through the long jumper cable 111 to the B phase conductor 114, through the temporary transfer buses 118', 118" and the closed breakers 142, 142 to the new B phase conductor 115, and through the second long jumper cable 111 to the section 92 of the original B phase conductor 102 (B) located opposite the new phase conductor 115 across the second dead end juncture 110".

Figure 35:
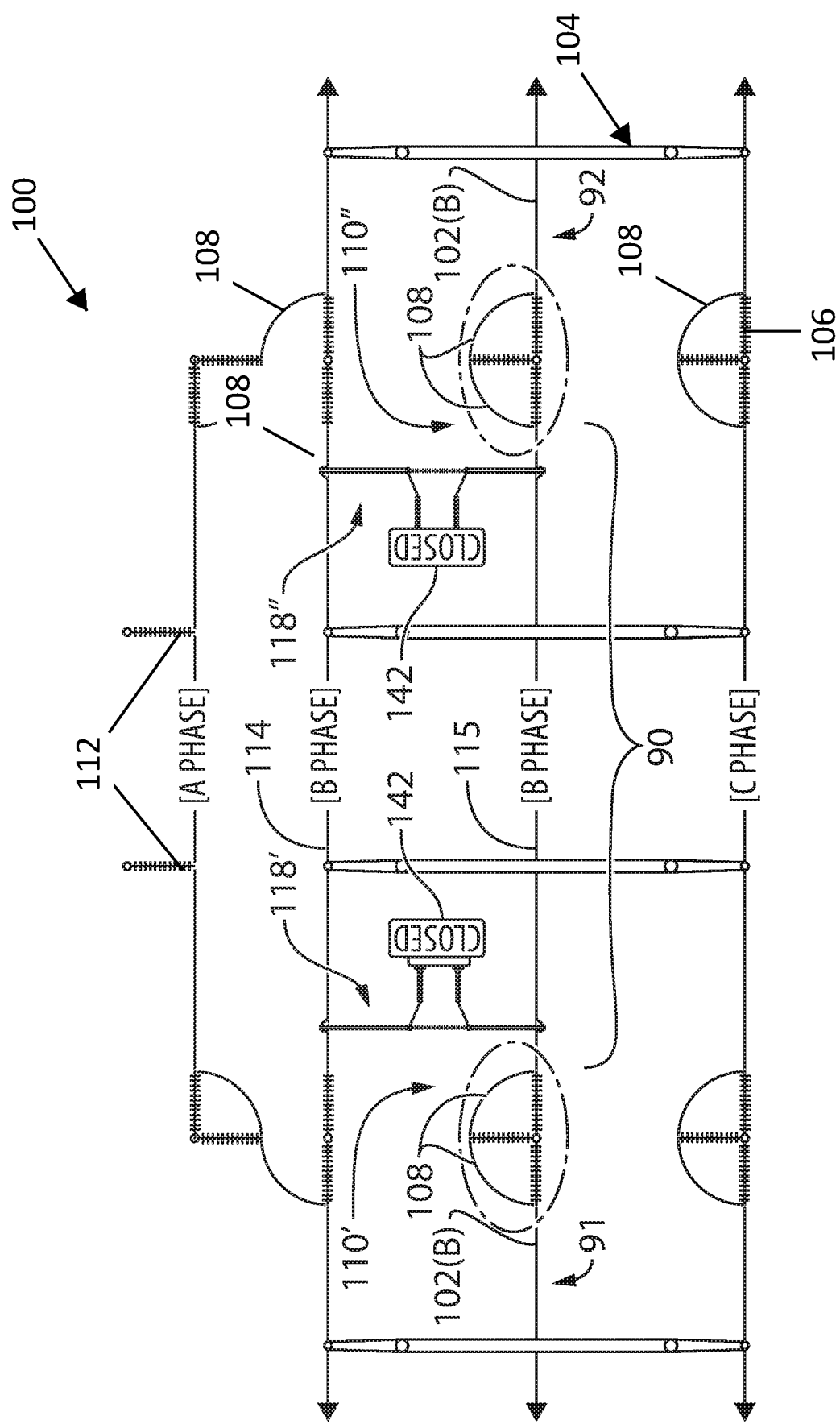
FIG. 35 is a schematic diagram illustrating the power transfer system of FIG. 34 showing the removal of the two jumper cables illustrated in FIG. 34 each connecting the original B phase conductor to the new phase conductor across dead end junctures and showing the installation of new jumper cables across the two dead end junctures on the new B phase conductor line.

As illustrated in FIG. 35, two jumper cables 108, 108 are used to connect the section 91 of the original B phase conductor 102 (B) opposite the new phase conductor 115 across the first dead end juncture 110' to the new B phase conductor 115. Two additional jumper cables 108, 108 are used to connect the section 92 of the original B phase conductor 102 (B) opposite the new phase conductor 115 across the second dead end juncture 110" to the new phase conductor 115. Once the permanent jumper cables 108 are in place, the temporary long jumper cables 111, 111 connecting each of the sections 91, 92 of the original B phase conductor 102 (B) to the new B phase conductor 115 are removed. The connection of the jumper cables 108 and the disconnection of the temporary long jumper cables 111 is accomplished using live line equipment, such as hot sticks. Once this jumpering procedure is complete, whereby the new permanent jumper cables 108 are installed and the temporary long jumper cables 111, 111 are removed, the B phase current continues to flow in parallel through both the new B phase conductor 115 and the B phase conductor 114, through the path provided by the closed breakers 142, 142 connected to each of the two temporary transfer buses 118', 118", shown in FIG. 35.

Figure 36:
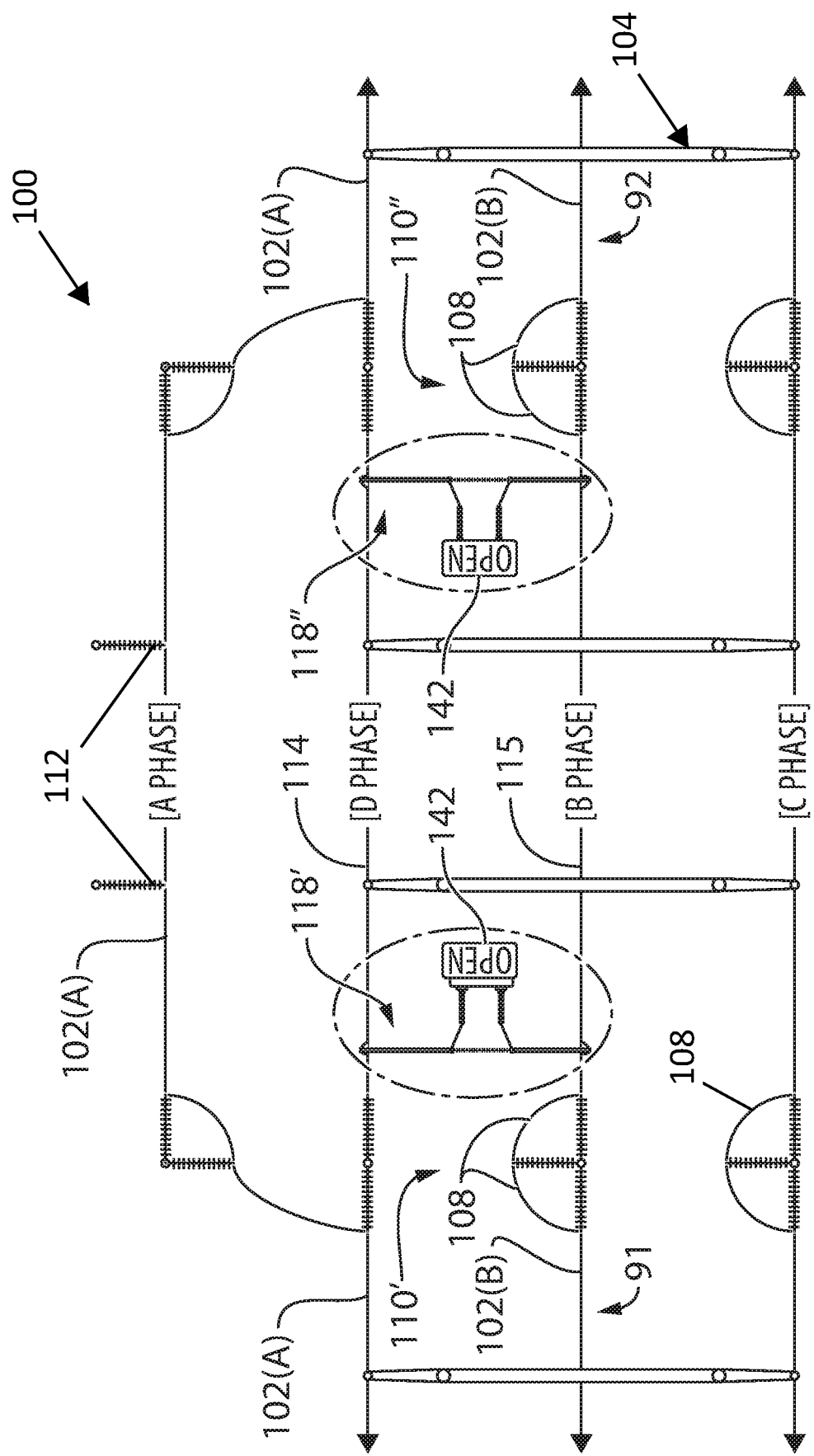
FIG. 36 is a schematic diagram illustrating the power transfer system of FIG. 35 showing each of the two breakers connected to the two temporary transfer buses set to an open position breaking parallel between the new B phase conductor and the D phase conductor.

The breaker 142 connected to the first transfer bus 118' is then opened, thereby breaking the parallel circuit between the new B phase conductor 115 and the phase conductor 114. However, the phase conductor 114 remains energized and at the same electrical potential as the new B phase conductor 115 once only one of the breakers 142 connected to the transfer buses 1181, 118" has been opened. The breaker 142 connected to the second transfer bus 118" is then opened, thereby de-energizing the phase conductor 114, which becomes the D phase conductor because the phase conductor 114 no longer carries the B phase current, as shown in FIG. 36. At this stage, the two temporary transfer buses 118', 118" may be removed from the power transfer system 100. Although the phase conductor 114 is de-energized and is not carrying current at this point in the reconductoring procedure, it must still be treated as a live conductor because the electrically isolated phase conductor 114 is subject to induced currents caused by the surrounding current-carrying phase conductors 115, 102 (A) and may still have a large potential with respect to ground.

Figure 37:
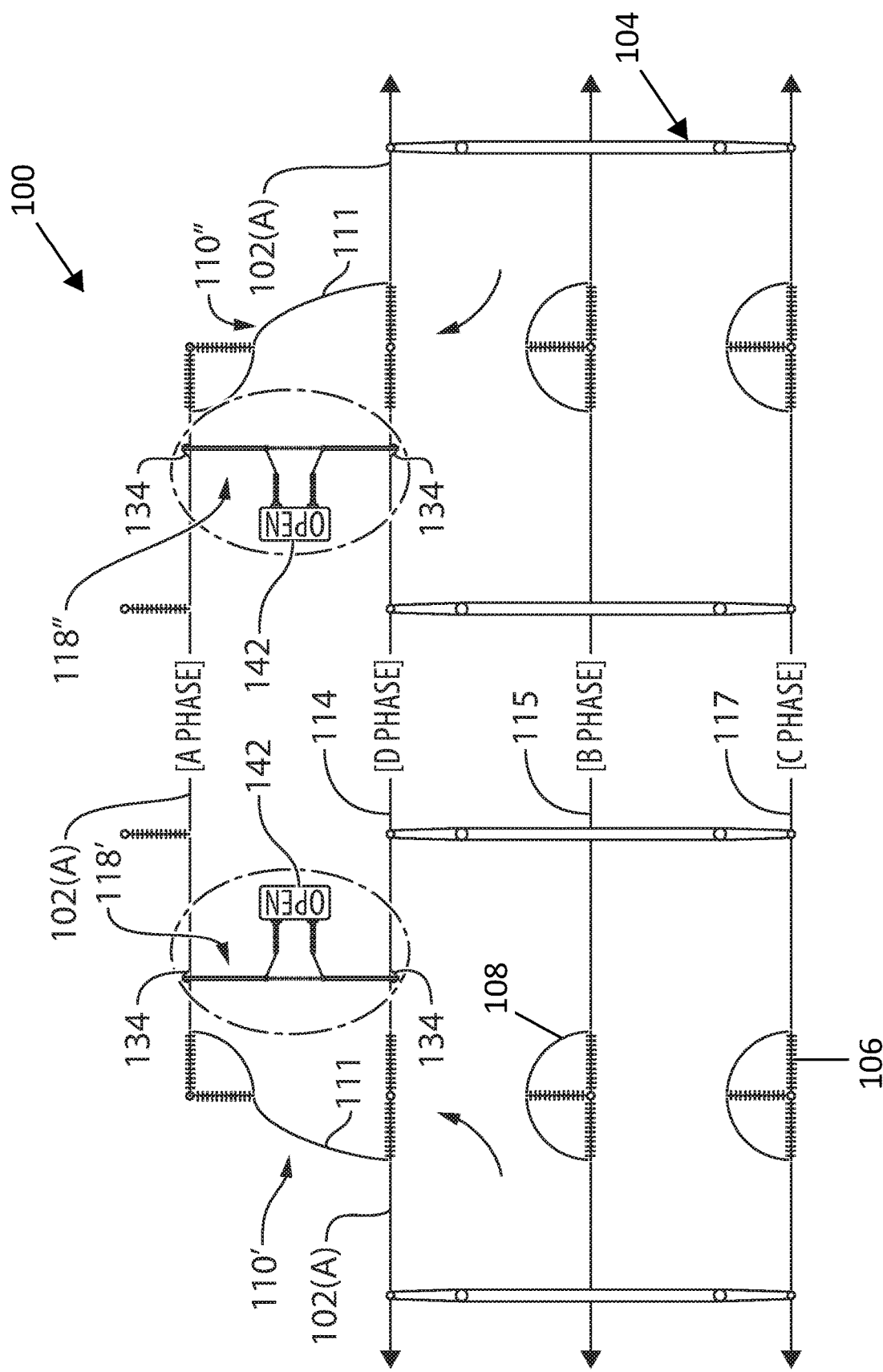
FIG. 37 is a schematic diagram illustrating the power transfer system of FIG. 36 showing two temporary transfer buses each connected to a breaker set in the open position and installed between the D phase conductor and the original A phase conductor located in a temporary position.

As illustrated in FIG. 37, a first transfer bus 118' connected to an open breaker 142 is connected at one end of the transfer bus 118' to the D phase conductor 114 using a jumper cable 134, and a second end of the first transfer bus 118' is connected to the original A phase conductor 102 (A) using a second jumper cable 134. A second transfer bus 118" connected to an open breaker 142 is connected at a first end of the transfer bus 118" to the D phase conductor 114 using a third jumper cable 134, and a second end of the second transfer bus 118" is connected to the original A phase conductor 102 (A) using a fourth jumper cable 134.

Figure 38:
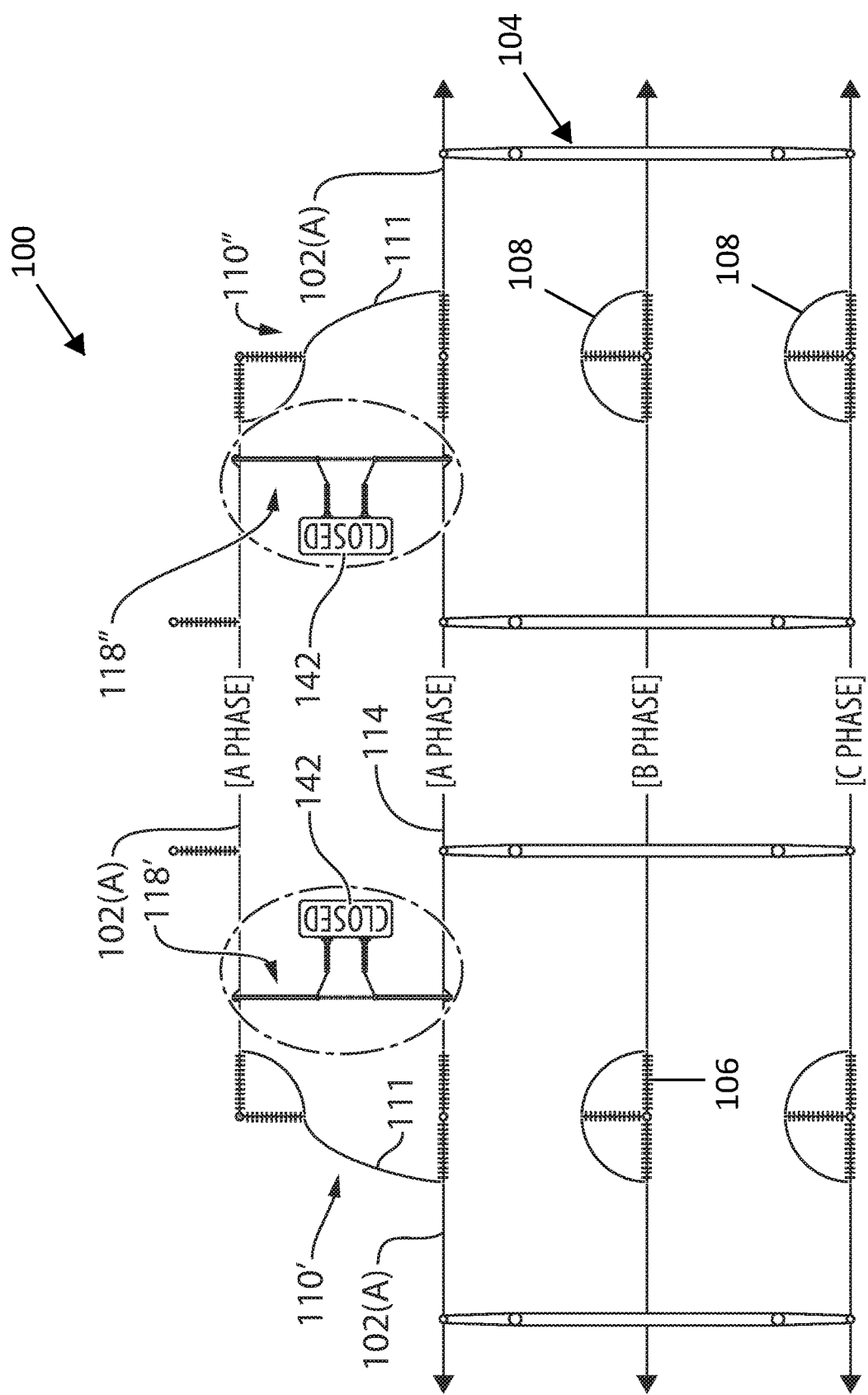
FIG. 38 is a schematic diagram illustrating the power transfer system of FIG. 37 showing the D phase conductor connected in parallel to the original A phase conductor across two temporary transfer buses that are each connected to a closed breaker.

The breaker 142 connected to the first transfer bus 118' is then closed, thereby energizing the D phase conductor 114 and bringing the D phase conductor 114 to the same electrical potential as the original A phase conductor 102 (A). The breaker 142 connected to the second transfer bus 118" is closed, thereby bringing the new phase conductor 114 into parallel with the original A phase conductor 102 (A), whereby the A phase current flows through both the original A phase conductor 102 (A) and the new A phase conductor 114, as shown in FIG. 38.

Figure 39:
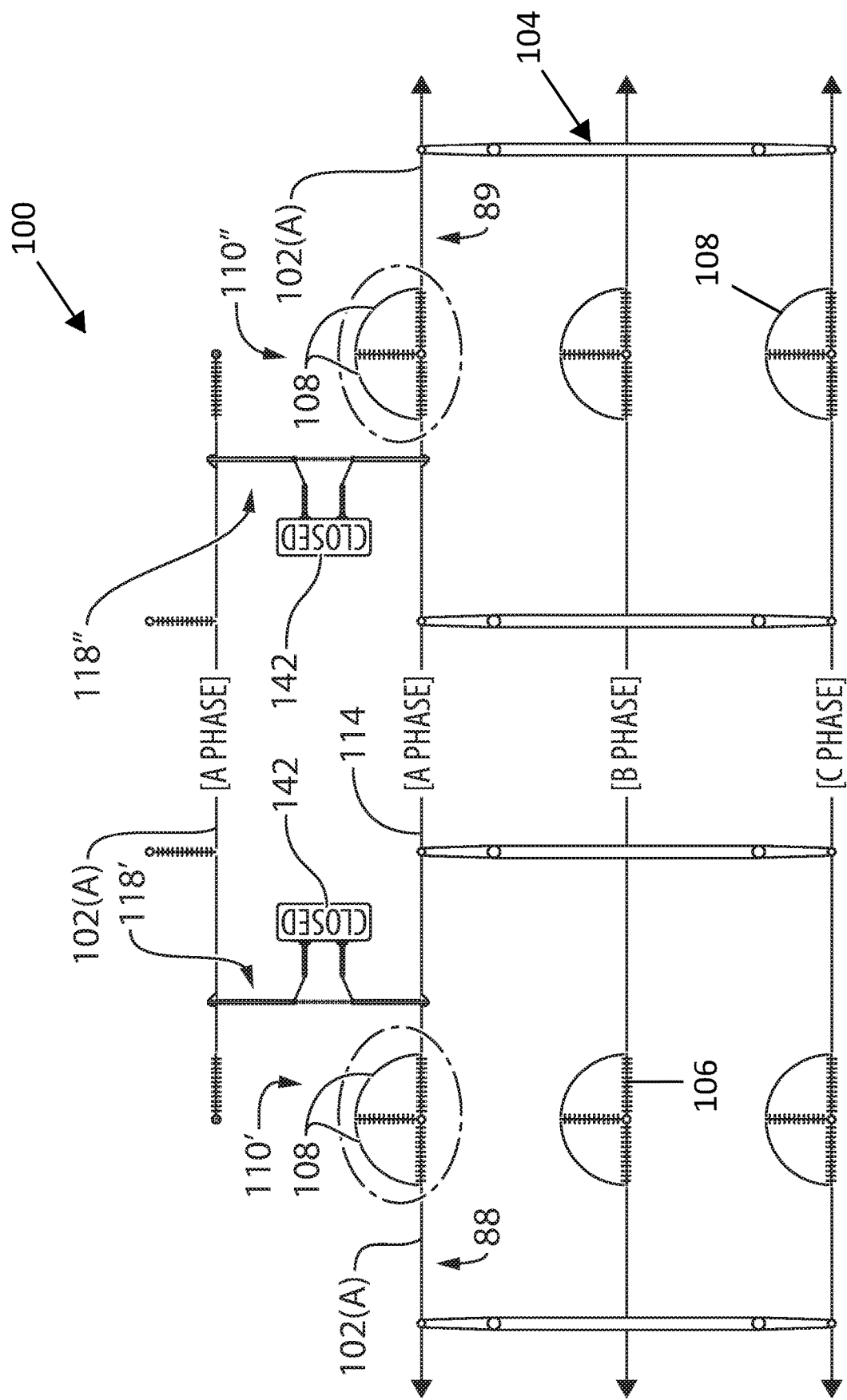
FIG. 39 is a schematic diagram illustrating the power transfer system of FIG. 38 showing the removal of the two jumper cables illustrated in FIG. 38 each connecting the original A phase conductor to the temporarily relocated section of A phase conductor across dead end junctures and showing the installation of new jumper cables across the two dead end junctures on the new A phase conductor line.

As illustrated in FIG. 39, two jumper cables 108, 108 are used to connect the section 88 of the original A phase conductor 102 (A) located opposite the new A phase conductor 114 across the first dead end juncture 110' to the new A phase conductor 114. Two additional jumper cables 108, 108 are used to connect the section 89 of the original A phase conductor 102 (A) located opposite the new A phase conductor 114 across the second dead end juncture 110" to the new A phase conductor 114. Once the permanent jumper cables 108 are in place, the temporary long jumper cables 111, 111 connecting each of the sections 88, 89 of the original A phase conductor 102 (A) to the new A phase conductor 114 are removed. The connection of the jumper cables 108 and the disconnection of the temporary long jumper cables 111 is accomplished using live line equipment, such as hot sticks.

Once this jumpering procedure is complete, whereby the new permanent jumper cables 108 are installed and the temporary long jumper cables 111 are removed, the A phase current continues to flow in parallel through both the new A phase conductor 114 and the original A phase conductor 102 (A), through the path provided by the closed breakers 142 connected to each of the two temporary transfer buses 118', 118" as shown in FIG. 39.

Figure 40:
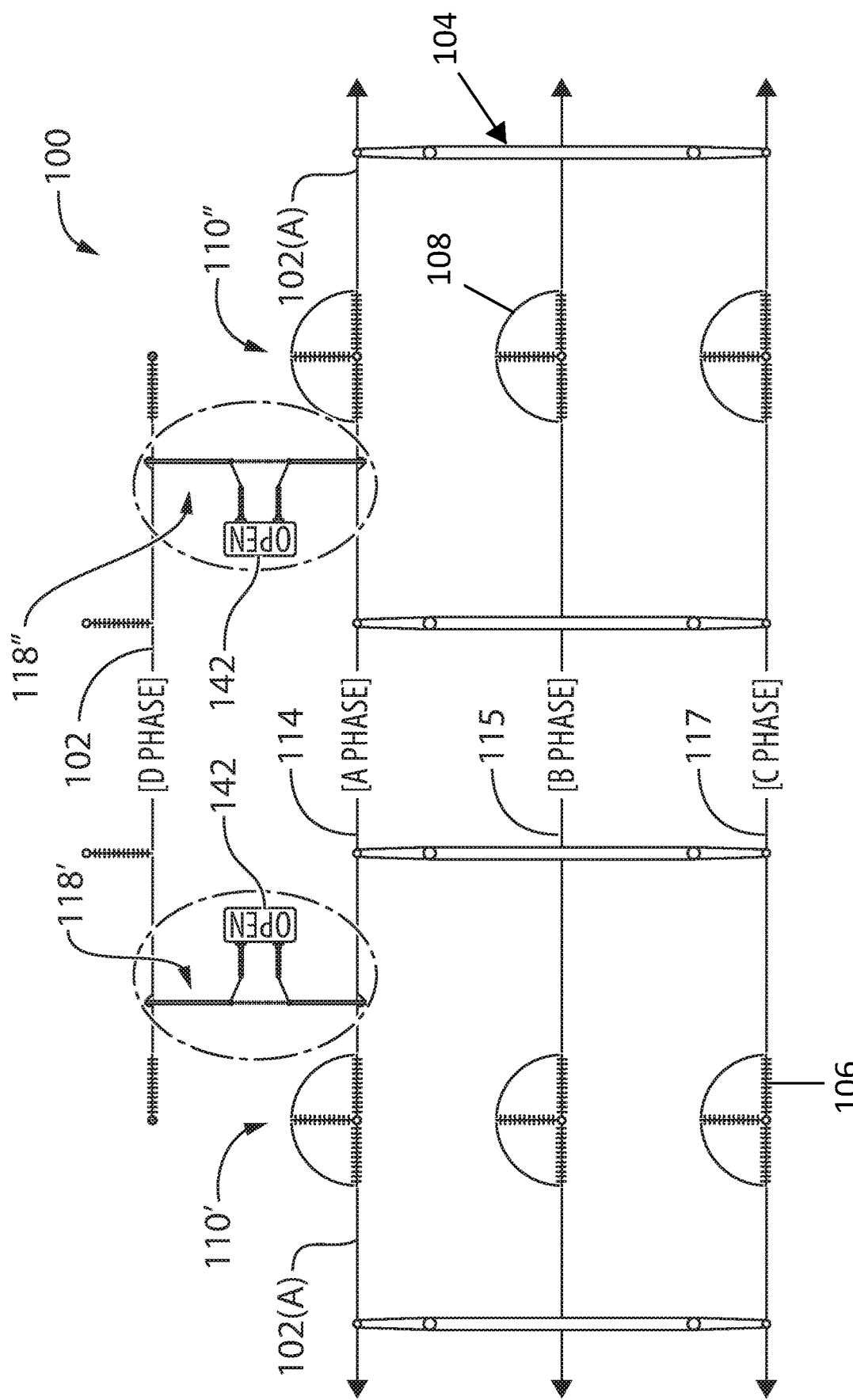
FIG. 40 is a schematic diagram illustrating the power transfer system of FIG. 39 showing each of the two breakers connected to the two temporary transfer buses set to an open position breaking parallel between the new A phase conductor and the original A phase conductor.

The breaker 142 connected to the first transfer bus 118' is then opened, thereby breaking the parallel circuit between the new A phase conductor 114 and the original A phase conductor 102 (A). However, the original A phase conductor 102 remains energized and at the same electrical potential as the new A phase conductor 114. The breaker 142 connected to the second transfer bus 118" is then opened, thereby de-energizing the original A phase conductor 102 (A), which becomes the D phase conductor because the original A phase conductor 102 (A) no longer carries the A phase current or any other current, as illustrated in FIG. 40.

Figure 41:
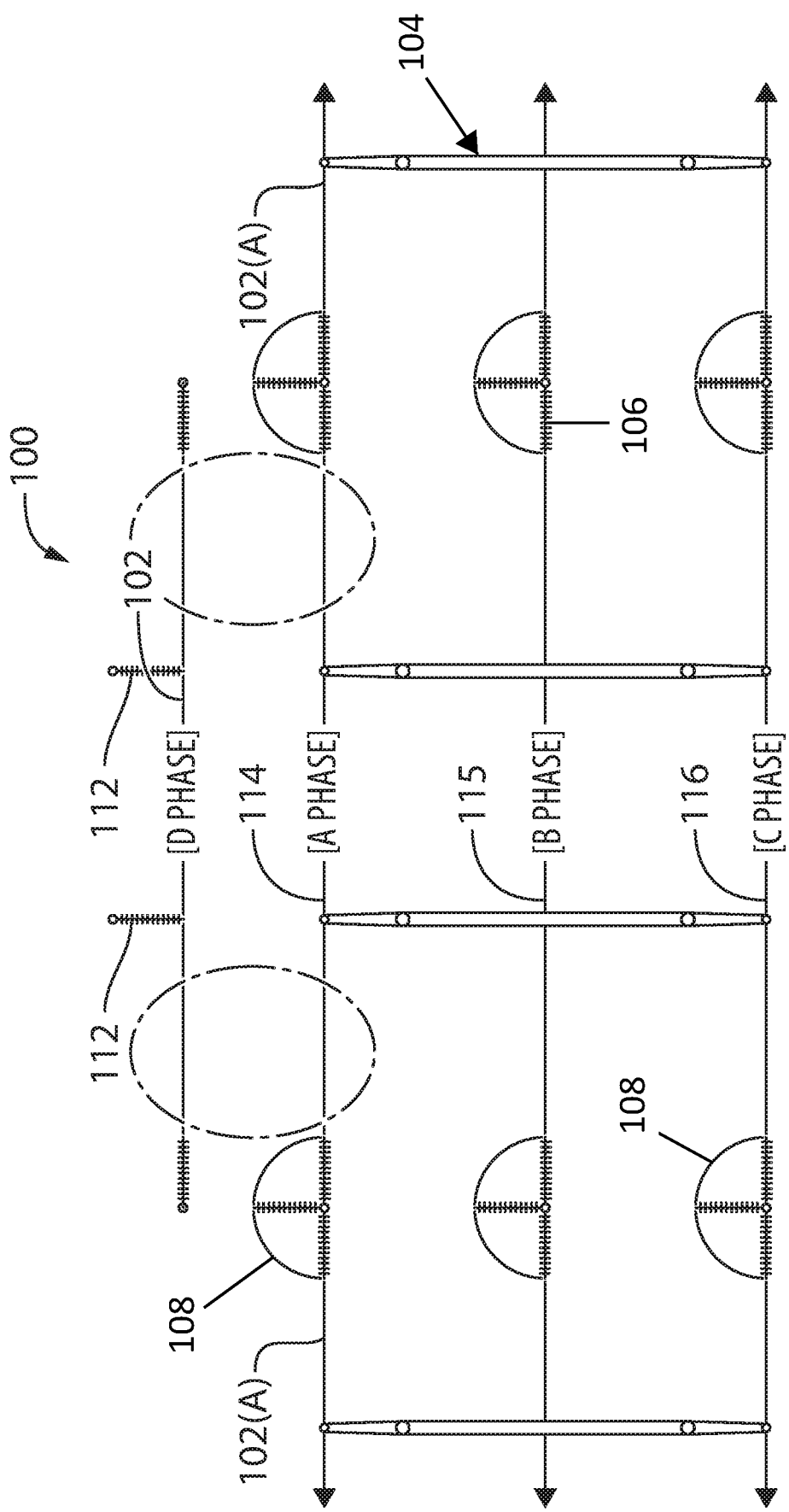
FIG. 41 is a schematic diagram illustrating the power transfer system of FIG. 40 showing the removal of the two temporary transfer buses and the two breakers from the power transfer system.
Figure 42:
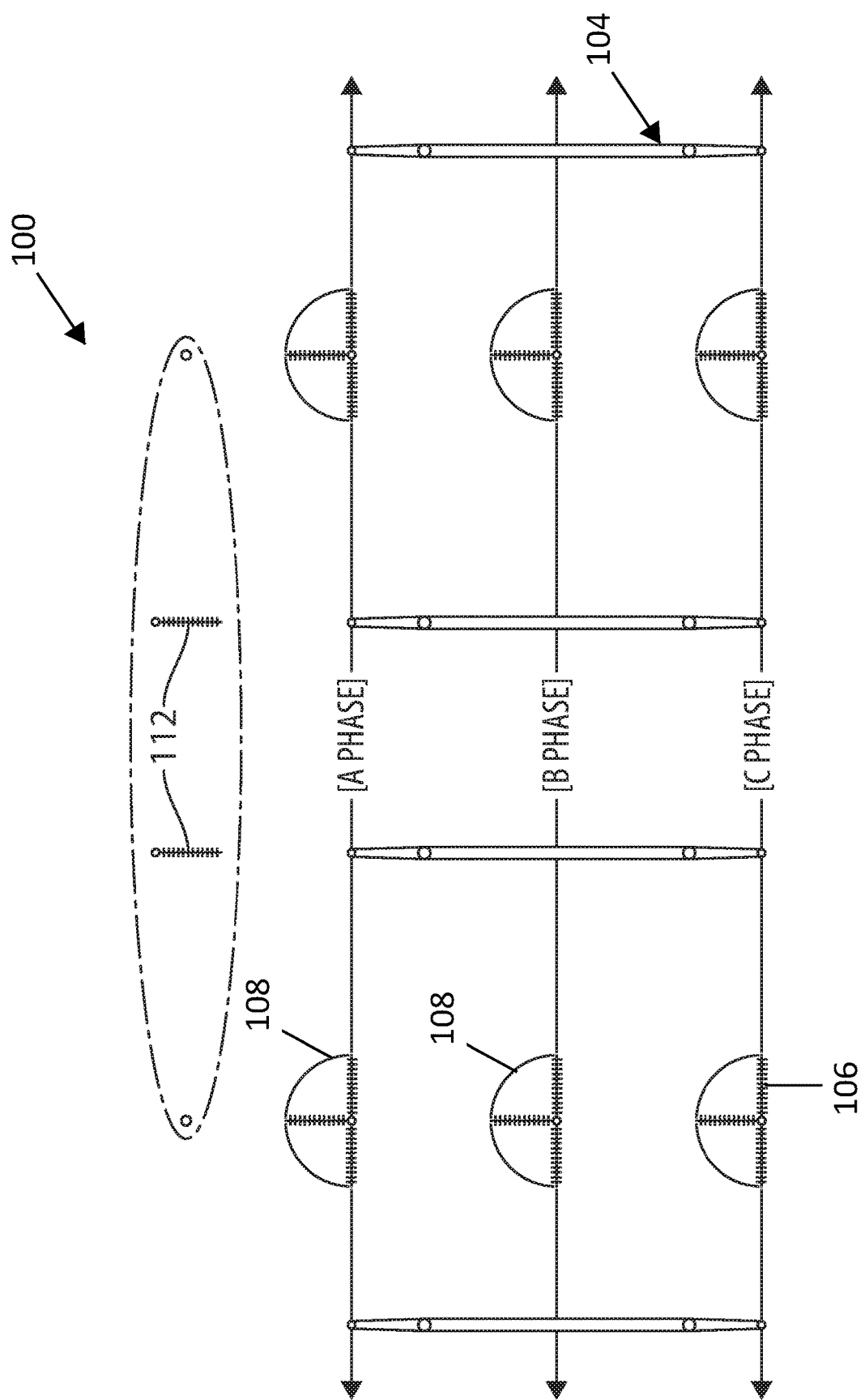
FIG. 42 is a schematic diagram illustrating the power transfer system of FIG. 41 showing the removal of the de-energized original A phase conductor from the power transfer system.

At this stage, the two temporary transfer buses 118', 118" and the breakers 142, 142 connected to the transfer buses 118', 118" may be removed from the power transfer system 100, as illustrated in FIG. 41. Although the original A phase conductor 102 (A), which is de-energized and is not carrying current at this point in the reconductoring procedure and has therefore become the D phase, it must still be treated as a live conductor because the electrically isolated phase conductor 102 is subject to induced currents caused by the surrounding current-carrying phase conductor 114 and may still have a large potential with respect to ground. As shown in FIG. 42, the original A phase conductor 102 (A) may be removed from the temporary support structures 112, 112; optionally, the temporary support structures 112 may also be removed from the power transfer system 100.

As a person ordinarily skilled in the art will appreciate, the improved method for conducting repairs and maintenance on live conductors described herein provides the ability to replace, maintain or repair one or more phase conductors without interrupting the supply of power to downstream customers by relocating a section of a phase conductor located between two dead end junctures to a temporary location, transferring the power load from a section of an adjacent conductor located between two dead end junctures to the temporarily relocated conductor, performing maintenance or repair work on the adjacent conductor, or in the alternative, replacing the adjacent conductor with a new conductor, and then repeating the steps of transferring power loads and conducting repair, maintenance or replacement on each adjacent conductor until all of the desired repair, maintenance or replacement work is complete.

Importantly, this improved method described herein enables repair, maintenance or replacement work to be conducted on live conductors while avoiding the illegal transposition of the phase conductors throughout the entire procedure. Because of the effect of induced currents and impedance on a phase conductor caused by the close proximity of additional live phase conductors, it is possible that transposing one phase conductor with respect to the other phase conductors may result in an electrical surge in one or more of the phase conductors, which in turn may trip a protective relay and result in the disruption of power delivery to downstream customers.

By way of illustrating an example of illegal transposition, consider three phase conductors carrying phases A, B and C that are arranged horizontally with respect to each other in the following order: A-B-C. In the method described herein, as illustrated in FIGS. 1-42, the relative position of each of the phase conductors, "A-B-C", remains the same at each step of the re-conductoring procedure. In other words, at no point during the procedure described herein does the relative positions of the A, B and C phase conductors change from the original A-B-C relative arrangement; that is, at no point in the example illustrated and described herein does the method result in transposition of the phase conductors to, for example, an A-C-B arrangement or a C-A-B arrangement or any other transposed arrangement.

Furthermore, in the example of the procedure described herein and illustrated in FIGS. 1-42 (see in particular, FIGS. 4 and 5), the A phase conductor 102 is relocated to temporary position 96 at a distance L from the originating position 95 of the A phase conductor 102, wherein the distance L is substantially equal to the phase spacing distance J between C phase conductor 102 and B phase conductor 102, and L is also substantially equal to the phase spacing distance J between B phase conductor 102 and the originating position 95 of the A phase conductor 102. Temporarily relocating A phase conductor 102 to a temporary position 96 at a distance L from the originating position 95 that is substantially equal to the existing phase spacing J between the A, B and C phase conductors minimizes the induced current and resulting impact on the impedance on the phase conductors A, B and C that may otherwise occur if distance L was substantially shorter or longer than phase spacing J, and/or if the positions of any of the phase conductors A, B and C were to be transposed from their original A-B-C relative positioning at any point during the maintenance and repair work described herein.

An example of a procedure for stringing a de-energized, new phase conductor into a transmission system, such as for example the D phase conductor 114 illustrated in FIG. 8, involves connecting a traveler to a support structure, stringing a pull line (or pulling line) with at least one non-conductive end through the traveler, connecting the pull line via a swivel and a flexible isolator to the conductor, pulling the pull line through the traveler and thereby causing the conductor to be strung through the traveler, attaching the conductor to the support structure, removing the traveler from the support structure, and disconnecting the pull line from the conductor. It is known by a person ordinarily skilled in the art to use a di-electric tested section of rope installed between the pulling line and the new conductor being strung onto the support structure to provide the non-conductive end of the pull line. The Applicant recently filed United States application Ser. No. 14/664,724 filed on Mar. 20, 2015, entitled Flexible Electrical Isolation Device, the disclosure of which is incorporated herein in its entirety, which describes a flexible elongated insulator having couplings mounted at either end of the insulator. This isolation device, otherwise referred to as a flexible isolator or flexible insulator, consists of a flexible, bendable or otherwise deformable (herein collectively referred to as flexible) member to accommodate the bending radius of a traveler and is composed of a high tensile strength, dielectric material with attachment points, or couplings, on each end. The attachment points or couplings are constructed so as to control both rotation imparted by the cables and bi-directional shear induced when the couplings or attachment points pass through the conductive travelers.

A switch 140 may be used in place of the breaker for lighter applications. Operation using the switch in place of a breaker is basically the same and will not be repeated. The switch 140 is a typical air break disconnect switch. It has a disconnect blade 141 that can be operated to a closed position (see FIG. 44) and an open position (see FIG. 45). The switch 140 has connectors 145 on each end that permits conductors 120, 120 of the transfer bus 118 to be electrically connected to the switch 140. When the disconnect blade 141 is in the closed position, it provides an electrical connection between the two conductors 120, 120 via the switch 140. When the disconnect blade 141 is in the open position, there is no electric connection between the two conductors 120, 120.

The switch 140 has an actuator 143 that operates the disconnect blade 141. The opening and closing of the switch is controlled by the actuator 143. The switch 140 is supported on a frame 147 that provides mechanical support for the switch 140. The frame 147 is insulated from the conductors by insulators 149. According to some embodiments of the invention, the switch 140 may be mounted on temporary support structure or a lift apparatus, such as a boom of a vehicle or, for example, preferably a robotic mechanical arm device 101 adapted to manipulate heavy energized conductors such as the phase conductors 102 described in the Applicant's U.S. Pat. No. 8,573,562, for ease and convenience in practicing some embodiments of the invention.

Figure 46:
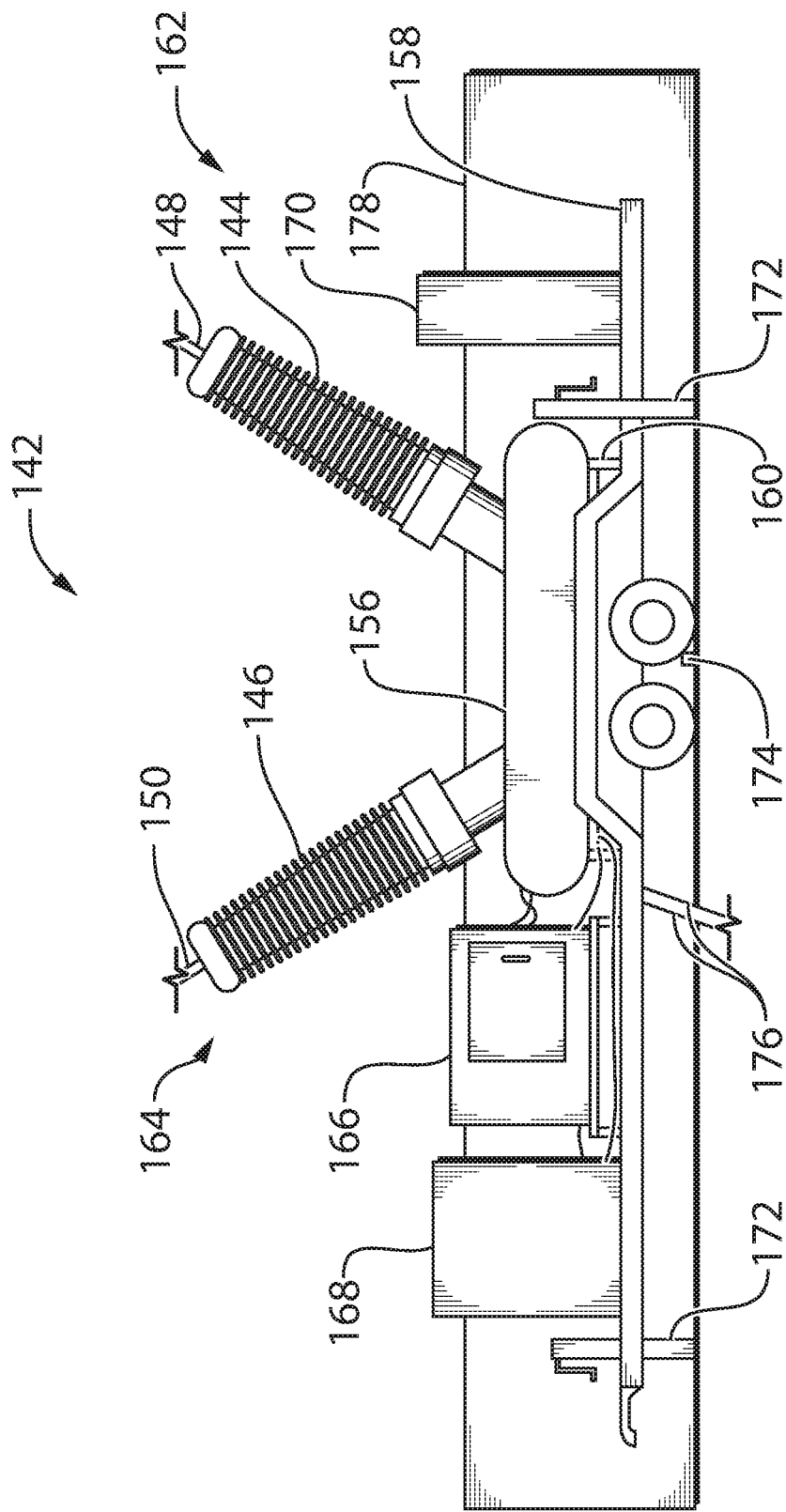
FIG. 46 is a side view of a portable breaker in accordance with one embodiment of the invention.

The breaker 142 shown schematically in FIGS. 9-40 and 43 will now be further illustrated and described with reference to FIG. 46. In some embodiments of the invention, the breaker 142 is a single pole (phase) of a 345 kV breaker that has been modified to be portable. A typical breaker of this magnitude consists of three single pole breakers mechanically connected together to be a three phase breaker and break all three circuits at once. The three phase breaker includes three breakers connected together and configured to act in unison. Because only a single phase needs to be disconnected or energized at once in many embodiments of the invention, only one pole (or phase) of a breaker is needed. To make the breaker more portable, one pole is separated from the three phase unit and modified to be portable as described in more detail below.

A breaker 142 in accordance with the invention may be, as an example not intending to be limiting, a 2,000 amp $SF_6$ breaker wherein $SF_6$ is an insulating gas that is used in the breaker 142. In other embodiments of the invention, the breaker 142 could be a minimum oil breaker, or any other breaker suited to the applied voltage. The breaker 142 has two insulated bushings 144, 146 projecting from a housing 156. Jumpers 148, 150 are attached to an end of the bushings 144, 146 for connecting the breaker 142 to conductors.

The breaker 142 has a closed position that permits an electrical connection from a conductor connected to one bushing 144 via jumper 148 through the breaker 142 to a conductor connected to the other bushing 146 via jumper 150. When it is desired to break the electrical connection between the two conductors 120, 120 of the transfer bus 118, the breaker 142 is operated to achieve an open position. In the open position, the two jumpers 148, 150 connected to the two bushings 144, 146 are isolated from each other.

Normally, a breaker 142 having the capacity for high voltage power is located in fixed locations, such as for example power generating faculties, terminals, switching stations or substations, and consists of three poles or phases. In accordance with the invention, a standard breaker 142, such as a 345 kilovolt, 2,000 amp $SF_6$ breaker, is used. Because these types of breakers have three poles or phases, a single pole or phase is separated out from the other two phases and is modified so as to be portable. As shown in FIG. 46, the breaker 142 is mounted onto a trailer 158. A support structure 160 mounts the breaker 142 to the trailer 158. Optionally, the breaker 142 could be mounted on a truck bed or some other suitable type of vehicle.

The breaker 142 has a housing 156 from which two insulated bushings 144, 146 project. One of the bushings 144 is located on what is referred to as the line side 162, meaning that that bushing 144 connects to the conductor, for example phase conductor 102, that is connected to a power source. The other side 164 of the breaker 142 is referred to as the load side 164 and includes the other bushing 146. Within the housing 156 a non-conductive gas, $SF_6$ for example, is used for electrical insulation. Other breakers in accordance with the invention may be oil-filled breakers or other types of breakers suitable for the applied voltage.

A control panel 166 for operating the breaker 142 is located on the trailer 158 and operatively connected to the breaker 142. Optionally, the control panel 166 may be the same one that would normally operate a standard non-portable breaker. A portable power generator 168 is located on the trailer 158 and is operatively connected to the breaker 142 and/or control panel 166 to provide power to operate the breaker 142. The generator 168 may be gasoline powered and is of sufficient capacity to permit operation of the breaker 142, including charging of the springs in the breaker 142. Preferably, the generator 168 can produce 120 volts.

Additional containers 170 of $SF_6$ gas are kept on the trailer 158 in order to permit recharging of the breaker 142 with gas if necessary. The manufacturer's recommendations for gas pressure in the breaker 142 should be observed.

The exact modifications necessary to make the breaker 142 portable will vary depending on the type of breaker is being modified. A person ordinarily skilled in the art after reviewing this disclosure will be able to appropriately fashion a portable breaker 142.

Before use of the breaker 142, the tow vehicle is detached and the trailer 158 is held in place by jacks 172 and a wheel chocks 174. The trailer 158 and the breaker 142 is bonded to ground with grounding cables 176. A temporary protective fence 178 is constructed around the trailer 158.

FIGS. 49 to 56 depict a method of replacing energized high-voltage power transmission conductors while they remain energized.

Figure 49:
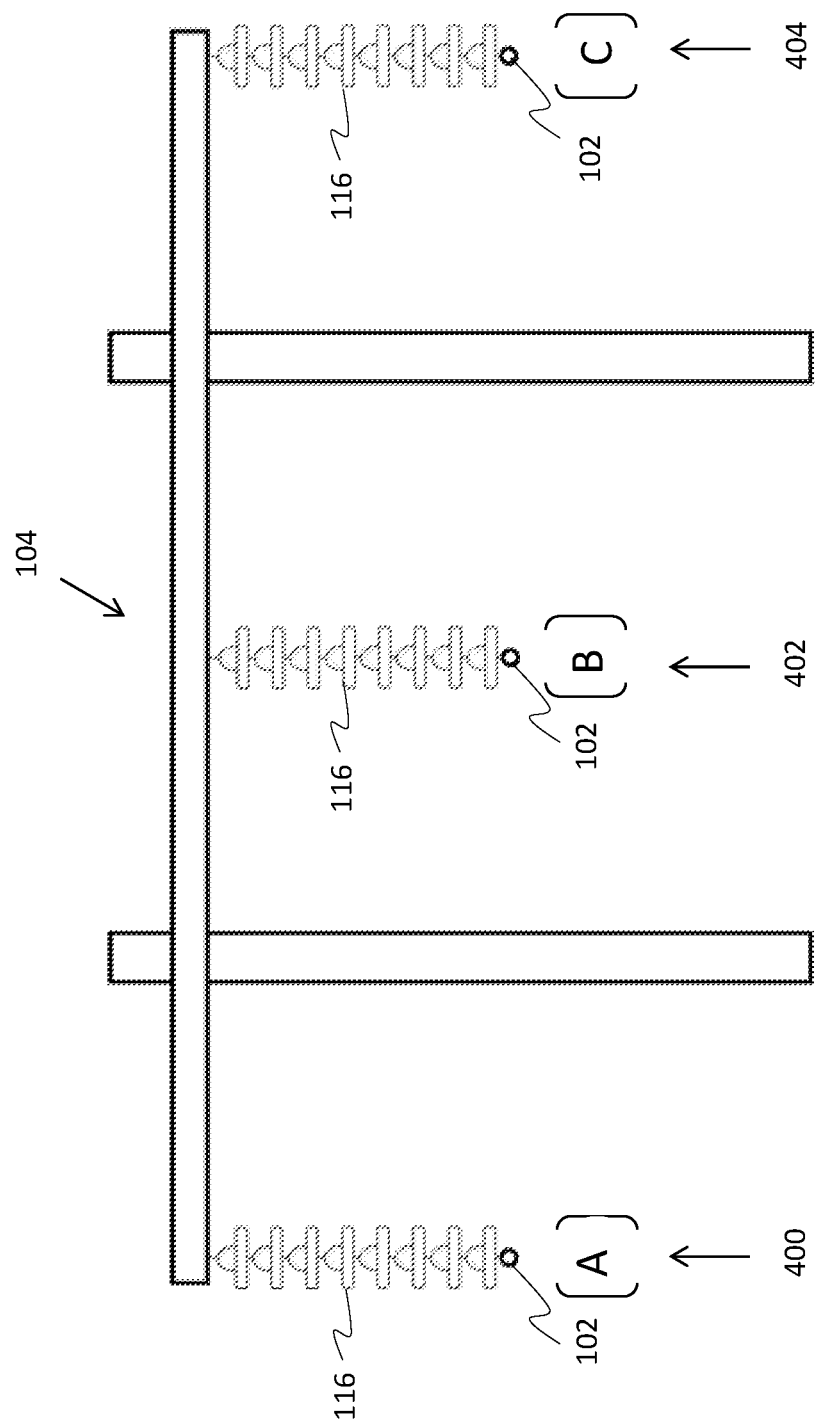
FIG. 49 is a front elevation view of a support structure for a power transfer system showing three adjacent phases A, B and C.

FIG. 49 is a front, elevation view of a schematic of a support structure 104 that is supporting three phases of conductors 102A, 102B and 102C by insulators 116. Each of the conductors 102A, 102B and 102C carry an electrical load. The A phase conductor 102 A is positioned on the support structure 104 in a first conductor position 400. The B phase conductor 102B is positioned on the support structure 104 in a second conductor position 402. The C phase conductor 102C is positioned on the support structure 104 in a third conductor position 404. The configuration of the support structure 104 depicted in FIGS. 49 to 56 and, in particular the first, second and third conductor positions 400, 402, 404 may be in different positions upon the support structure 104 and the positions depicted are not intended to be limiting. While the first, second and third conductor positions 400, 402, 404 are depicted as being in one single, horizontal plane, these positions can be in a single plane that is not horizontal, for example it may be substantially vertical or between a horizontal plane and a vertical plane or may not be in a single plane at all. The ordered sequence of the three phases of conductors 102A, 102B and 102C is maintained with the conductor 102A adjacent conductor 102B but not adjacent conductor 102C. Conductor 102B is adjacent, or in between, both of conductor 102A and conductor 102C.

Figure 50:
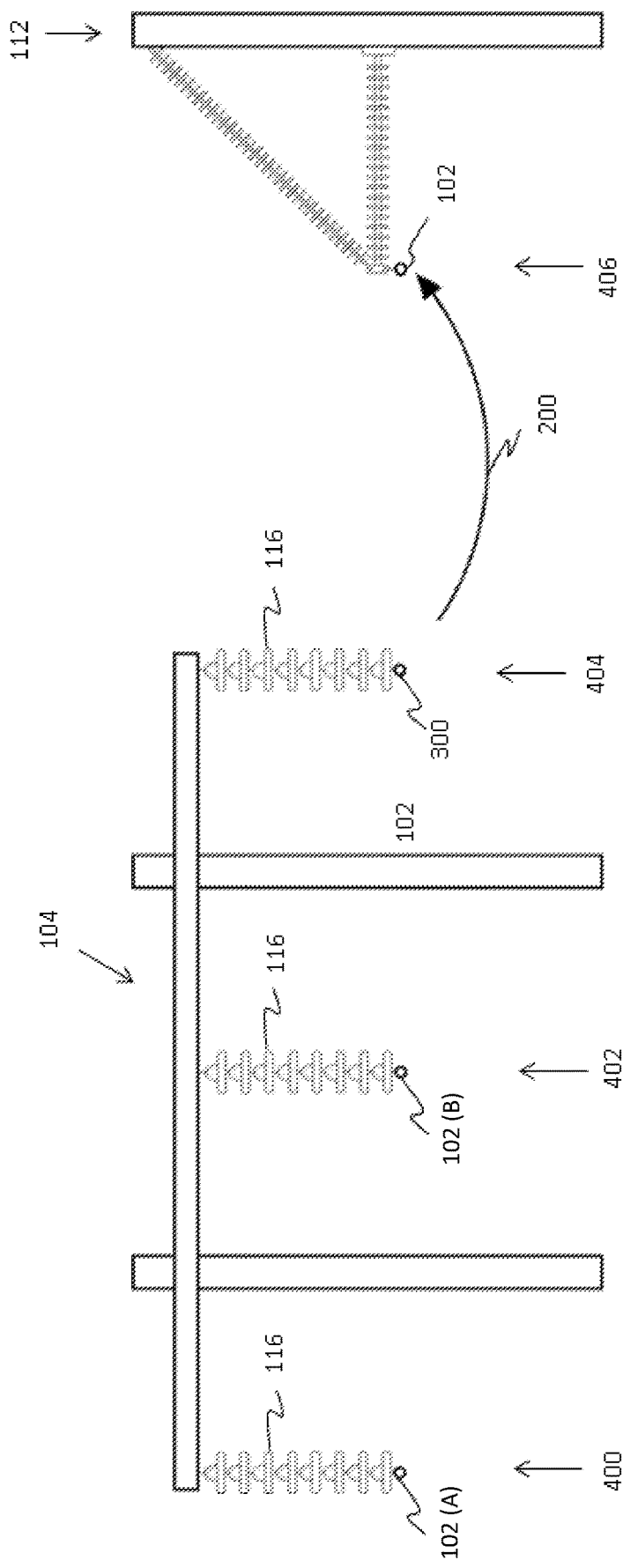

FIG. 50 depicts a step of installing, providing, or using an existing temporary structure 112 along side the support structure 104. In this example, the temporary structure 112 provides a fourth conductor position 406. The C phase conductor 102C is transferred in step 200 from the support structure 104 to the fourth conductor position 406 on the temporary structure 112. A first replacement conductor 300 is strung in to the position on the support structure 104 where the C phase conductor 102-C was located, in other words at the third conductor position 404.

Figure 51:
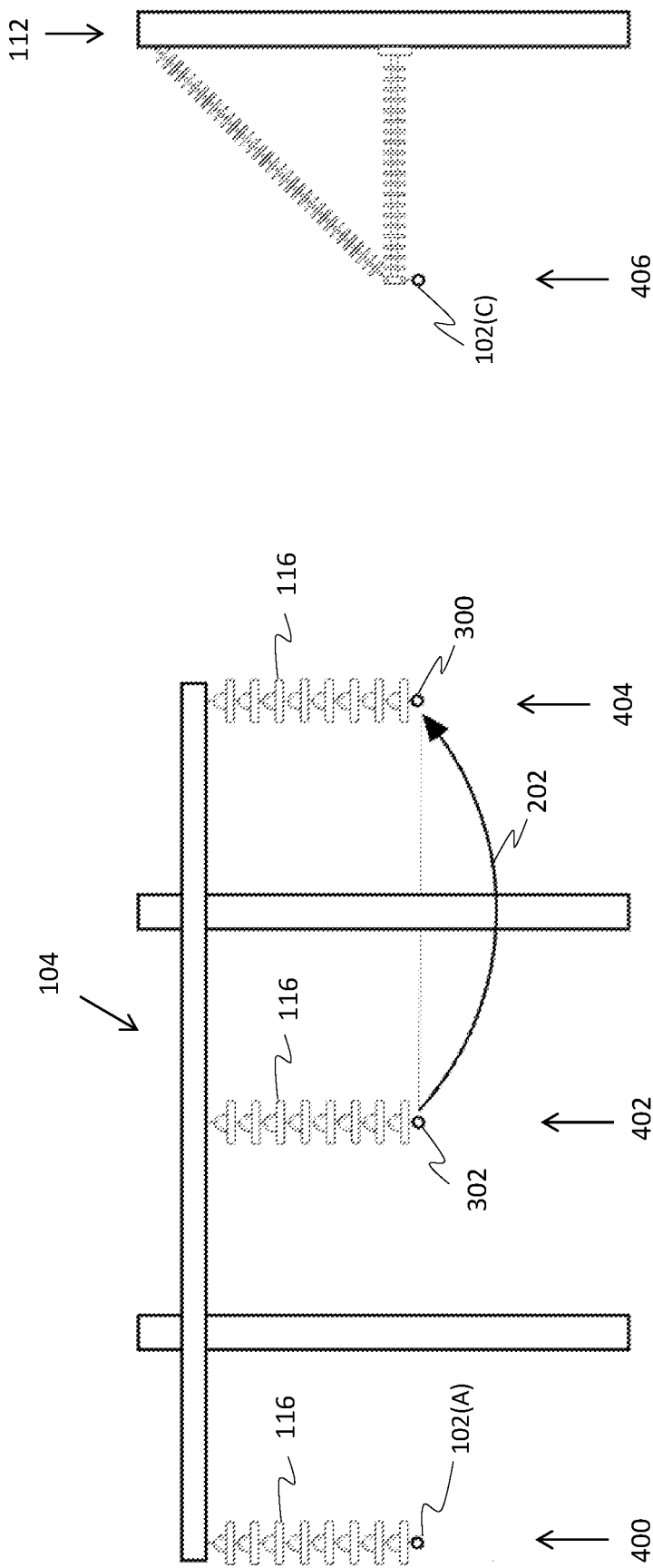
FIG. 51 depicts the transfer of the electrical load from the B phase to the first replacement conductor (D phase) and the stringing of a second replacement conductor where the B phase was located.

FIG. 51 depicts a transferring step 202 wherein the electrical load of the B phase conductor 102B is transferred to the first replacement conductor 300 in the third conductor position 404. The B phase conductor 102B is replaced by a second replacement conductor 302. At this step in this method, the electrical load of the C phase conductor 102C is carried through the C phase conductor 102C, which is supported on the fourth conductor position 406 by the temporary structure 112. The electrical load of the B phase conductor 102B is carried through the first replacement conductor 300 in the third conductor position 404.

Figure 52:
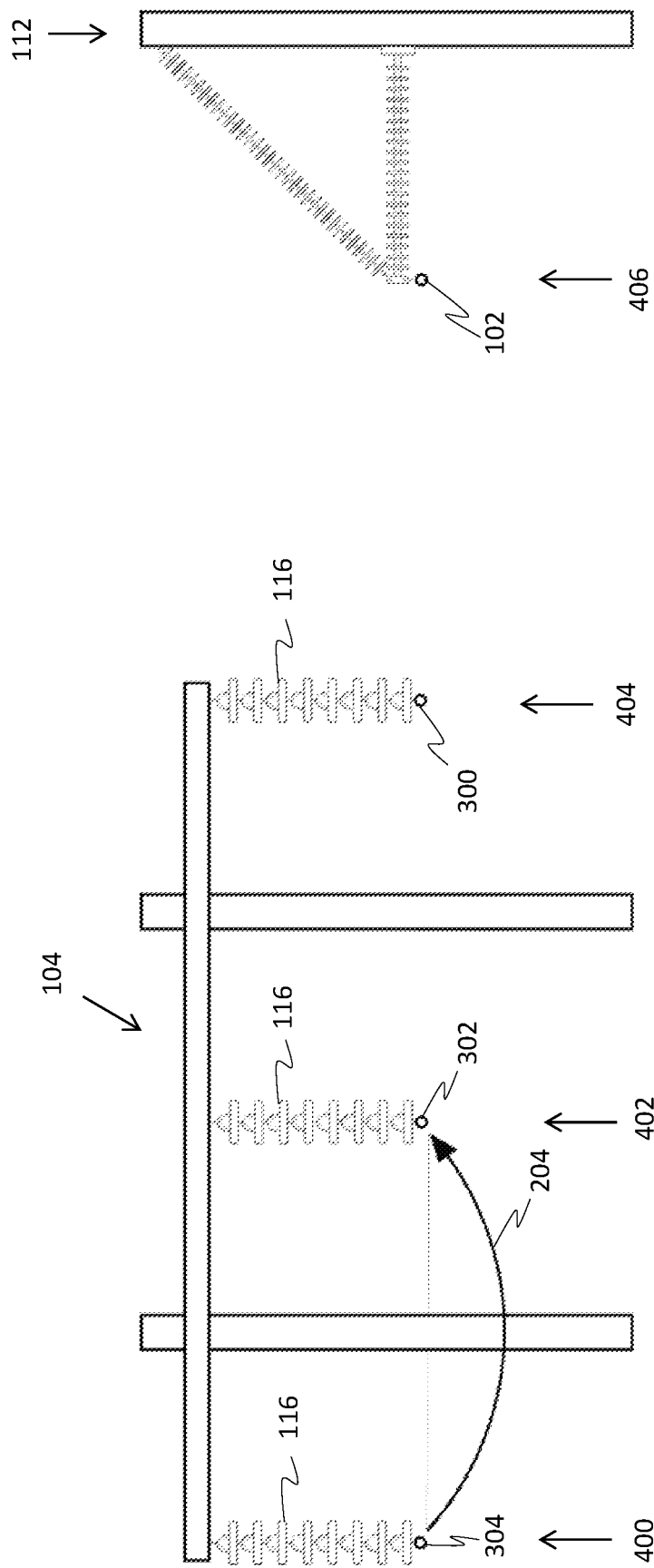
FIG. 52 depicts the transfer of the electrical load from the A phase to the second replacement conductor (the new conductor strung in FIG. 51) and the stringing of a third replacement conductor where the A phase was located.

FIG. 52 depicts transferring step 204 wherein the electrical load of the A phase conductor 102A is transferred to the second replacement conductor 302 in the second conductor position 402. The A phase conductor 102A is the replaced by a third replacement conductor 304.

FIG. 53 depicts transferring step 206 wherein the electrical load on the second replacement conductor 302 is transferred to the third replacement conductor 304.

FIG. 54 depicts transferring step 208 wherein the electrical load on the first replacement conductor 300 is transferred to the second replacement conductor 302.

FIG. 55 depicts transferring step 210 wherein the electrical load from the C phase conductor 102C is transferred to the first replacement conductor 404.

During this method, the electrical load of the C phase is transferred from the third conductor position 404 to the fourth conductor position. The electrical load of the B phase is transferred from the second conductor position 402 to the third conductor position 404. The electrical load of the A phase is transferred from the first conductor position 400 to the second conductor position 402. Between each of these transfer steps, an old conductor is replaced with a new, replacement conductor wire. Then the steps are reversed with the electrical load of the A phase being transferred back to the first conductor position 400 from the second conductor position 402, the electrical load of the B phase being transferred back to the second conductor position 402 from the third conductor position 404, the electrical load of the C phase being transferred back to the third conductor position 404 from the fourth conductor position 406. In this fashion illegal transpositions of the A, B and C phases are avoided while the electrical loads of the A, B and C phases are returned to their original conductor positions, now carried through new conductor lines 300, 302, 304, as depicted in FIG. 56.

The various embodiments of the method of the invention described herein, temporarily relocating a phase conductor 102, stringing a D phase conductor into place and using the D phase conductor to successively and in sequence transfer the electrical loads from proximate conductors, permits sections of new conductors, located between dead end junctures, to be strung one at a time. If it is desired to string new conductors along the entire length of a system 100, or a length longer than practical for stringing conductors, then the re-conductoring methods are used for lengths that are practical and repeated along the length of the system until a desired length of new conductor is installed along the system.

Figure 47:
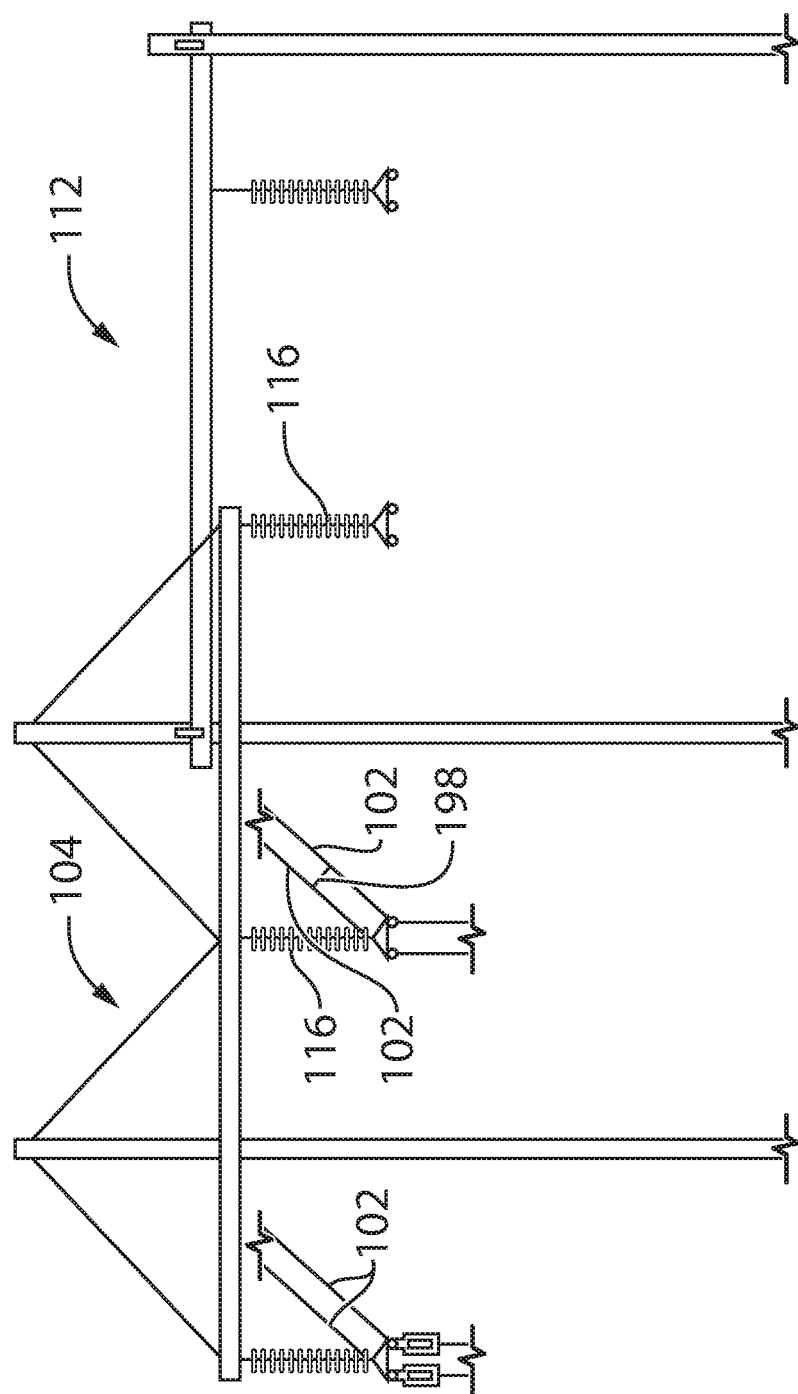
FIG. 47 is a side view of a support structure for a power transfer system showing a temporary support structure attached to a permanent support structure and insulators configured to carry double conductors (two conductors per phase).

It is appreciated by one skilled in the art, that in some power transfer systems 100, more than one conductor 102 carries the power load for a particular phase. This may be done in instances when a power load is greater than a single-phase conductor can accommodate. In such cases, multiple (bundled) phase conductors 102 are often located next to each other and may hang from the same insulator 116 as shown in FIG. 47. The conductors may be separated by spacers 198. Such bundle conductor systems 100 may be re-conductored in accordance with the invention by application of the procedures described herein to each conductor 102.

While the above disclosure describes certain examples of the present invention, various changes, adaptations and modifications of the described examples will also be apparent to those skilled in the art. The scope of the claims should not be limited by the examples provided above; rather, the scope of the claims should be given the broadest interpretation that is consistent with the disclosure as a whole.

The invention claimed is:

1. A method for maintaining one or more sections of electrically conductive phases in a three phase power conductor line without interrupting power in any of the three energized phases, the three energized phases denoted as the A, B and C phases, and wherein the three energized phases are parallel and are spaced apart in an ordered sequence wherein the A phase is proximate to the B phase and the B phase is proximate to the C phase, and the B phase is located between the A phase and the C phase, and wherein the A phase has a corresponding A load and a A phase section needing maintenance, the B phase has a corresponding B load and a B phase section needing maintenance and the C phase has a corresponding C load and a C phase section needing maintenance, and the A, B and C phases are strung between two support structures supporting the three phases suspended above a ground, the method comprising the steps of:

providing a temporarily de-energized new D phase section and stringing the new D phase section between the two support structures;

electrically connecting in parallel the B phase section needing maintenance to the new D phase section through at least a first pair of jumpers extending between the the B phase section needing maintenance and the new D phase section and wherein the at least first pair of jumpers do not cross over the A and C phases;

transferring the B load to the new D phase section thereby establishing the new D phase section as a temporary B phase section;

de-energizing the B phase section needing maintenance thereby establishing the de-energized B phase section needing maintenance as a first temporarily de-energized D phase section;

maintaining the first temporarily de-energized D phase section;

electrically connecting in parallel the C phase section needing maintenance to the first temporarily de-energized D phase section through at least a second pair of jumpers extending between the C phase section needing maintenance and the first temporarily de-energized D phase section, wherein the at least second pair of jumpers do not cross over the A and the temporary B phases;

transferring the C load to the first temporarily de-energized D phase section thereby establishing the first temporarily de-energized D phase section as a temporary C phase section;

de-energizing the C phase section needing maintenance thereby establishing the de-energized C phase section needing maintenance as a second temporarily de-energized D phase section;

maintaining the second temporarily de-energized D phase section;

electrically connecting in parallel the second temporarily de-energized D phase section to the temporary C phase section through at least a third pair of jumpers extending between the second temporarily de-energized D phase section and the temporary C phase section, wherein the at least third pair of jumpers do not cross over the A and the temporary B phases;

transferring the C load from the temporary C phase section to the second temporarily de-energized D phase section so as to re-establish the second temporarily de-energized D phase section as the C phase;

de-energizing the temporary C phase section thereby establishing the de-energized temporary C phase section as a third temporarily de-energized D phase section;

electrically connecting in parallel the third temporarily de-energized D phase section to the temporary B phase section through at least a fourth pair of jumpers extending between the third temporarily de-energized D phase section and the temporary B phase section, wherein the at least fourth pair of jumpers do not cross over the A and the C phases;

transferring the B load from the temporary B phase section to the third temporarily de-energized D phase section so as to re-establish the third temporarily de-energized D phase section as the B phase;

de-energizing the temporary B phase section thereby establishing the de-energized temporary B phase section as a fourth temporarily de-energized D phase section; and removing the fourth temporarily de-energized D phase section.

2. The method of claim 1, wherein providing an auxiliary support structure prior to the providing a temporarily de-energized new D phase section substantially adjacent the two support structures and the A phase section needing maintenance is moved and strung on the auxiliary support structure, and the new D phase section is strung between the two support structures where the A phase section needing maintenance was moved from.

3. The method of claim 2 wherein the stringing of the new D phase section further comprises steps of:

providing a pulling line having at least one non-conductive end, connecting said at least one non-conductive end of said pulling line to a leading end of the new D phase section, providing first and second equal potential zones at opposite ends of a stringing path whereallong the new D phase section is to be strung, wherein said first and second equal potential zones are grounded, electrically connecting said pulling line to said first equal potential zone, electrically connecting the new D phase section to said second equal potential zone, and connecting said at least one non-conductive end of said pulling line to said leading end of the new D phase section, electrically connecting pulling equipment at said first equal potential zone to said first equal potential zone and electrically connecting pay-out equipment at said second equal potential zone to said second equal potential zone, pulling said pulling line along said stringing path using said pulling and payout equipment so as to pull said pulling line into said first equal potential zone while paying-out the new D phase section along said stringing path from said second equal potential zone.

4. The method of claim 3, wherein said non-conductive end of said pulling line is comprised of a flexible electrical isolator.

5. The method of claim 2, wherein a first lateral distance between the new D phase section and the A phase section needing maintenance supported on the auxiliary support structure is substantially no less than a phase-to-phase lateral separation, wherein said phase-to-phase lateral separation is substantially equal to a second lateral distance between the B phase section needing maintenance and the C phase section needing maintenance.

6. The method of claim 2, wherein the A phase section needing maintenance strung on the auxiliary support structure is substantially parallel to the new D phase section strung between the two support structures.

7. The method of claim 2, wherein the step of stringing the new D phase section between the two support structures where the A phase section needing maintenance was moved from further comprises treating the new D phase section as an energized conductor.

* * * * *